US011780191B2

(12) United States Patent
Crum et al.

(10) Patent No.: US 11,780,191 B2
(45) Date of Patent: Oct. 10, 2023

(54) WEAPON DEMILITARIZATION SYSTEM AND PROCESS

(71) Applicant: DAVID BOLAND, INC., Titusville, FL (US)

(72) Inventors: Peter David Crum, Titusville, FL (US); Craig Kenneth Hildebrandt, Titusville, FL (US); Garren Keith Harne, Titusville, FL (US); David Andrew Boland, Titusville, FL (US)

(73) Assignee: David Boland, Inc., Titusville, FL (US)

( * ) Notice: Subject to any disclaimer, the term of this patent is extended or adjusted under 35 U.S.C. 154(b) by 382 days.

(21) Appl. No.: 17/021,094

(22) Filed: Sep. 15, 2020

(65) Prior Publication Data

US 2021/0178718 A1 Jun. 17, 2021

Related U.S. Application Data

(60) Provisional application No. 62/903,017, filed on Sep. 20, 2019.

(51) Int. Cl.
*B30B 9/32* (2006.01)
*B02C 1/14* (2006.01)
*B02C 21/00* (2006.01)
*B65G 43/08* (2006.01)

(52) U.S. Cl.
CPC .................. *B30B 9/32* (2013.01); *B02C 1/14* (2013.01); *B02C 21/00* (2013.01); *B65G 43/08* (2013.01)

(58) Field of Classification Search
CPC ........... B02C 1/14; B02C 21/00; B65G 43/08; F41A 11/00; F41A 99/00; B30B 9/32
See application file for complete search history.

(56) References Cited

U.S. PATENT DOCUMENTS

| 2,991,946 | A |   | 7/1961  | Croft |            |
|-----------|---|---|---------|-------|------------|
| 3,436,059 | A |   | 4/1969  | Donaldson |        |
| 3,613,562 | A | * | 10/1971 | Brewer | B30B 9/32 |
|           |   |   |         |       | 100/92     |
| 3,670,971 | A | * | 6/1972  | Schneider | B02C 1/14 |
|           |   |   |         |       | 241/271    |
| 3,762,321 | A | * | 10/1973 | Patros | B30B 9/32 |
|           |   |   |         |       | 100/215    |

(Continued)

OTHER PUBLICATIONS

International Patent Application No. PCT/US2020/50891; Int'l Search Report and the Written Opinion; dated Jun. 11, 2021; 9 pages.

(Continued)

*Primary Examiner* — Bobby Yeonjin Kim
(74) *Attorney, Agent, or Firm* — BakerHostetler

(57) ABSTRACT

A fully automatic small arms demilitarization system includes individual infeed conveyance systems loaded at a single process initiation location; multiple hydraulic press stations fed by the individual infeed conveyance systems; and the multiple hydraulic press stations configured to crush one section of each weapon per cycle, incrementally crushing an entire length of each weapon, completely distorting each weapon to preclude restoration to a useable condition. The system further including an output system configured to output demilitarized weapons onto a common outfeed conveyance system that delivers the demilitarized weapons to a single recycle bin.

12 Claims, 45 Drawing Sheets

(56) References Cited

U.S. PATENT DOCUMENTS

| | | | | | |
|---|---|---|---|---|---|
| 3,768,739 | A | * | 10/1973 | George | F25D 3/11 100/95 |
| 4,072,273 | A | * | 2/1978 | Reiniger | B03B 9/06 241/DIG. 38 |
| 4,227,607 | A | * | 10/1980 | Malavenda | B64F 1/368 198/572 |
| 4,516,489 | A | * | 5/1985 | Ballo | B30B 9/325 100/98 R |
| 4,728,044 | A | * | 3/1988 | Duill | B02C 21/00 241/23 |
| 5,678,478 | A | | 10/1997 | Goyal et al. | |
| 6,571,693 | B1 | * | 6/2003 | Kaldenberg | B30B 9/32 100/95 |
| 8,890,944 | B1 | * | 11/2014 | Reynolds | B02C 21/02 42/95 |
| 10,315,859 | B1 | * | 6/2019 | Zhao | B65G 43/08 |
| 2007/0017548 | A1 | * | 1/2007 | King | A61L 2/24 134/1 |
| 2012/0174369 | A1 | * | 7/2012 | Ming | B03C 1/30 29/791 |
| 2012/0259149 | A1 | | 10/2012 | Kautz et al. | |
| 2016/0025193 | A1 | | 1/2016 | Wheatley et al. | |

OTHER PUBLICATIONS

Defense Demilitarization: Demilitarization Procedures; DoD Manual 4160.28, vol. 2; Secretary of Defense for Acquisition and Sustainment; Nov. 1, 2022; 40 pages.

* cited by examiner

WEAPON DEMILITARIZATION SYSTEM AND PROCESS

CROSS-REFERENCE TO RELATED APPLICATIONS

This application claims the benefit of U.S. Provisional Patent Application No. 62/903,017 filed on Sep. 20, 2019, which is hereby incorporated by reference in its entirety for all purposes as if fully set forth herein.

BACKGROUND OF THE DISCLOSURE

1. Field of the Disclosure

This disclosure is directed to a weapon demilitarization system. This disclosure is also directed to a weapon demilitarization process. This disclosure is also directed to a small arms weapon demilitarization system. This disclosure is also directed to a small arms weapon demilitarization process.

2. Related Art

Demilitarization is a process by which weapon assets are safely dismantled and/or destroyed while, ideally, its valuable materials are recovered. For example, weapon assets are typically demilitarized and disposed when the weapon assets exceed their expected demand, are obsolete due to changes in technology, laws or operations, are physically damaged and cannot be used in normal operations, and/or the like.

Existing demilitarization systems include a single large shredder in which the weapons to be demilitarized are processed. Once this first demilitarization system process is complete, the output is scanned by personnel to determine which of the output does not meet demilitarization specifications and requires additional processing. Personnel then physically pick these pieces and put them through the demilitarization process again to further process these pieces to ensure they meet demilitarization specifications.

Additionally, the existing demilitarization systems include torch cutting stations to demilitarize certain types of weapons that cannot be successfully demilitarized by the existing single large shredder. Moreover, the existing demilitarization systems include a small shredder for demilitarization of smaller items that simply fall through the gaps in the existing one large shredder.

Thus, the existing demilitarization systems require multiple devices as well as substantial personnel interaction to sufficiently demilitarize weapons. In particular, the substantial personnel interaction presents a safety issue during the process to sufficiently demilitarize weapons. Additionally, the need for multiple devices further complicates the demilitarization process as well as increases the time required, the cost of the demilitarization process and/or the like.

Accordingly, what is needed is a demilitarization system and process that operates with reduced personnel interaction, increases safety for personnel, simplifies the demilitarization process, increases a reliability of the demilitarization process, ensures the repeatability of the demilitarization process output, reduces a time required for the demilitarization process, reduces the operation and maintenance costs for the demilitarization process, and/or the like.

SUMMARY OF THE DISCLOSURE

One general aspect includes a fully automatic small arms demilitarization system, including individual infeed conveyance systems loaded at a single process initiation location; multiple hydraulic press stations fed by the individual infeed conveyance systems; the multiple hydraulic press stations configured to crush one section of each weapon per cycle, incrementally crushing an entire length of each weapon, completely distorting each weapon to preclude restoration to a useable condition; and an output system configured to output demilitarized weapons onto a common outfeed conveyance system that delivers the demilitarized weapons to a single recycle bin.

One general aspect includes an arms demilitarization system, including at least one transfer conveyor; at least one weapon feed system; at least one crush box; at least one rear back gauge system; at least one press assembly; a recycle conveyor; and at least one infeed assembly.

One general aspect includes an arms demilitarization system, including at least one transfer conveyor; at least one weapon feed system; at least one crush box; at least one rear back gauge system; at least one press assembly; a recycle conveyor; and at least one infeed assembly, where the at least one press assembly is configured with a tool that crushes one section of a weapon per cycle, and where at least one of the at least one transfer conveyor, the at least one infeed assembly, and the at least one weapon feed system are configured to feed the weapon to the at least one press assembly.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
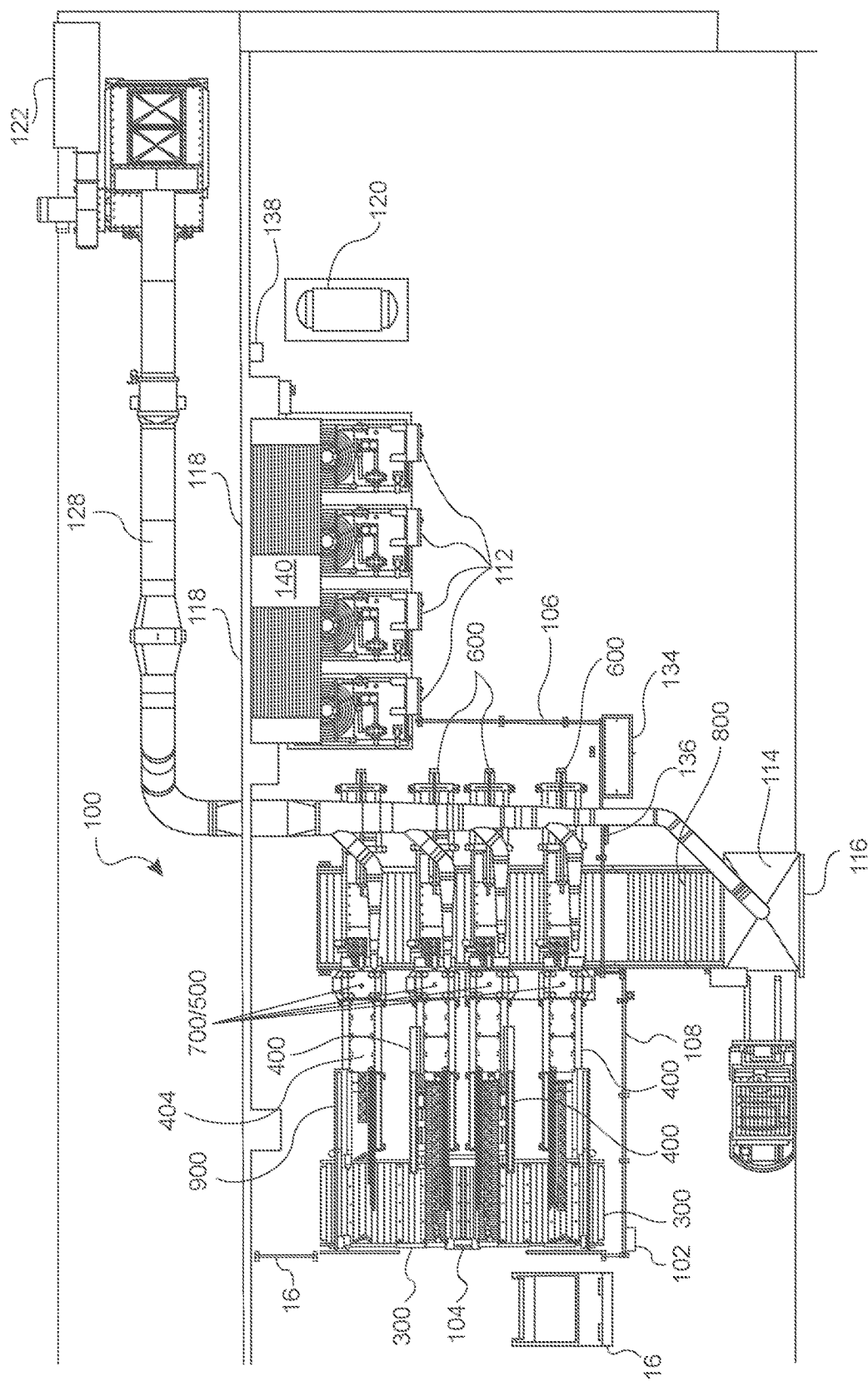
FIG. 1 illustrates a top view of a demilitarization system constructed according to the principles of the disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 illustrates a top view of a demilitarization system constructed according to the principles of the disclosure.

Figure 2:
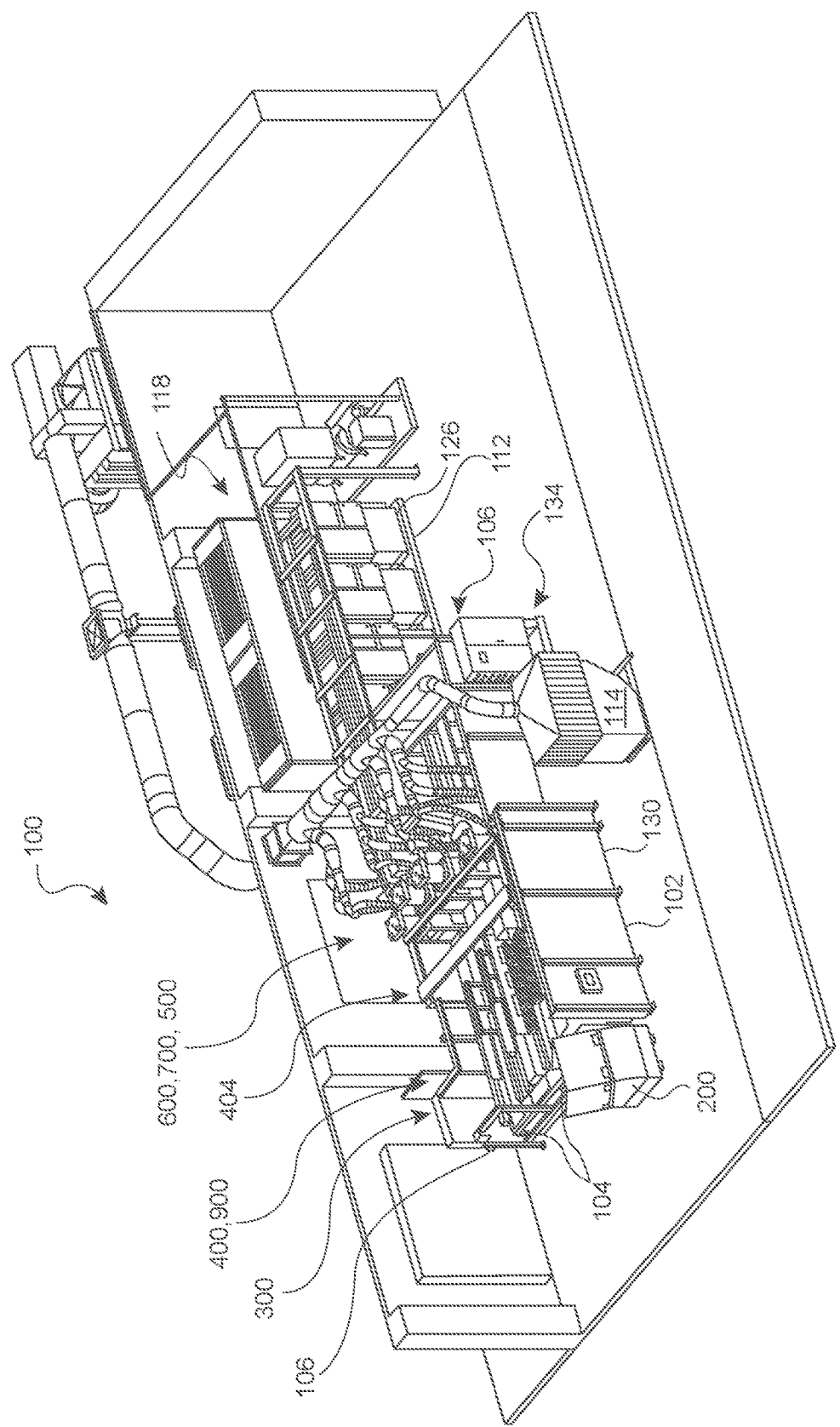
FIG. 2 illustrates a perspective view of the demilitarization system of FIG. 1.

FIG. 2 illustrates a perspective view of the demilitarization system of FIG. 1.

Figure 3:
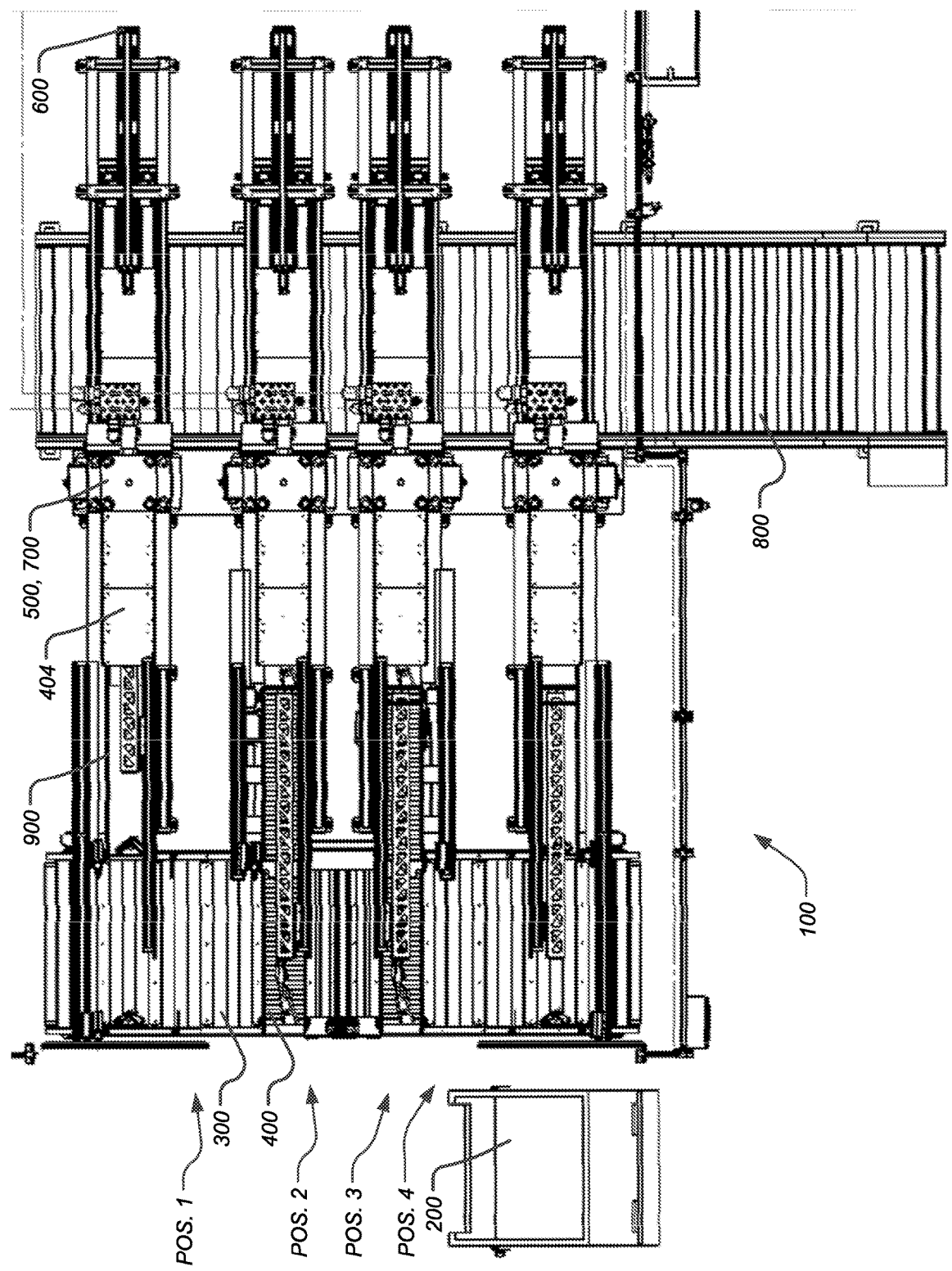
FIG. 3 illustrates a partial top view of the demilitarization system of FIG. 1.

FIG. 3 illustrates a partial top view of the demilitarization system of FIG. 1.

Figure 4:
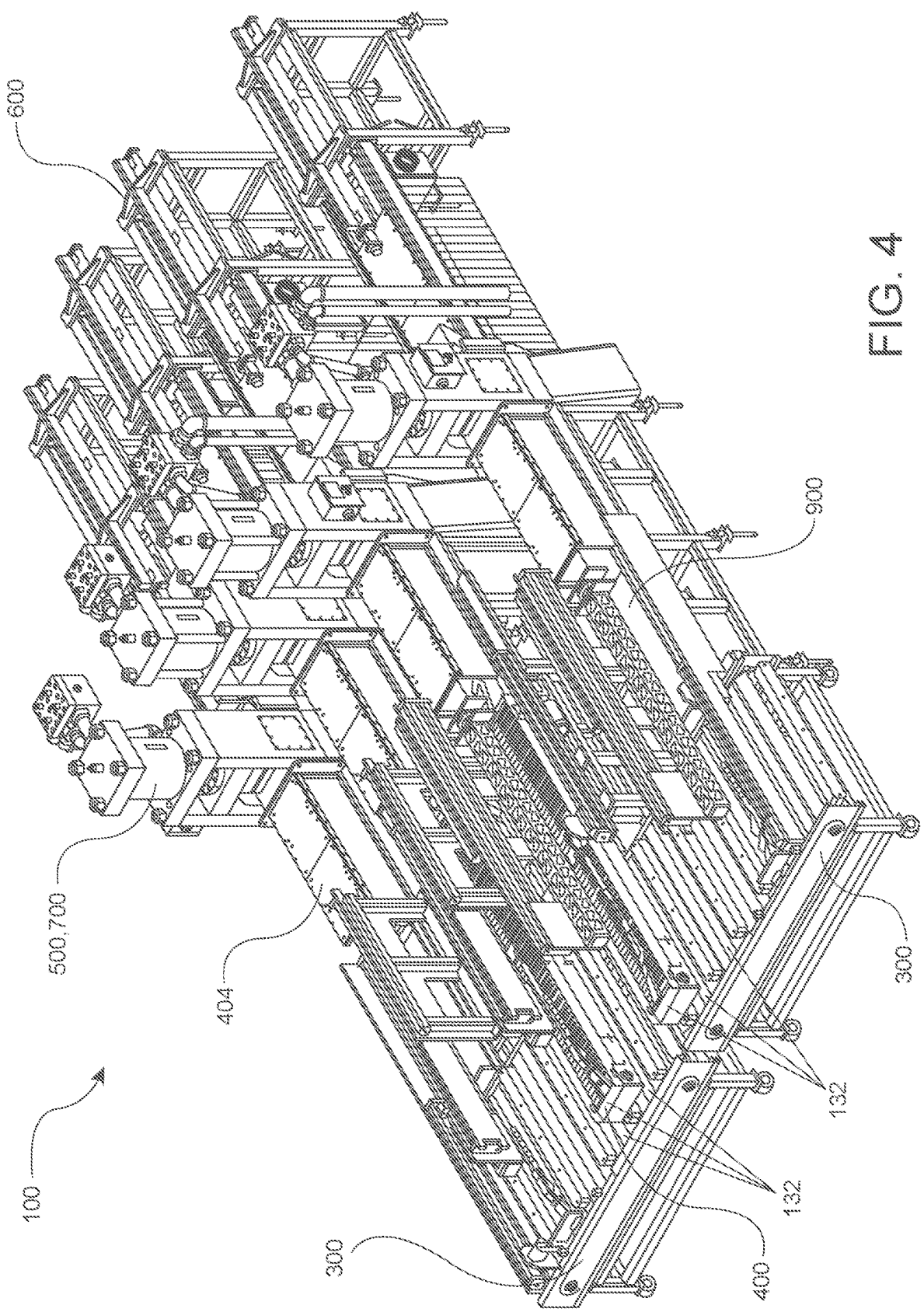
FIG. 4 illustrates a partial perspective view of the demilitarization system of FIG. 1.

FIG. 4 illustrates a partial perspective view of the demilitarization system of FIG. 1.

In particular, FIG. 1 illustrates a demilitarization system 100 constructed according to the principles of the disclosure. The demilitarization system 100 may include one or more of a container mechanism 200, a transfer conveyor 300, a weapon feed system 400, a crush box 500, a rear back gauge system 600, a press assembly 700, a recycle conveyor 800, an infeed assembly 900, and/or the like. The function, construction, and the like of each will be described in further detail herein.

The demilitarization system 100 may further include a human machine interface or HMI 102, an operator control box 104, an access gate 106, safety fencing 108, hydraulic power units 112, a recycle bin 114, recycle bin docking 116, exhaust fans 118, a compressor 120, a dust collector 122, dust collecting exhaust ducting 128, an exhaust fan hood 140, a louver for air makeup, a drip pan 126 for the hydraulic power units 112, a control box 130, loading areas 132, a control box 134, a main air preparation system 136, an air dryer 138, and/or the like. In one aspect, the access gate 106 may include a safety interlock switch. In one aspect, the dust collecting exhaust ducting 128 may be configured to collect and transfer dust and other unwanted debris and forward the same to the dust collector 122.

The demilitarization system 100 may include a plurality of hydraulic press stations that each include an implementation of the press assembly 700. Each press assembly 700 may operate in accordance with an independent process. In aspects, there may be 2 to 8 hydraulic press stations (4 press stations being illustrated in the Figures) and each hydraulic press station may include an implementation of the press assembly 700. However, the demilitarization system 100 may be configured to be scalable and there may be any number of the hydraulic press stations. The press assembly 700 may operate with a press force of 100-400 tons, 200-300 tons, or 220-240 tons. However, the press assembly 700 may be implemented with any desired, needed, required, or the like press force to accomplish the demilitarization process as described herein.

Each press assembly 700 may be fitted with a tool 712 (see FIG. 19) and the press assembly 700 may be configured to operate such that the press assembly 700 crushes one section of the weapon per cycle. In particular, the press assembly 700 may incrementally crush the entire length of the weapon, completely distorting each weapon to preclude restoration to a usable condition. In one aspect, the tool may be 1 to 12 inches in length, 2 to 10 inches in length, 4 to 8 inches in length, or 5 to 7 inches in length. In other aspects, the press assembly 700 and/or the tool 712 may be sized and operated to crush an entire weapon in a single cycle.

The hydraulic press stations that each include the press assembly 700 may be fed by individual infeed conveyance systems that include the transfer conveyor 300, the infeed assembly 900, and/or the weapon feed system 400. One or more of the individual infeed conveyance systems may be loaded at a single process initiation location (load position 1, load position 2, load position 3, or load position 4 as illustrated in FIG. 3).

A container lift and tilt mechanism may include the container mechanism 200 and may be located at the process initiation location which holds weapon dunnage for ease of operator ergonomics. In additional or alternative aspects, one or more systems may be utilized to transfer weapon dunnage from the container mechanism 200 to the transfer conveyor 300, the infeed assembly 900, and/or the weapon feed system 400. These one or more systems may include robotic systems, heavy equipment systems, crane systems, and/or the like. These one or more systems may be automated or may be operated by an operator.

All of the hydraulic press stations each implementing the press assembly 700 may output demilitarized weapons that meet or exceed the "degree of demilitarization" onto a common outfeed conveyance system that may include the recycle conveyor 800 that may deliver the demilitarized weapons to a recycle bin 114.

The container mechanism 200 may include a lifting device configured to adjust the unloading height and tilt angle of a dunnage container. In one aspect, the container mechanism 200 may include a scissor lifting device used to adjust the unloading height and tilt angle of the dunnage container. In one aspect, the scissor lifting device may be configured such that extension is achieved by applying pressure to an outside set of supports located at one end of the mechanism, elongating the crossing pattern through a hydraulic system, a pneumatic system, a mechanical system, and/or the like. In one aspect, the lifting device may be implemented as a heavy-duty scissor lift table capable of at least a 4500-pound maximum load. In one aspect, the container mechanism 200 may be capable of holding a maximum pallet size of 48 inches by 48 inches and has 25 inches of vertical travel. Other sizes and other vertical travel distances are contemplated as well. In one aspect, the container mechanism 200 may be configured to provide a maximum tilting capacity of 30 degrees. Other maximum tilt angles are contemplated as well.

The lift height and tilt angle of the container mechanism 200 may be controlled by the operator using hand controls such as the operator control box 104. The hand controls may provide the operator with the ability to adjust both lift and tilt of the container mechanism 200 according to their personal preferences, comfort level, and/or the like. In other aspects, the lift height and tilt angle of the container mechanism 200 may be controlled by the operator using voice commands.

In one aspect, the lifting device of the container mechanism 200 may implement a pneumatic system. The pneumatic system may include at least a compressor (such as the compressor 120), pneumatic actuators, valves, and/or the like. However, other types of implementations are contemplated as well. In one or more aspects, the lift and tilt functions of the lifting device of the container mechanism 200 may be protected from over travel by the use of limit switches and/or limit sensors. Additionally, the lifting device of the container mechanism 200 may be configured for pinch point avoidance by the use of enclosing bellows, which may surround the lifting device of the container mechanism 200 and may be able to flex during operation. Other protection measures and devices are contemplated as well.

Figure 5:
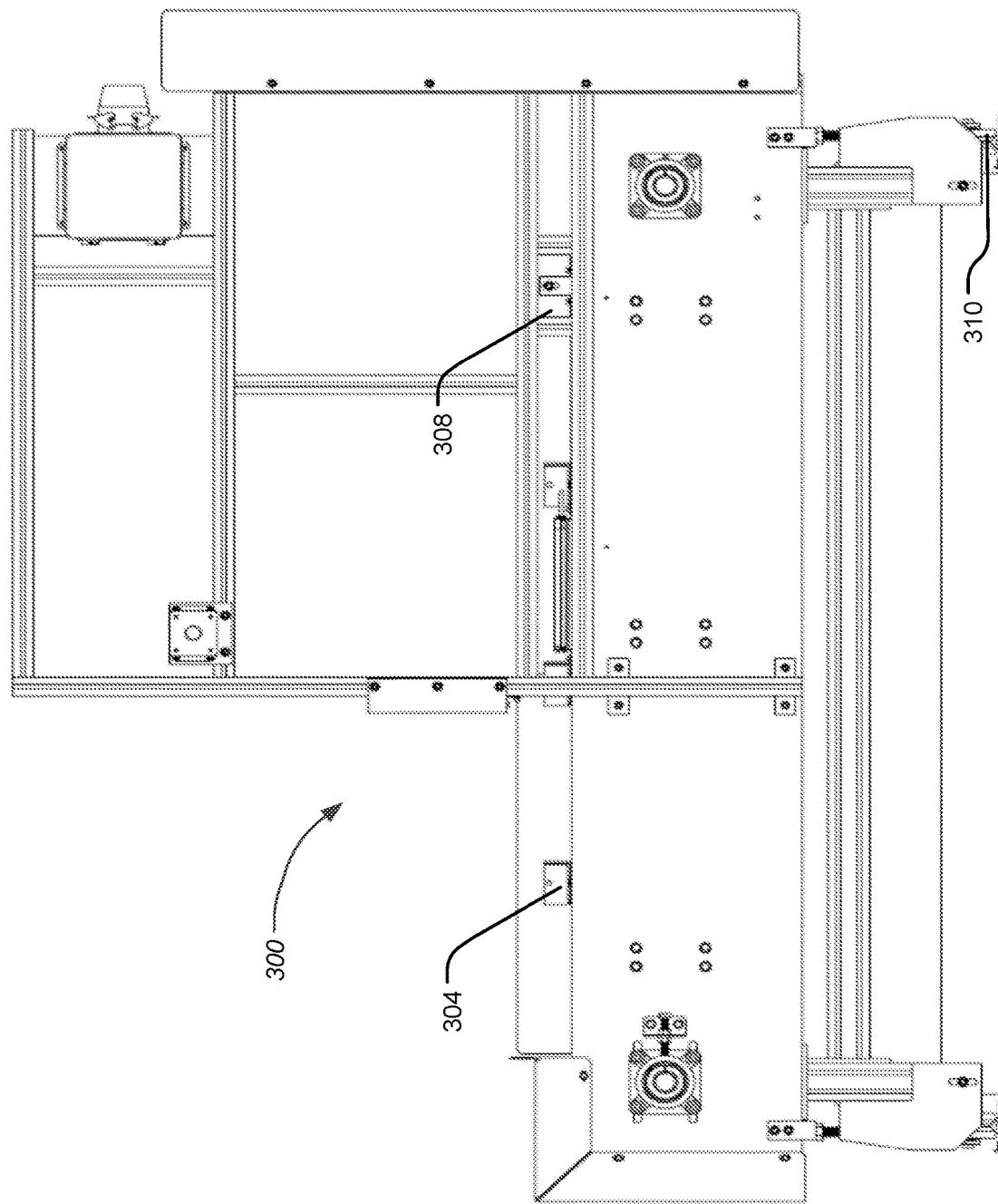
FIG. 5 illustrates a side view of a transfer conveyor in accordance with aspects of the disclosure.

FIG. 5 illustrates a side view of a transfer conveyor in accordance with aspects of the disclosure.

Figure 6:
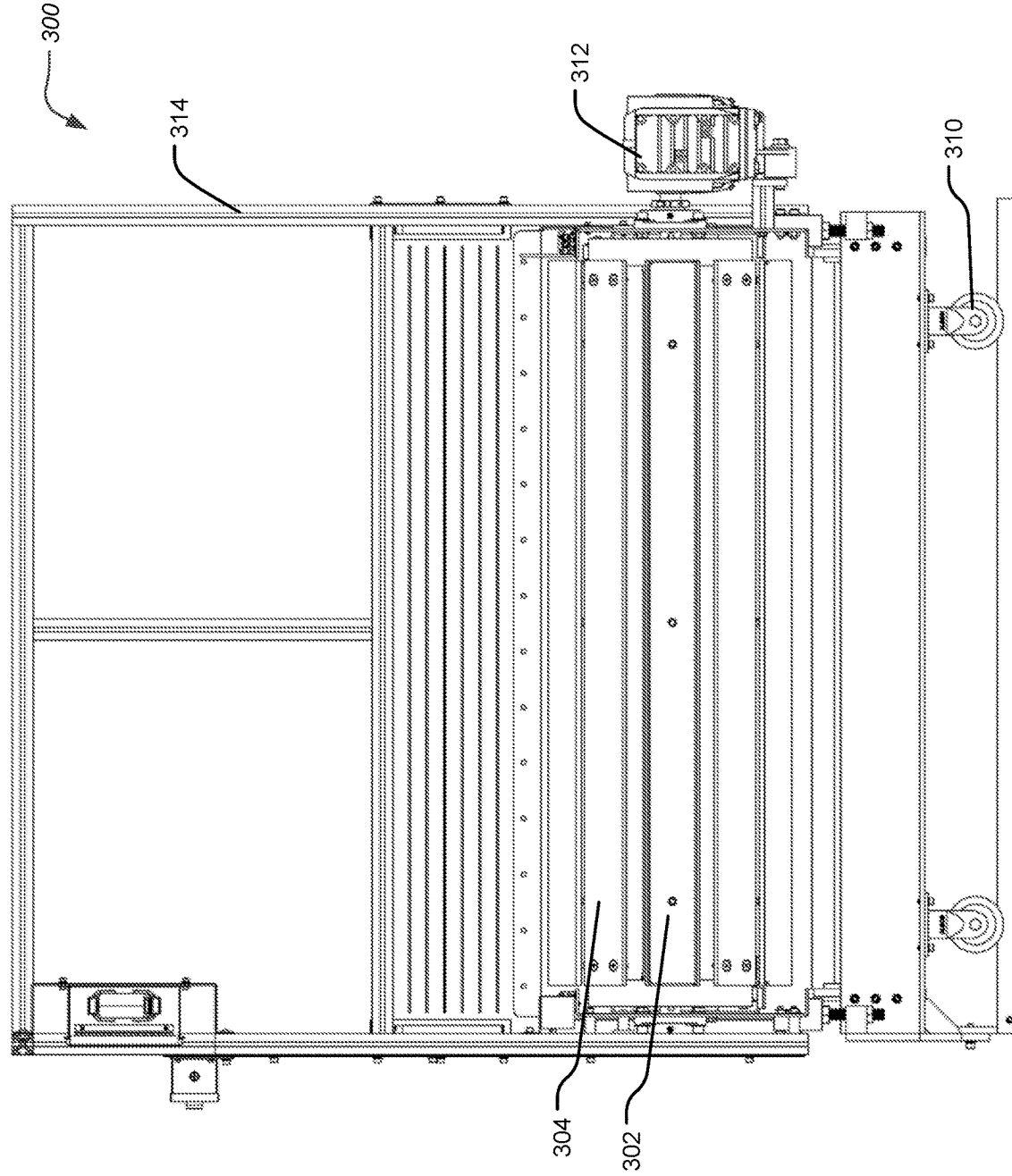
FIG. 6 illustrates a front view of the transfer conveyor of FIG. 5.

FIG. 6 illustrates a front view of the transfer conveyor of FIG. 5.

Figure 7:
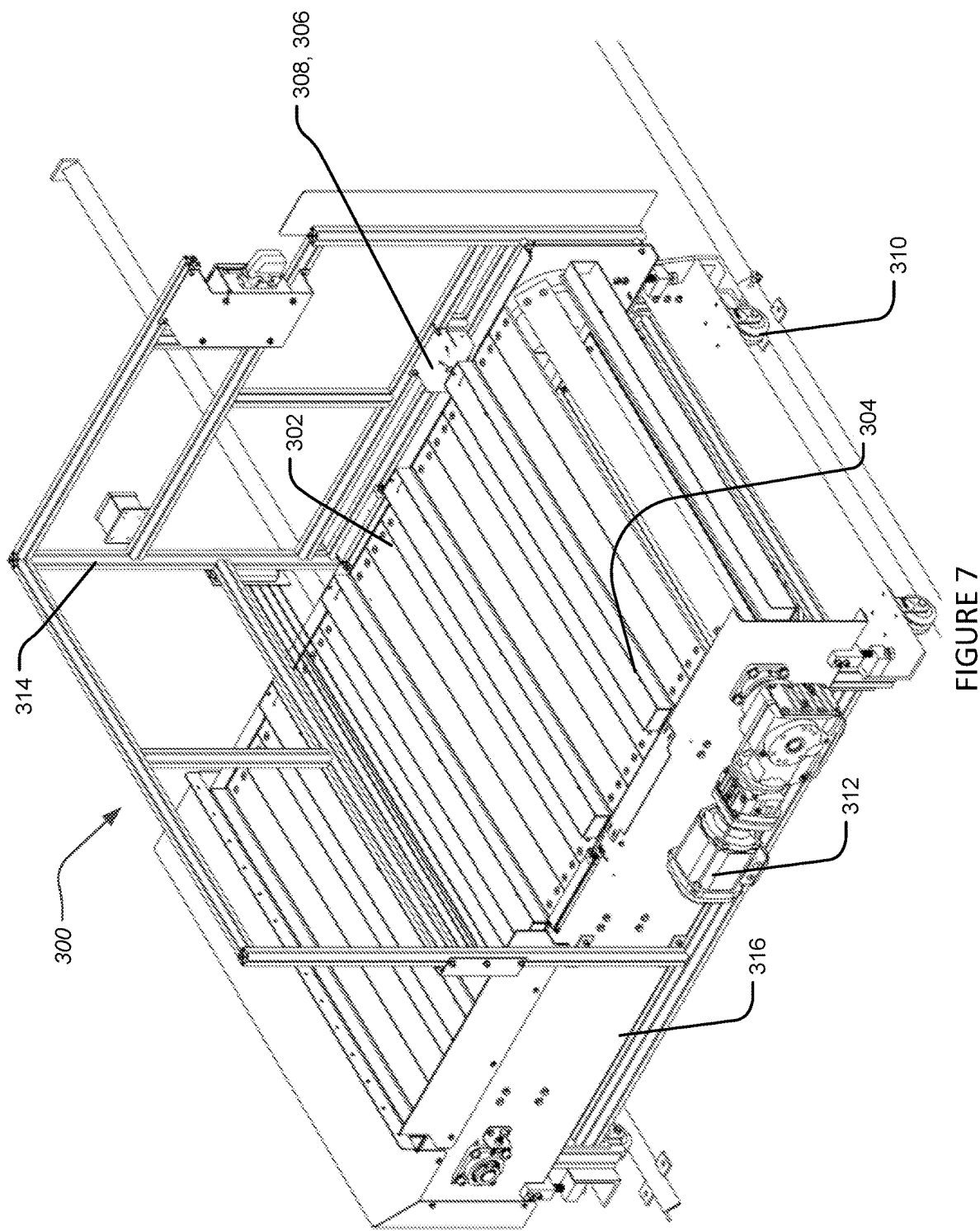
FIG. 7 illustrates a perspective side view of the transfer conveyor of FIG. 5.

FIG. 7 illustrates a perspective side view of the transfer conveyor of FIG. 5.

In particular, FIG. 5, FIG. 6, and FIG. 7 illustrate the transfer conveyor 300. In particular, the transfer conveyor 300 may include a conveyor belt 302, flights or cleats 304, a weapon presence sensor 306, a flight presence sensor 308, a motor 312, casters 310, and/or the like.

The sensors described above or elsewhere described in this disclosure may include one or more of a capacitive transducer, a capacitive displacement sensor, an eddy-current sensor, an ultrasonic sensor, a grating sensor, a hall effect sensor, an inductive non-contact position sensor, a linear variable differential transformer, a multi-axis displacement transducer, a photodiode array, a potentiometer, a proximity sensor (optical), a rotary encoder (angular), and the like.

In one aspect, the transfer conveyor 300 may move weapons laterally to the infeed assembly 900. Thereafter, weapons may move laterally into the ballistic box 404 (illustrated in FIG. 8) with the infeed assembly 900 to a loading position. The transfer conveyor 300 may allow up to two additional weapons to be queued. In other aspects, the ballistic box 404 may not be needed. For example, when the demilitarization system 100 is installed in an enclosure that protects the operators, the ballistic box 404 may not be needed. Additionally, operation of the system may include standard operating procedures to check weapons for live rounds, which may be removed and may make the ballistic box 404 unnecessary.

In one aspect, the conveyor belt 302 may include steel components. In one aspect, the conveyor belt 302 may include the cleats 304. In one aspect, the cleats 304 may be arranged at set distances to keep the weapons separated. The set distances may be 4 inches to 24 inches, 6 inches to 20 inches, 8 inches to 16 inches, 10 inches to 14 inches, 11 inches to 13 inches, or 12.25 inches. In one aspect, the cleats 304 may have a height of 1 inch to 8 inches, 2 inches to 6 inches, 2 inches to 4 inches, or 3 inches. However, the cleats 304 may be arranged at other set distances to keep other sized configurations of the weapons separated.

In one aspect, the conveyor belt 302 may include a wear resistant slat chain. In one aspect, the conveyor belt 302 may include a steel wear resistant slat chain. In one aspect, the conveyor belt 302 may include a wear resistant slat chain that may have a pitch of 1 inch to 8 inches, 2 inches to 6 inches, 2 inches to 5 inches, or 4 inches. However, the conveyor belt 302 may have other sized pitches to keep other sized configurations of the weapons separated.

In one aspect, the motor 312 may be an electric motor. In one aspect, the motor 312 may be an electric motor rated at 1 horsepower (HP)-10 HP, 1 HP-6 HP, 1 HP-2 HP, 1.25 HP-1.75 HP, or 1.5 HP. However, the motor 312 may be implemented with other horsepower ratings as needed.

In one aspect, the motor 312 may operate the conveyor belt 302 to move at a predetermined velocity. In one aspect, the motor 312 may include various drive components to operate the conveyor belt 302 to move at the predetermined velocity. The predetermined velocity may be 1 inch/second to 30 inches/second, 2 inches/second to 24 inches/second, 4 inches/second to 16 inches/second, 5 inches/second to 7 inches/second, or 6 inches/second. In one aspect, the motor 312 and/or the predetermined velocity may be controlled by a computing device.

In one aspect, the flight presence sensor 308 may be utilized for determining a starting and/or a stopping position of the conveyor belt 302. In one aspect, the weapon presence sensor 306 may be utilized for cycle actuation of the conveyor belt 302. In one aspect, the flight presence sensor 308 and the weapon presence sensor 306 may send signals to the computing device.

In one aspect, the transfer conveyor 300 may be mounted on the casters 310 for maintenance and the like. In one aspect, the transfer conveyor 300 may include guarding 316 built into a framework for operator protection. In one aspect, the transfer conveyor 300 may include a safety fence 314 attached to transfer conveyor 300.

The transfer conveyor 300 may only be used for load position 1 and load position 4 as illustrated in FIG. 3. In one aspect, the transfer conveyor 300 may be configured to allow a small queue of weapons such that the operator does not need to load on an exact timed interval to keep pace with the demilitarization system 100. In one aspect, the transfer conveyor 300 may be constructed of a material that is a metallic material, such as steel, designed for longevity, wear, and impact resistance. In other aspects, the transfer conveyor 300 may include a plastic belt in order to be lighter. However, the plastic belt implementation may not have the wear or impact resistance of the steel belt. In one aspect, the transfer conveyor 300 may include a frame. In one aspect, the transfer conveyor 300 may include a steel frame. In one aspect, the transfer conveyor 300 may include a 12-gauge frame.

In one aspect, the transfer conveyor 300 may include a pneumatic actuator mounted on a discharge side. The pneumatic actuator may include at least a compressor (such as the compressor 120), valves, and the like. Other types of actuators are contemplated as well. In this regard, the pneumatic actuator may be configured for transversely moving each weapon from the transfer conveyor 300 to the infeed assembly 900. In one aspect, the pneumatic actuator may be controlled by the computing device.

Figure 8:
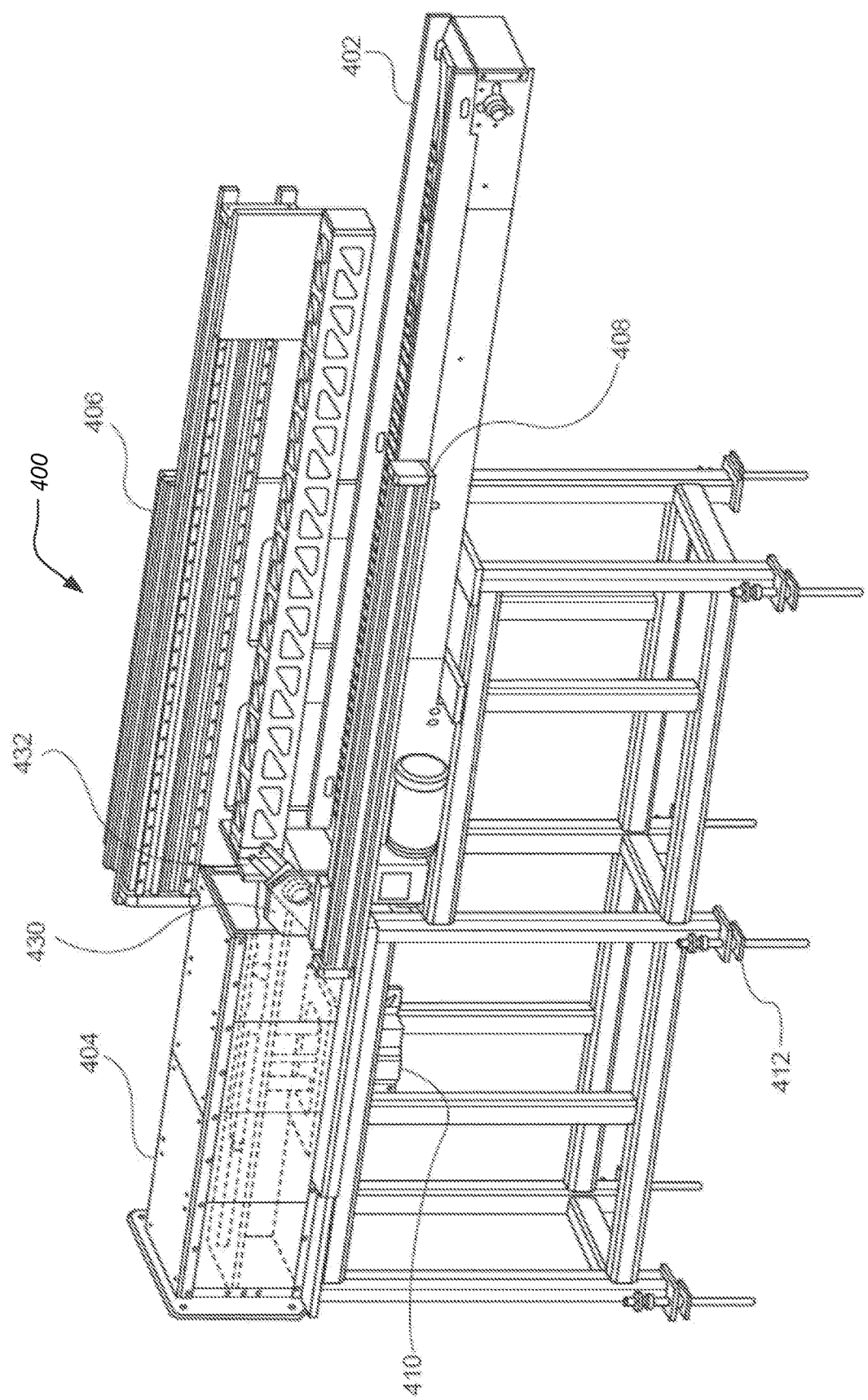
FIG. 8 illustrates a perspective side view of a weapon feed system in accordance with aspects of the disclosure.

FIG. 8 illustrates a perspective side view of a weapon feed system in accordance with aspects of the disclosure.

Figure 9:
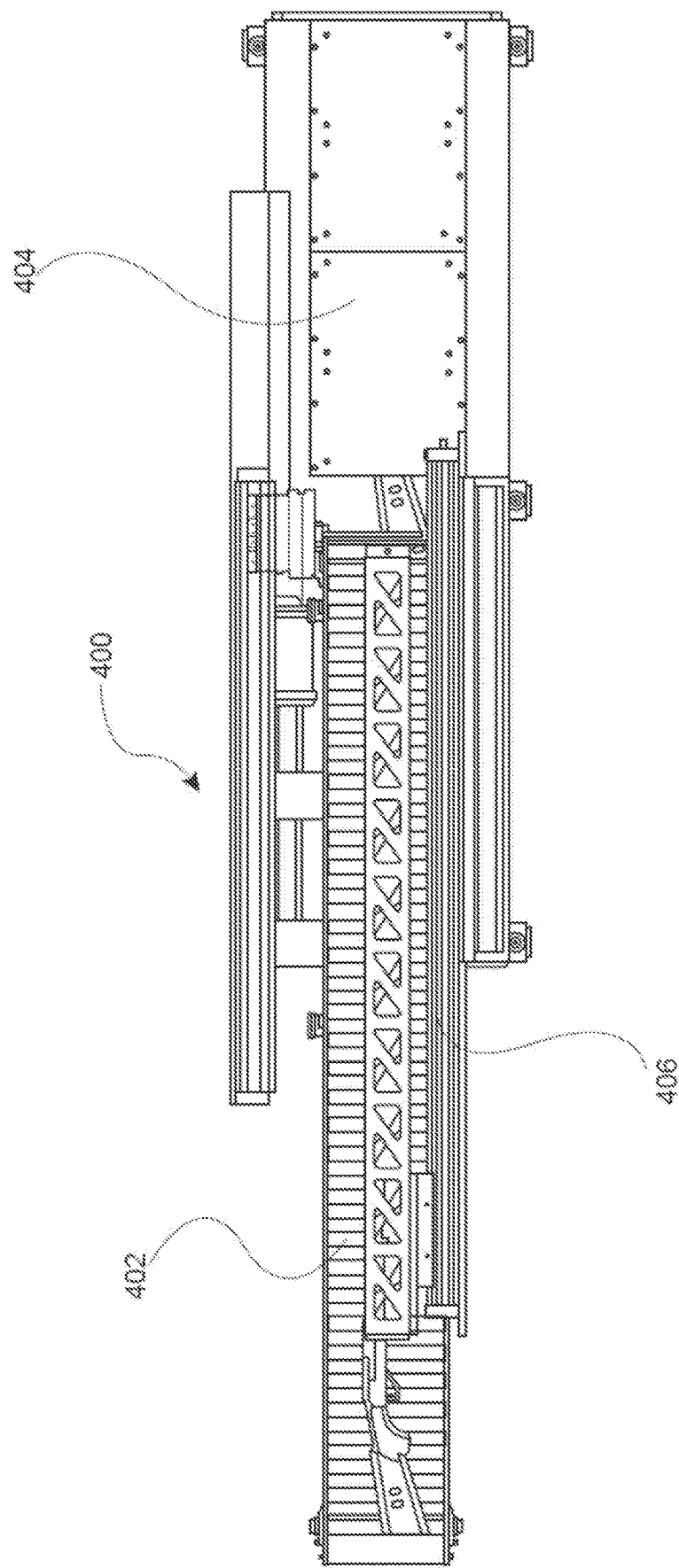
FIG. 9 illustrates a top view of the weapon feed system of FIG. 8.

FIG. 9 illustrates a top view of the weapon feed system of FIG. 8.

Figure 10:
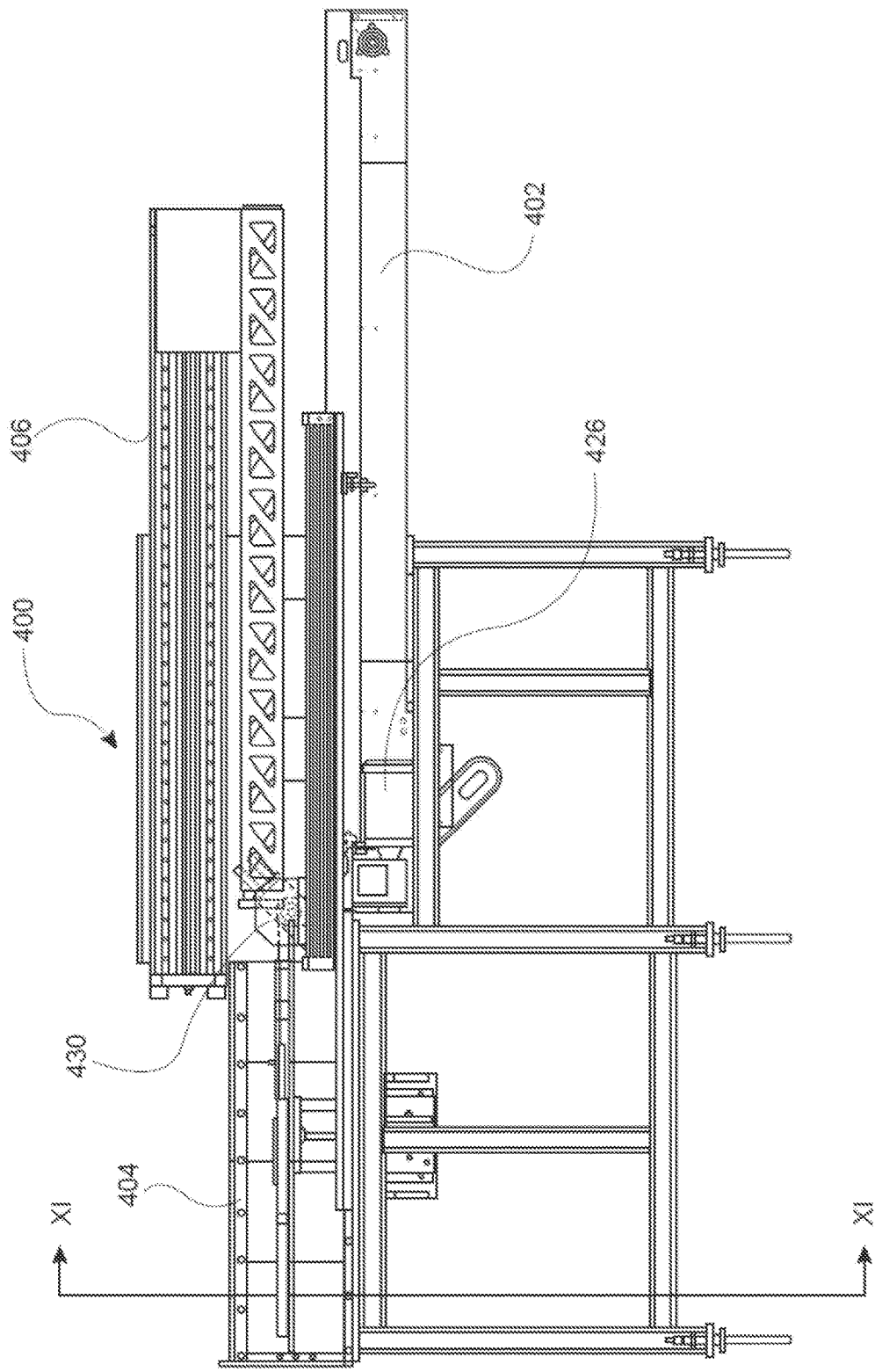
FIG. 10 illustrates a side view of the weapon feed system of FIG. 8.

FIG. 10 illustrates a side view of the weapon feed system of FIG. 8.

Figure 11:
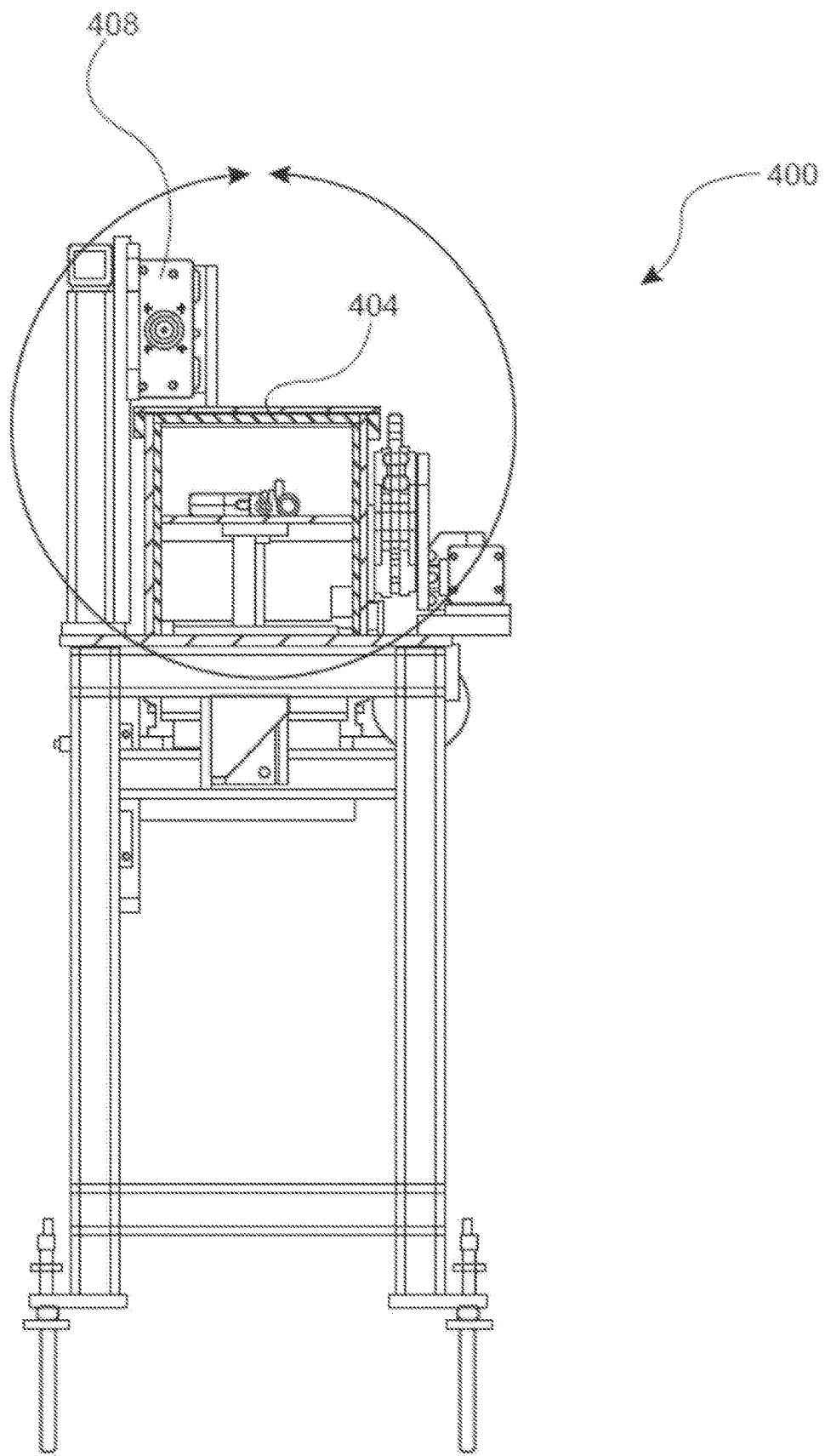
FIG. 11 illustrates a cross-sectional view of the weapon feed system of FIG. 10 along lines XI-XI.

FIG. 11 illustrates a cross-sectional view of the weapon feed system of FIG. 10 along lines XI-XI.

Figure 12:
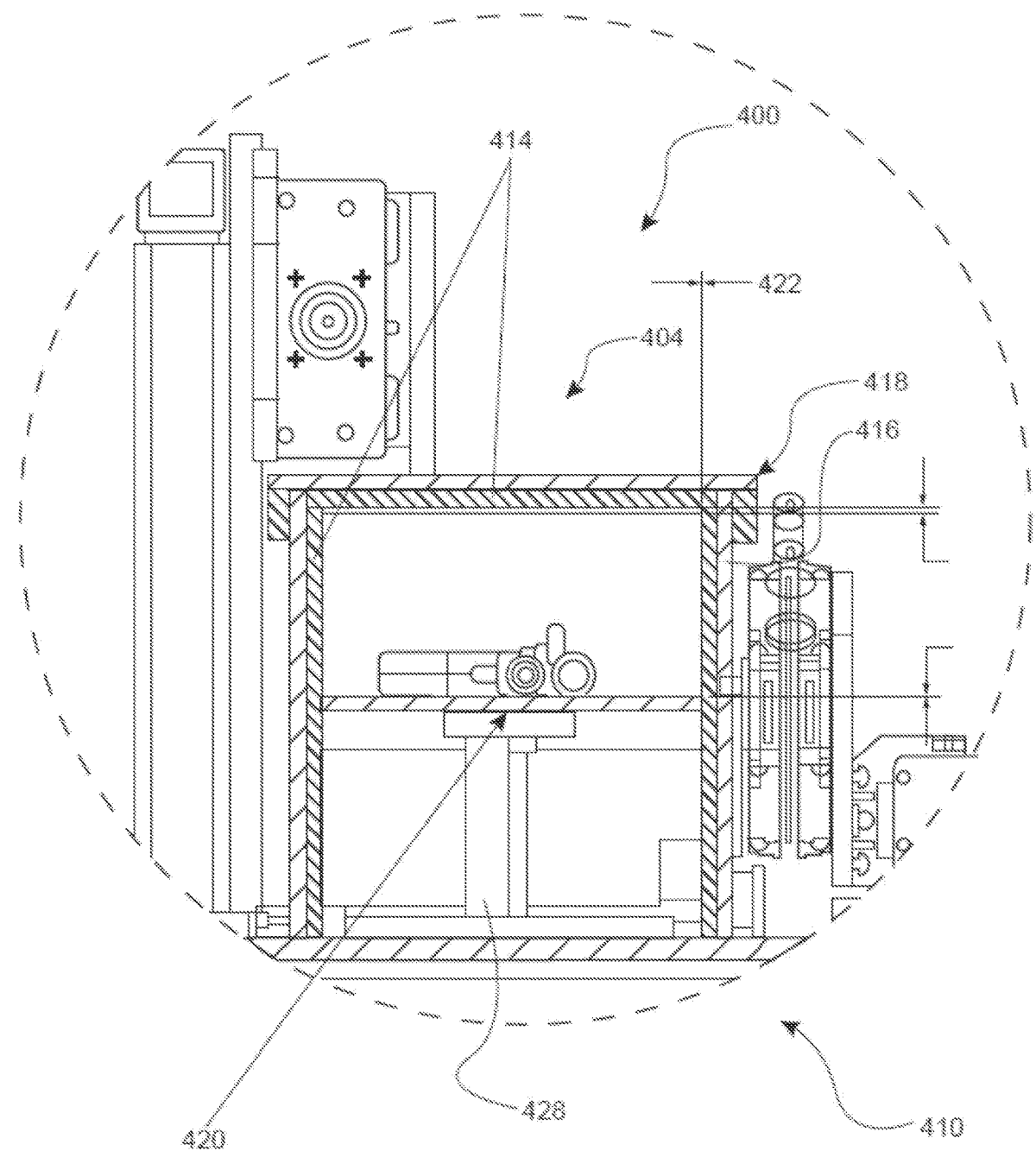
FIG. 12 illustrates a partial cross-sectional view of the weapon feed system of FIG. 10 along lines XI-XI.

FIG. 12 illustrates a partial cross-sectional view of the weapon feed system of FIG. 10 along lines XI-XI.

In particular, the weapon feed system 400 and the infeed assembly 900 may have a similar construction. For brevity of disclosure, the weapon feed system 400 and the infeed assembly 900 will be discussed below with reference to the weapon feed system 400. As illustrated in FIG. 8, the weapon feed system 400 may include an infeed conveyor 402, a ballistic box 404, a feed actuator system 406, a rotary paddle 430, a bolt 432, and the like. Additionally, the weapon feed system 400 may include an inner press infeed shuttle assembly 408, a press infeed elevator assembly 410, a robot leveler assembly 412, and the like.

In one aspect, the rotary paddle 430 may be moved by the feed actuator system 406 that includes an advance cylinder and a paddle rotary cylinder to engage a weapon located on the infeed conveyor 402 and move the weapon into the ballistic box 404. In one aspect, the bolt 432 may be moved by the feed actuator system 406 that includes a bolt actuator to engage crushed weapon parts located in the ballistic box 404 to eject the crushed parts from the ballistic box 404. In one aspect, the rotary paddle 430, the feed actuator system 406, the infeed conveyor 402, the bolt 432, the bolt actuator, and/or the like may be controlled by the computing system. As noted above, in some aspects the ballistic box 404 may not be needed. For example, when the demilitarization system 100 is installed in an enclosure that protects the operators, the ballistic box 404 may not be needed. Additionally, operation of the system may include standard operating procedures to check weapons for live rounds, which may be removed and may make the ballistic box 404 unnecessary.

As illustrated in FIG. 12, the weapon feed system 400 may include wear plate inserts 414, retention plates 416 for inserts, a bolt 418 on top for service, an elevator plate 420, a side gap 422, and the like. In one aspect, the wear plate inserts 414 may be mounted using a trapped design.

The infeed conveyor 402 may transport the weapon into position within the ballistic box 404. The infeed conveyor 402 may move the weapon forward to a sensor and may stop partially inside the infeed conveyor 402. The infeed conveyor 402 feed actuator may push the weapon from the infeed conveyor 402 into the ballistic box 404 with the rotary paddle 430.

In one aspect, the infeed conveyor 402 belt may include materials such as steel and may be configured and designed for longevity, wear, and impact resistance. In one aspect, the infeed conveyor 402 belt may include materials such as plastic to be lighter. In one aspect, the infeed conveyor 402 may include a durable construction and design that may include a 10-gauge frame capable of handling heavier and larger products. In one aspect, the infeed conveyor 402 belt may include a motor 426 and associated drive components.

The entire feed actuator assembly may be contained within the ballistic box 404. All surfaces within the infeed conveyor 402 may be designed to contain a zero-degree impact from a projectile, i.e. normal to any internal face. The infeed conveyor 402 may be designed to resist accidental ordnance discharge by absorbing all associated kinetic energy.

The infeed conveyor 402 design may be configured for control of manufacturability and tolerancing. The feed actuator system 406 may include a feed actuator piston that may ride within the ballistic box 404 and therefore may be straight and square for a free running system. Additionally, the ballistic box 404 may be a fully enclosed box on five sides, with the feed actuator push piston closing off the remaining end to prevent an accidental discharge from leaving the ballistic box 404.

The feed actuator system 406 may function to transport the weapon into the ballistic box 404, increment the weapon in increments, and push the demilitarized material out the back of the ballistic box 404. The increments may be 1 inch to 10 inches, 2 inches to 8 inches, 4 inches to 7 inches, or 6 inches.

This feed actuator system 406 may include a long ball screw driven servo with profile rail guides and bearings, a pneumatic up/down thruster, a pneumatic material eject thruster, and the like. The feed actuator system 406 may be configured to allow the push piston to travel within the infeed conveyor 402 but also retract up to allow the next weapon to enter the ballistic box 404 from the infeed conveyor 402. The push piston may attach to an actuator carriage and may be sized to fit the infeed conveyor 402. The push piston may have a leading face and a following face to prevent accidental discharges from reaching the infeed area of the ballistic box 404.

The feed actuator system 406 may be configured for positional accuracy when indexing the weapons through the ballistic box 404. This actuator may use a ball screw for tighter positioning and better force control. As illustrated in FIG. 12, the press infeed elevator assembly 410 may include an up/down cylinder 428. The up/down cylinder 428 may be a pneumatic thruster and may only move to two positions (full up retract or full down feed). The feed actuator system 406 may include an eject cylinder that may be implemented as a pneumatic thruster. The eject cylinder may be configured to provide an extra feed length to push the crushed material out of the ballistic box 404. In some aspects, this may be a fixed distance and may not require a positioning capability of a servo.

Figure 13:
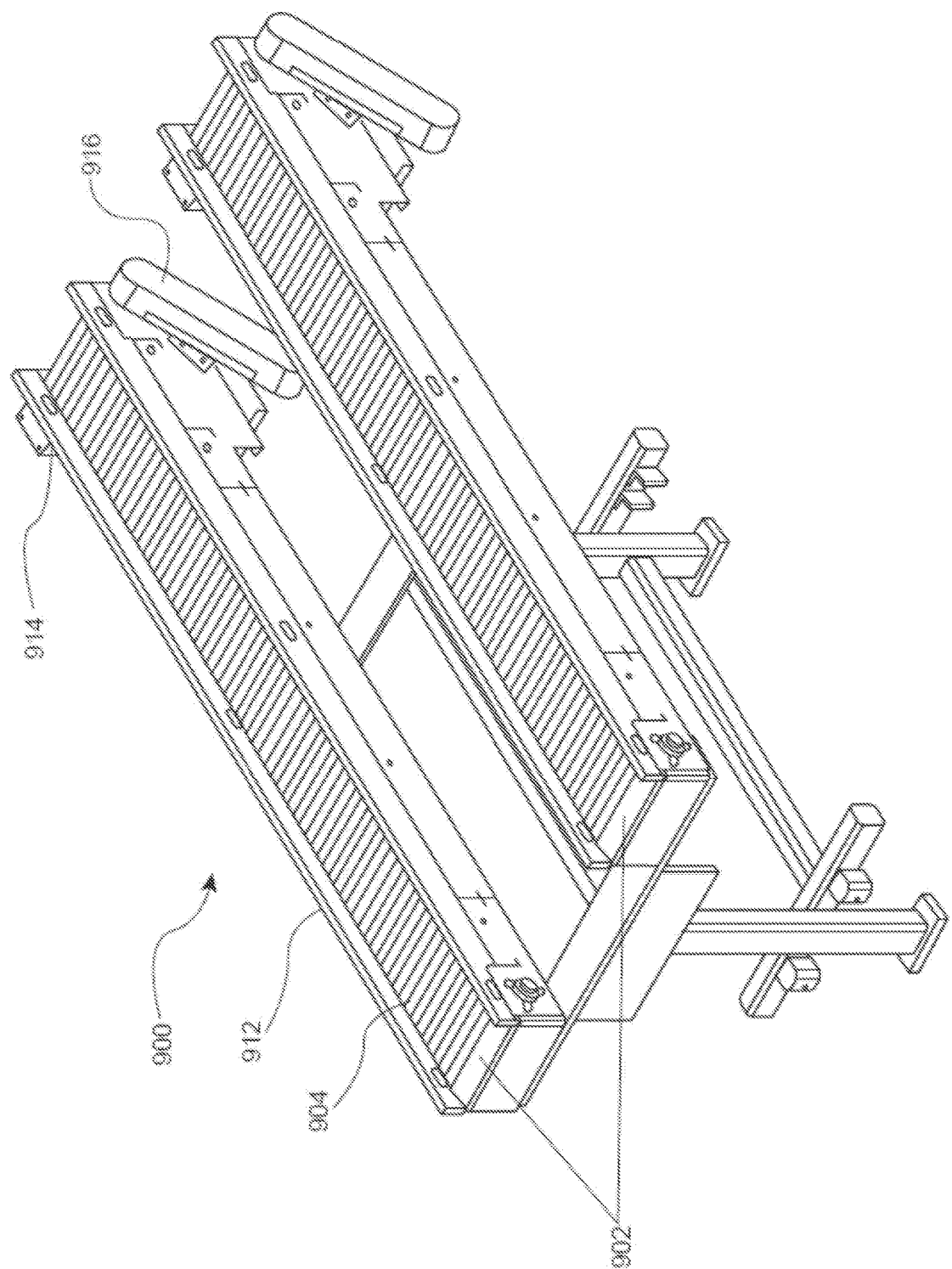
FIG. 13 illustrates a perspective view of an infeed assembly according to an aspect of the disclosure.

FIG. 13 illustrates a perspective view of an infeed assembly according to an aspect of the disclosure.

Figure 14:
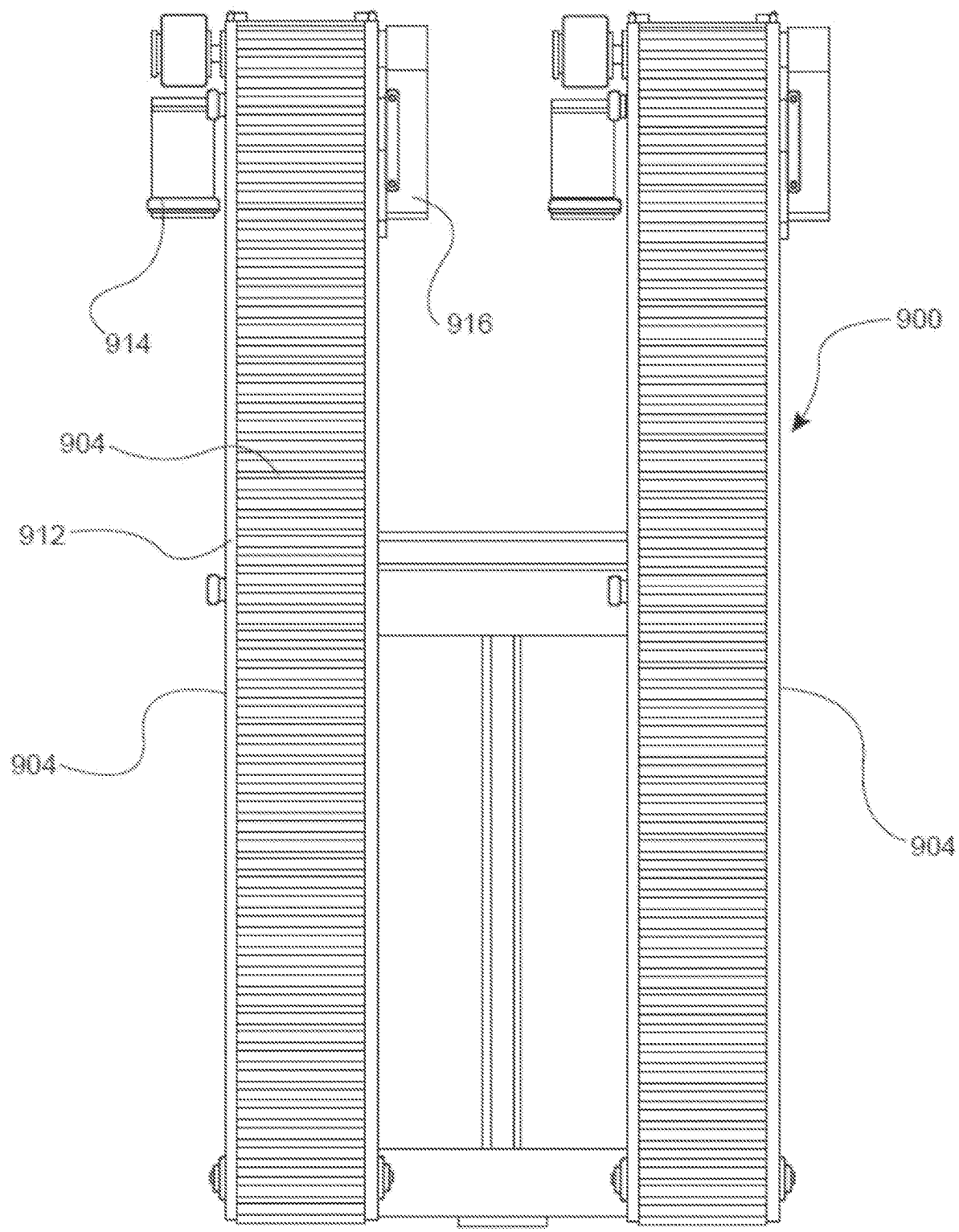
FIG. 14 illustrates a top view of the infeed assembly of FIG. 13.

FIG. 14 illustrates a top view of the infeed assembly of FIG. 13.

Figure 15:
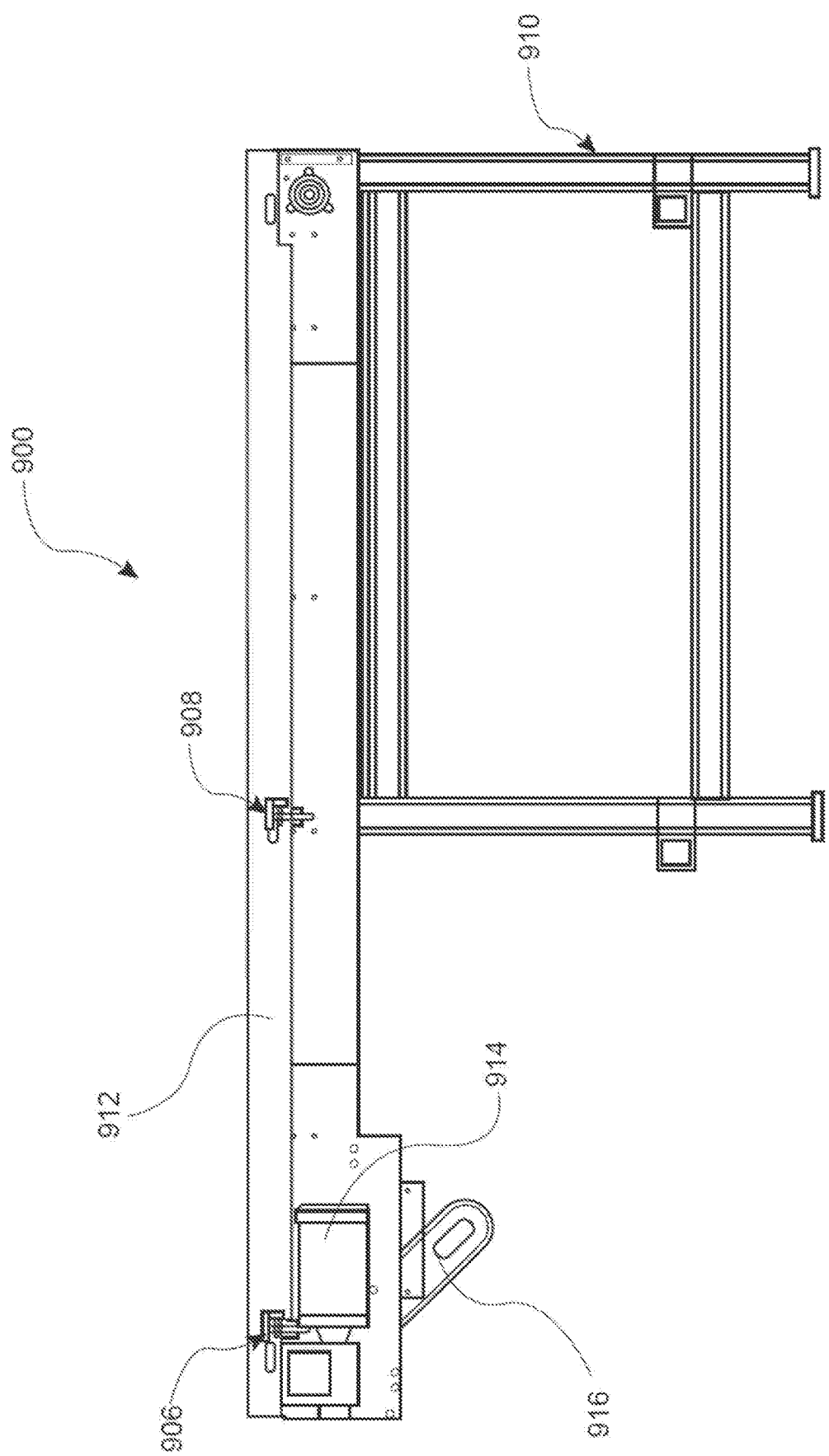
FIG. 15 illustrates a side view of the infeed assembly of FIG. 13.

FIG. 15 illustrates a side view of the infeed assembly of FIG. 13.

In particular, FIG. 13 illustrates the infeed assembly 900. The infeed assembly 900 may include an infeed ramp 902, infeed conveyors 904, a part present sensor advance cylinder pick up 906, a part present sensor operator load 908, a docking framework 910, guide walls 912, a motor 914, a drive mechanism 916. The infeed ramp 902 may include a bump stop for loading. In one aspect, the infeed assembly 900, the infeed conveyors 904, the motor 914, and the like may be controlled by the computing device. In one aspect, the part present sensor advance cylinder pick up 906, the part present sensor operator load 908, and the like may send signals to the computing device.

Figure 16:
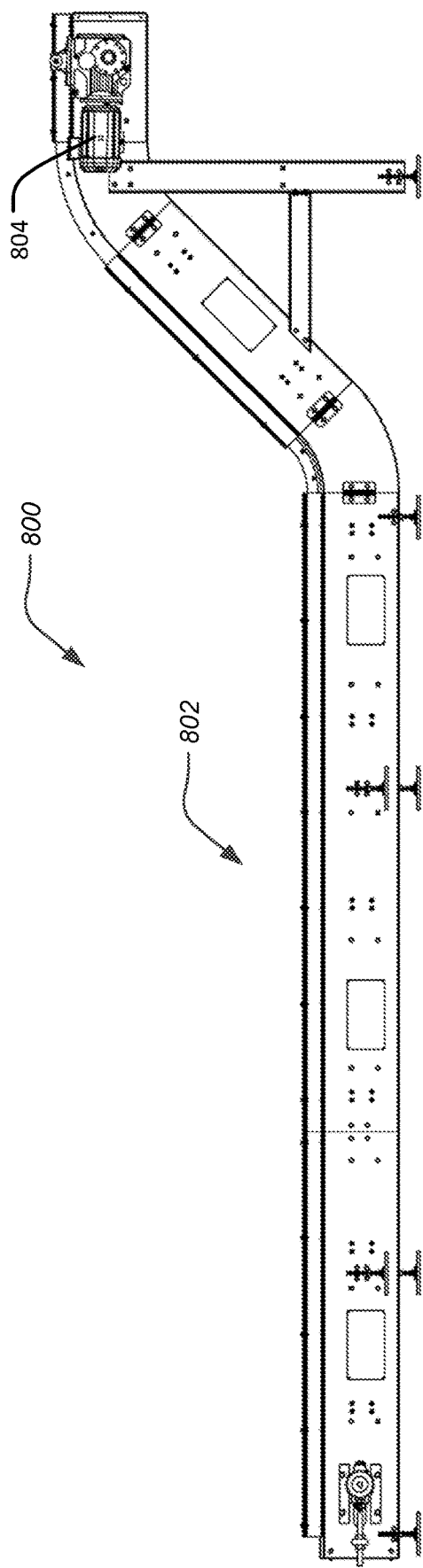
FIG. 16 illustrates a side view of a recycle conveyor according to an aspect of the disclosure.

FIG. 16 illustrates a side view of a recycle conveyor according to an aspect of the disclosure.

Figure 17:
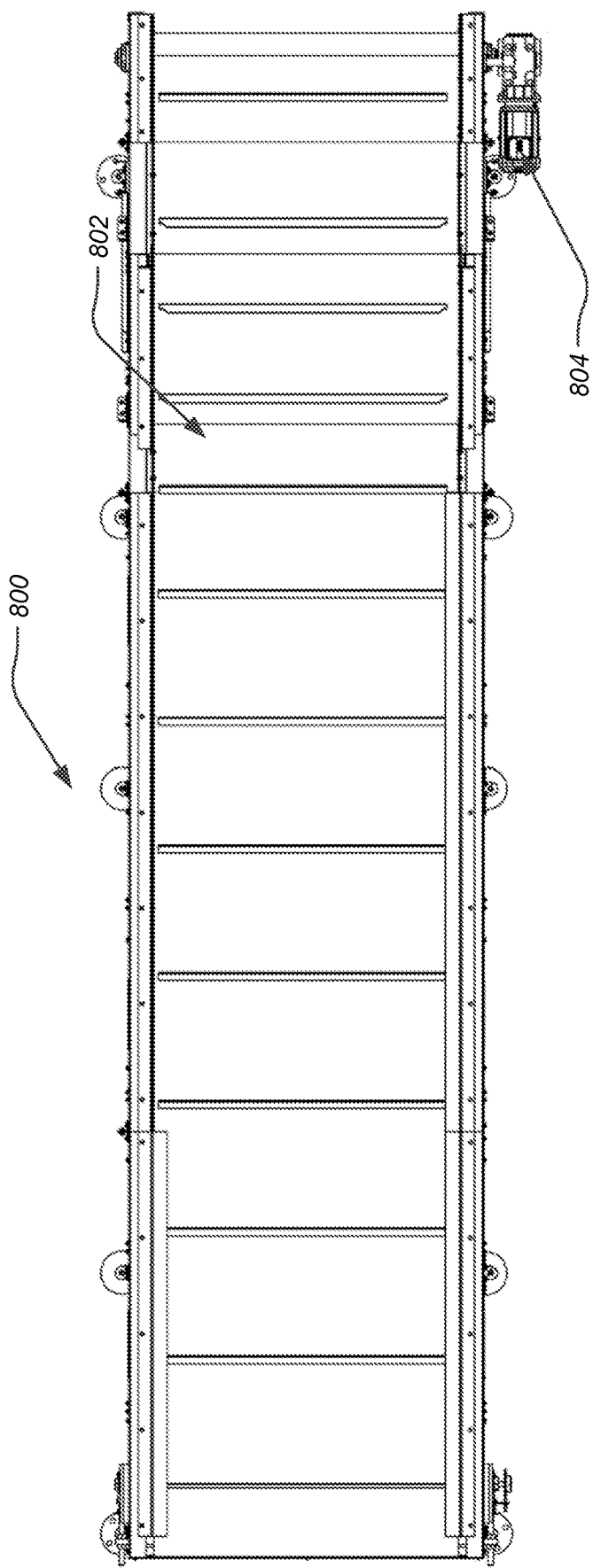
FIG. 17 illustrates a top view of the recycle conveyor of FIG. 16.

FIG. 17 illustrates a top view of the recycle conveyor of FIG. 16.

In particular, FIG. 16 and FIG. 17 illustrate the recycle conveyor 800. The recycle conveyor 800 may include a belt 802, a drive unit 804, and the like. In one aspect, the belt 802 may include metallic materials such as steel. In one aspect, the drive unit 804 may include electric motor. In one aspect, the drive unit 804 may include an electric motor controlled by a variable frequency drive. In one aspect, the drive unit 804 may be configured to move the belt 802 at least 30 feet per minute. In one aspect, the recycle conveyor 800, the belt 802, the drive unit 804, and/or the like may be controlled by the computing device.

In one aspect, the belt 802 may be configured to carry very small pieces of material. In one aspect, the belt 802 may be structured and configured to account for up to 24" of drop from crushed weapon materials (for example 25 pounds). In one aspect, the belt 802 may be wider than 51 inches (enough for 50.5" weapon length). In one aspect, the recycle conveyor 800 may be configured for flights sufficient to lift weapon up to a dump height.

Figure 18:
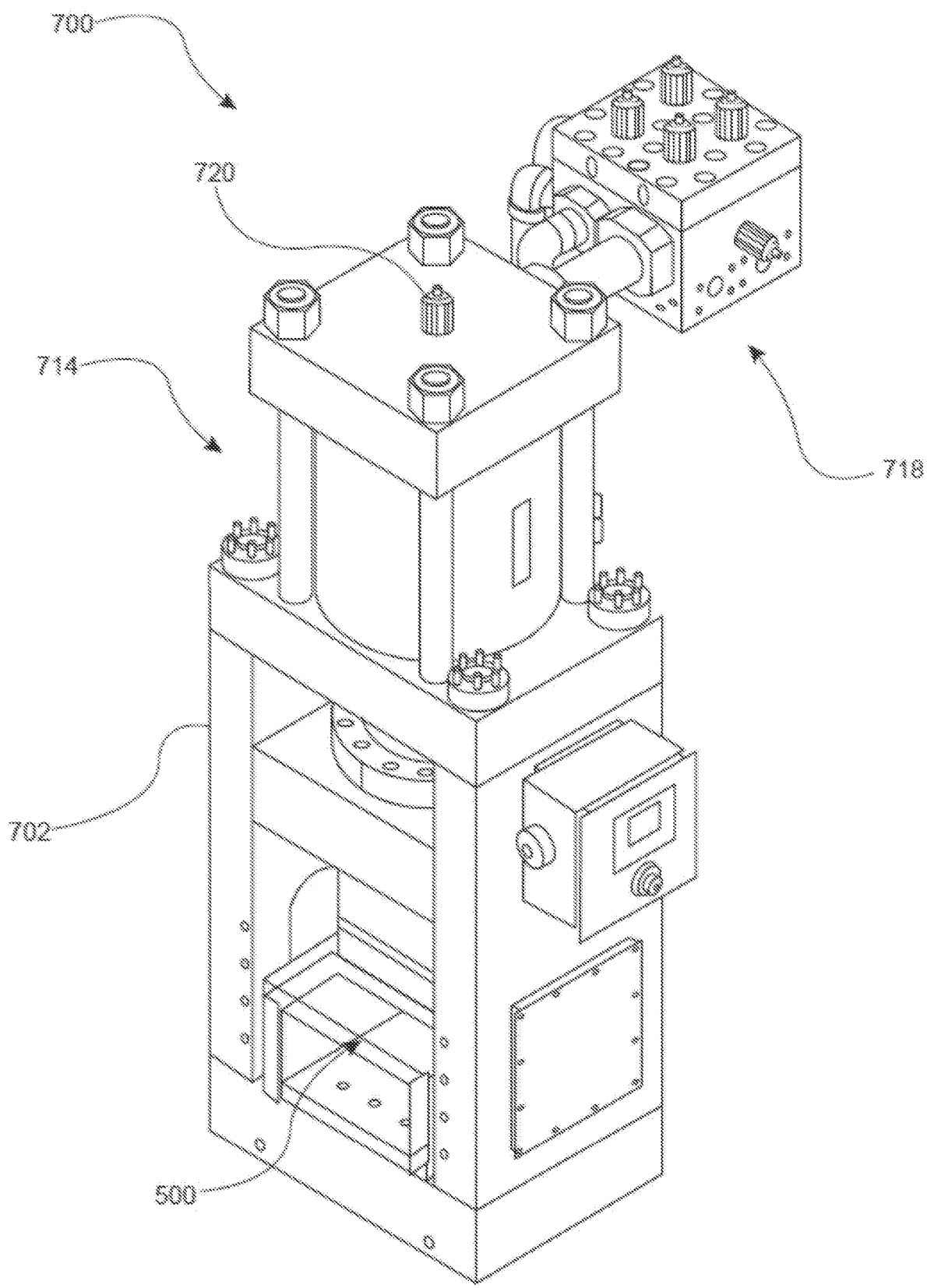
FIG. 18 illustrates a perspective view of a press assembly according to an aspect of the disclosure.

FIG. 18 illustrates a perspective view of a press assembly according to an aspect of the disclosure.

Figure 19:
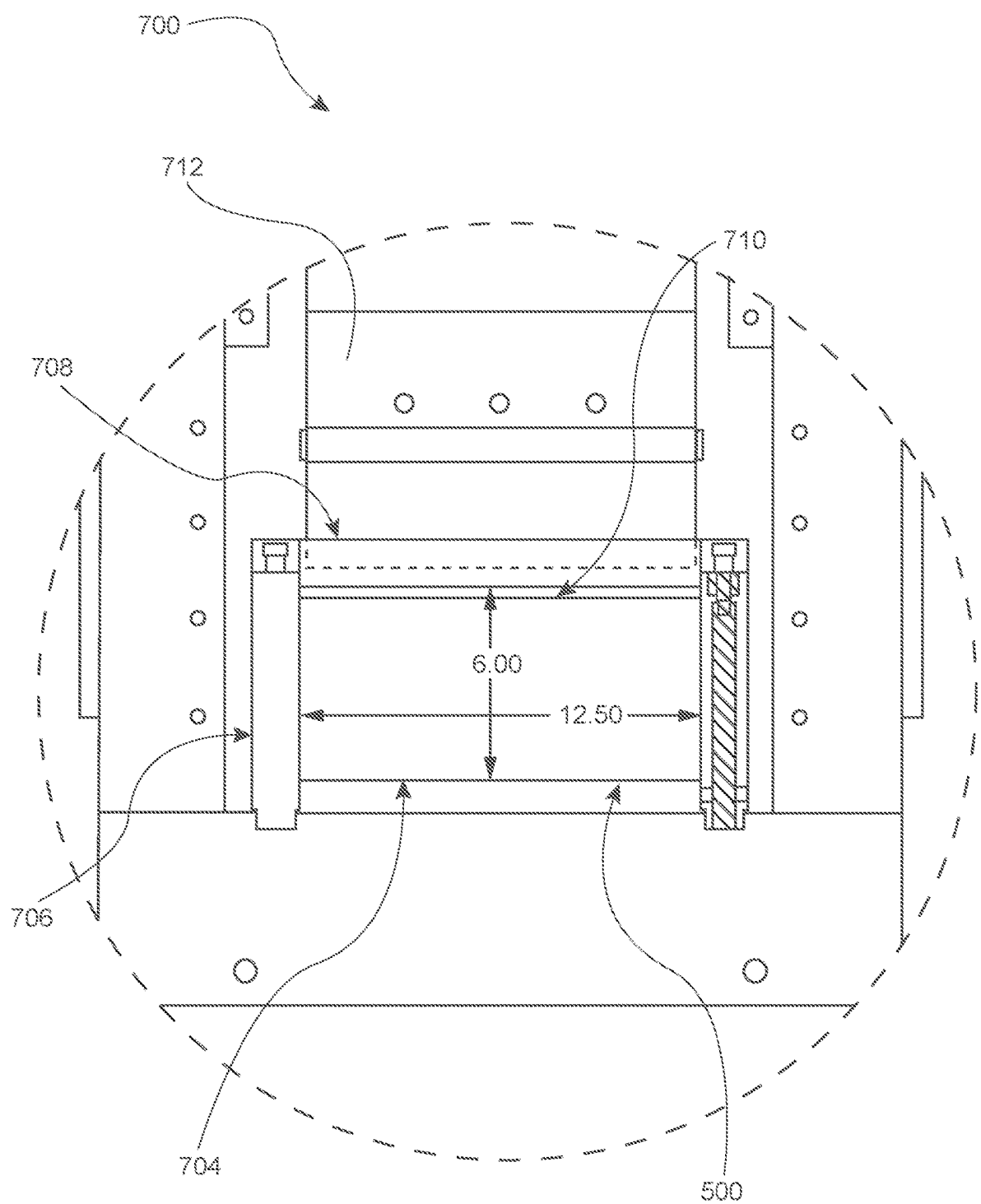
FIG. 19 illustrates a partial front view of the press assembly according to FIG. 18.

FIG. 19 illustrates a partial front view of the press assembly according to FIG. 18.

In particular, FIG. 18 illustrates the press assembly 700. The press assembly 700 may include a hydraulic piston and a cylinder 714, hydraulic connections 718, a stroke position sensor 720, and the like. In one aspect, the press assembly 700, the hydraulic piston, and the like may be controlled by the computing device. In one aspect, the stroke position sensor 720, and the like may send signals to the computing device.

FIG. 19 illustrates that the press assembly 700 may include a press inner structure 702, the crush box 500, a lower wear plate 704, side plates 706, an upper guide plate 708, an upper wear plate 710, the tool 712, and the like.

Figure 20:
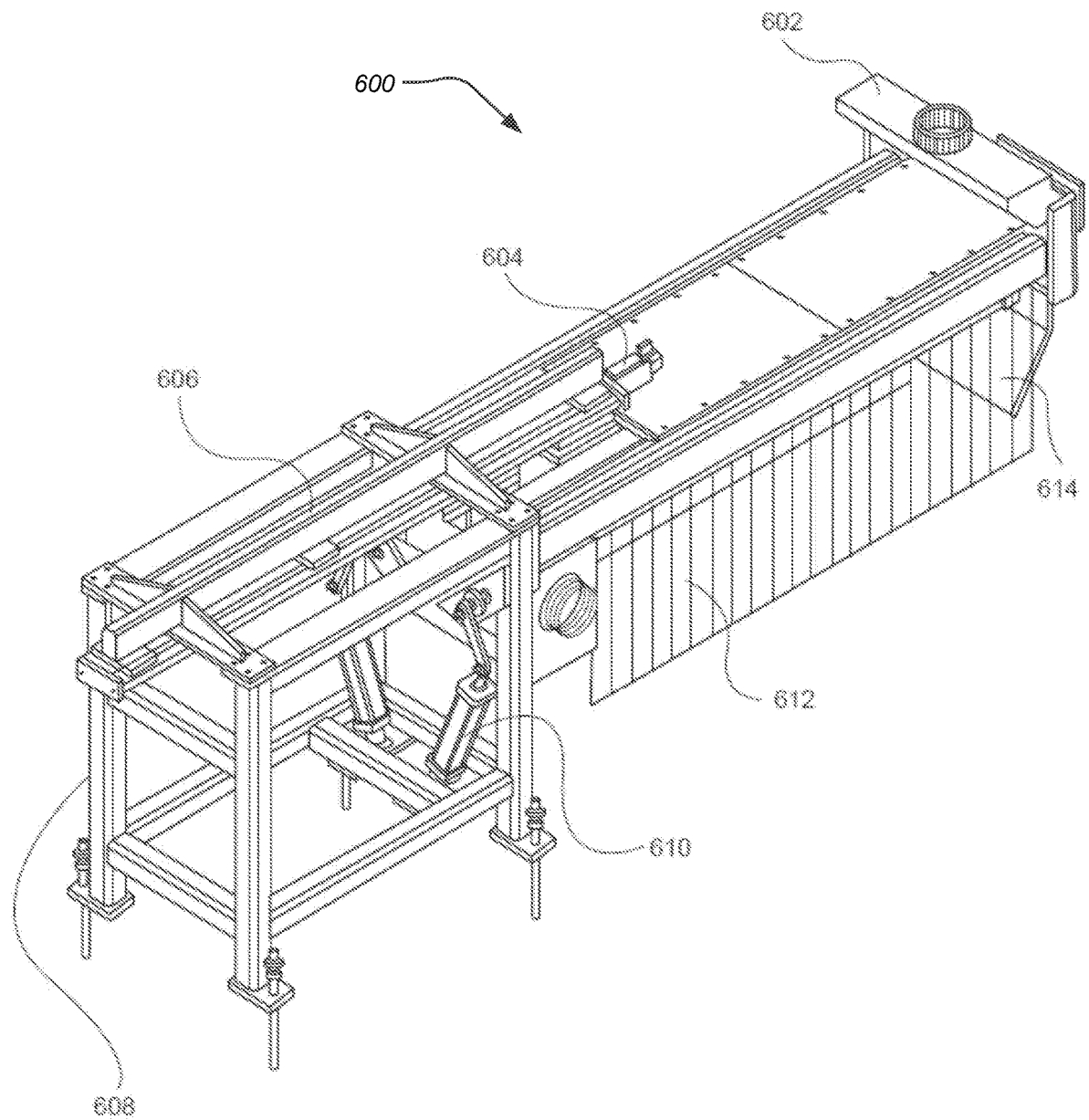
FIG. 20 illustrates a perspective view of a rear back gauge system according to an aspect of the disclosure.

FIG. 20 illustrates a perspective view of a rear back gauge system according to an aspect of the disclosure.

Figure 21:
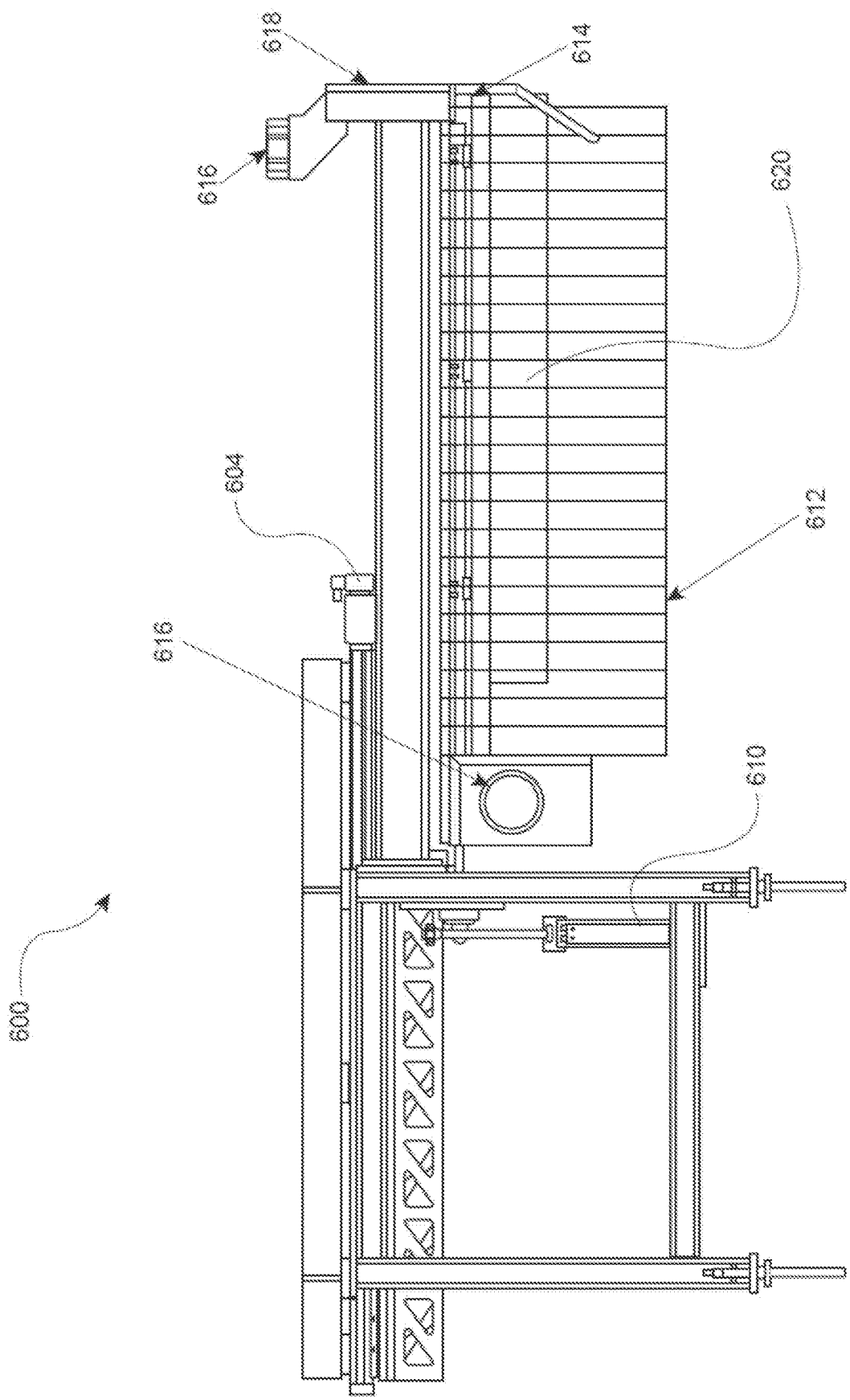
FIG. 21 illustrates a side view of the rear back gauge system according to FIG. 20.

FIG. 21 illustrates a side view of the rear back gauge system according to FIG. 20.

Figure 22:
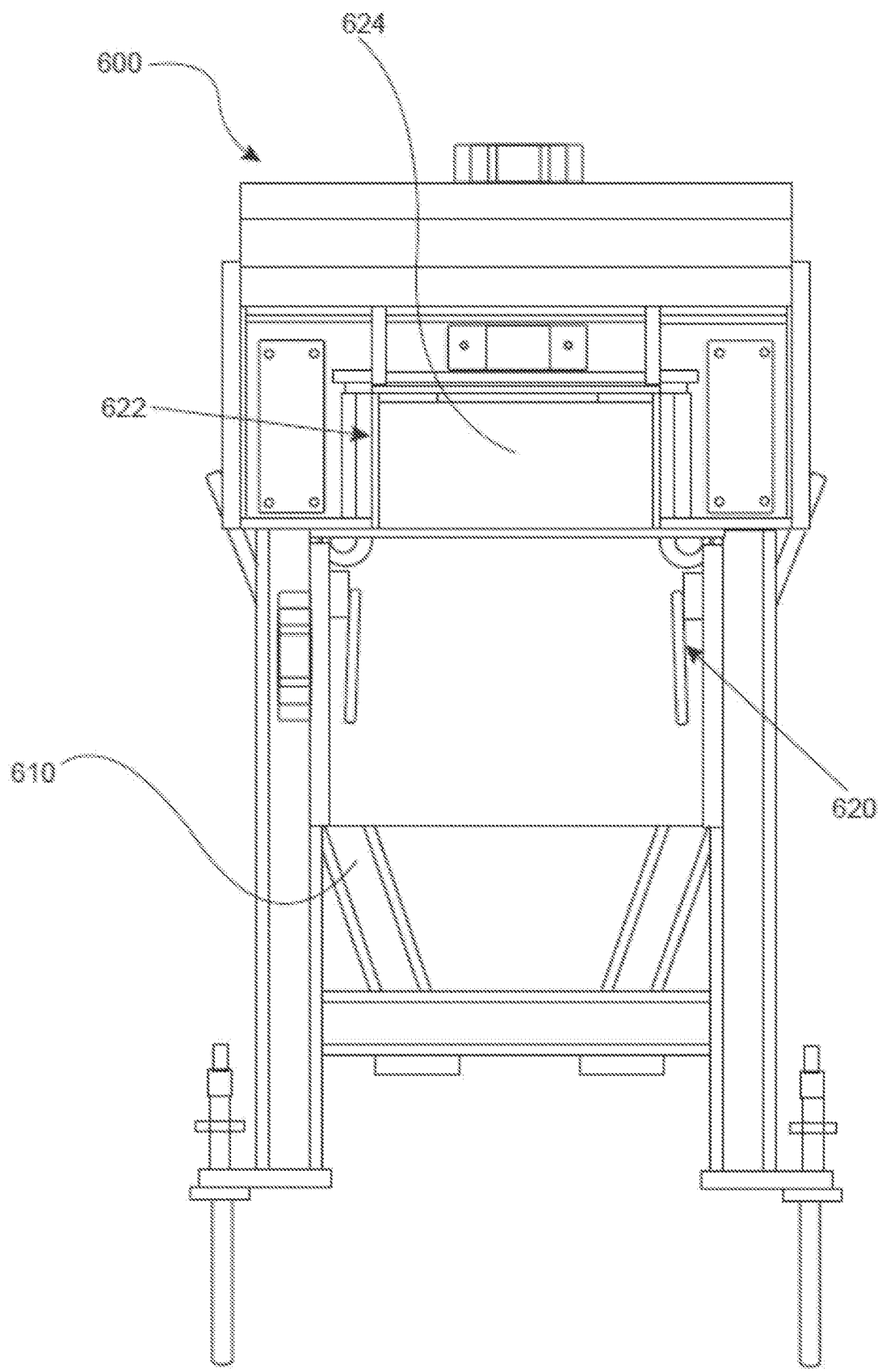
FIG. 22 illustrates a back view of the rear back gauge system according to FIG. 20.

FIG. 22 illustrates a back view of the rear back gauge system according to FIG. 20.

In particular, FIG. 20 illustrates the rear back gauge system 600. The rear back gauge system 600 may include a press connection face 602, a back gauge servo motor 604, a back gauge actuator mounting weldment 606, a support frame 608, air cylinders 610 to power and/or move the ejection doors 620, dust containment curtains 612, a deflector 614, exhaust hood connection points 616, a draw connection 618, the ejection doors 620, wear plates 622, seal structure 624, and the like. In one aspect, the rear back gauge system 600, the back gauge servo motor 604, the air cylinders 610, the ejection doors 620, and the like may be controlled by the computing device.

The dust containment curtains 612 may be sized arranged for guiding material to the recycle conveyor 800. The ejection doors 620 may be closed and an associated safety sensor may monitor the position of the ejection doors 620 and may not allow crushing if ejection doors 620 are open. The seal structure 624 may be configured to seal off the ejection chamber during pressing in response to a back gauge piston. In one aspect, the associated safety sensor may send signals to the computing device.

Figure 23:
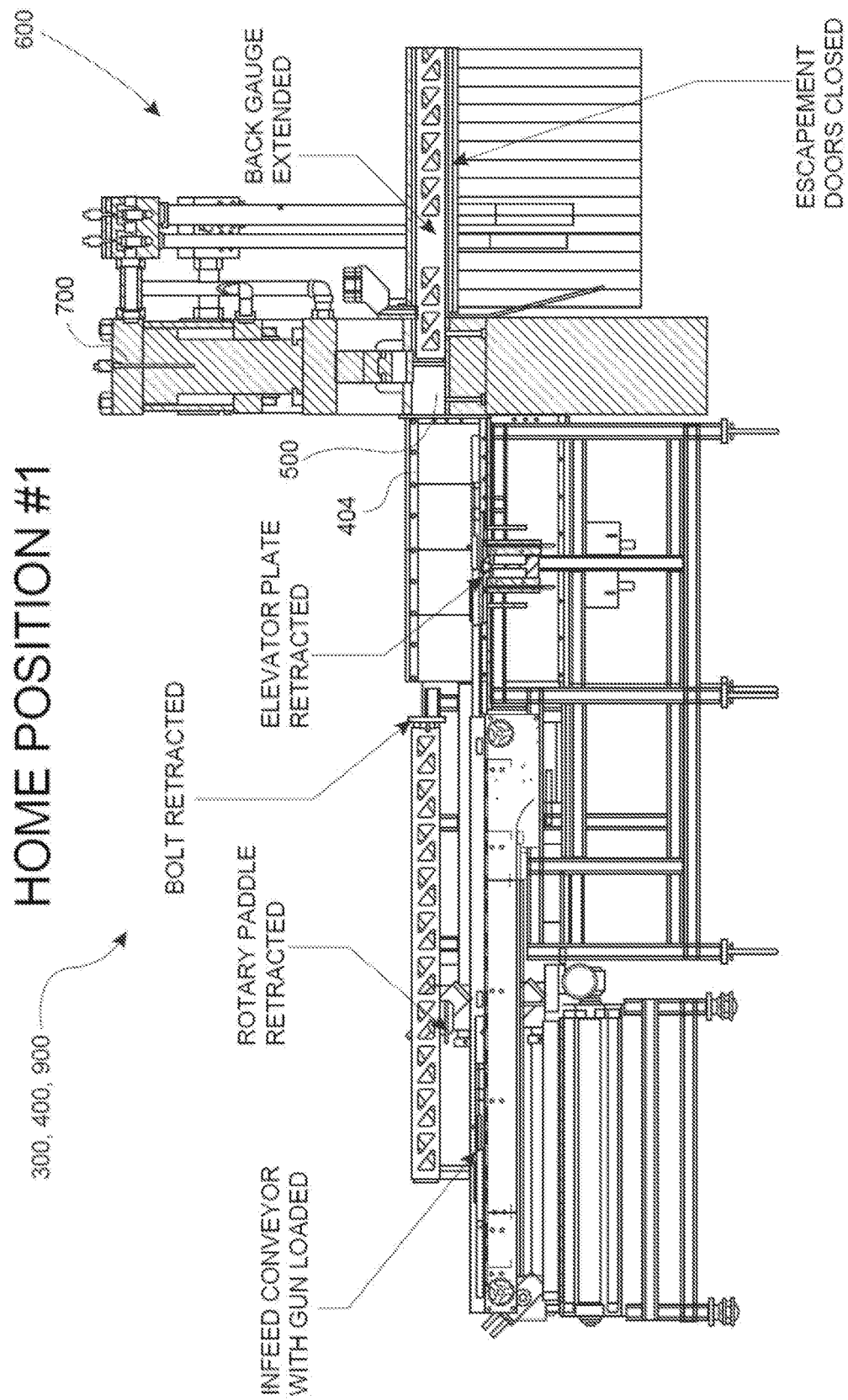
FIG. 23 illustrates a side view of the demilitarization system in a home position according to the principles of the disclosure.

FIG. 23 illustrates a side view of the demilitarization system in a home position according to the principles of the disclosure.

Figure 24:
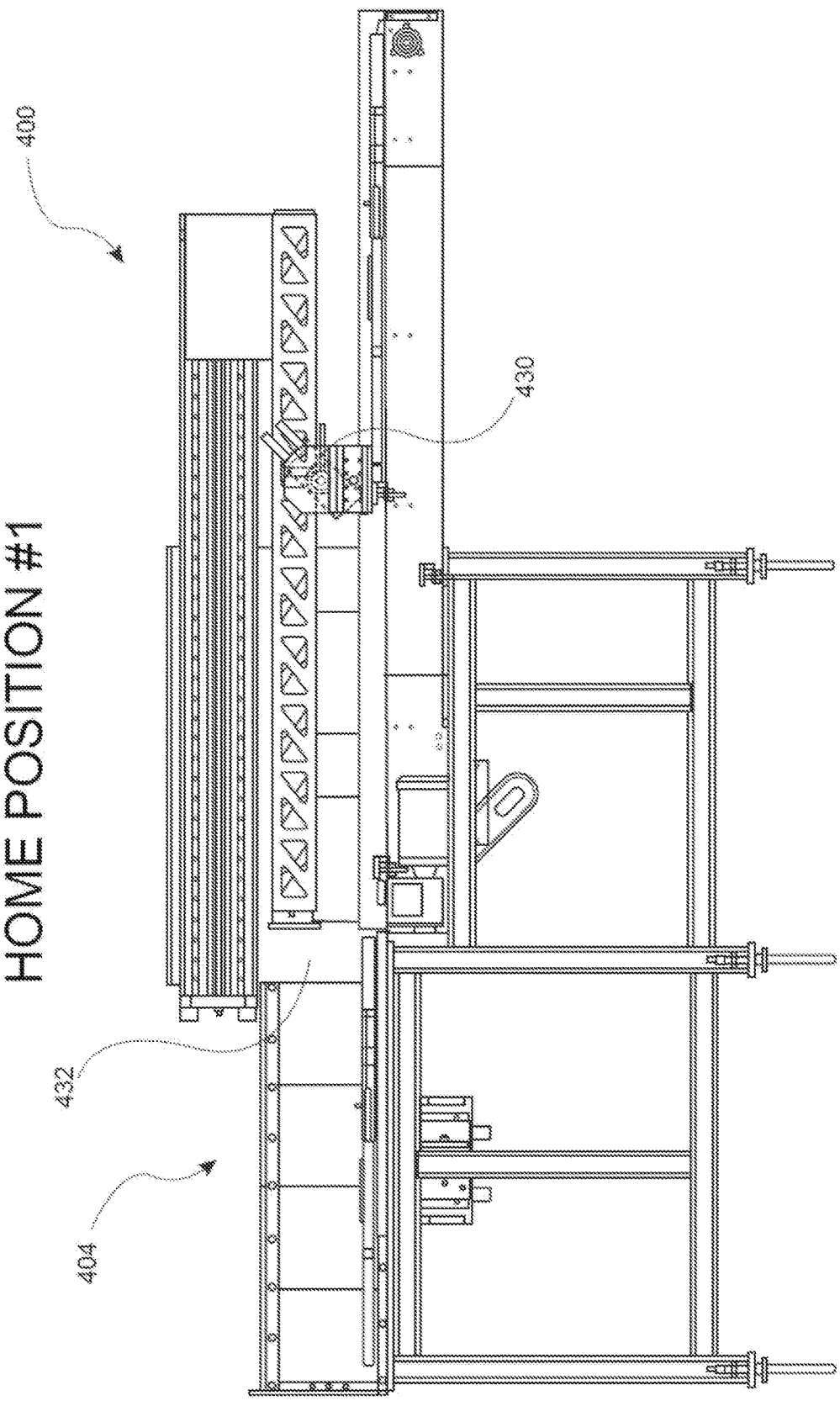
FIG. 24 illustrates a side view of the weapon feed system in a home position according to the principles of the disclosure.

FIG. 24 illustrates a side view of the weapon feed system in a home position according to the principles of the disclosure.

Figure 25:
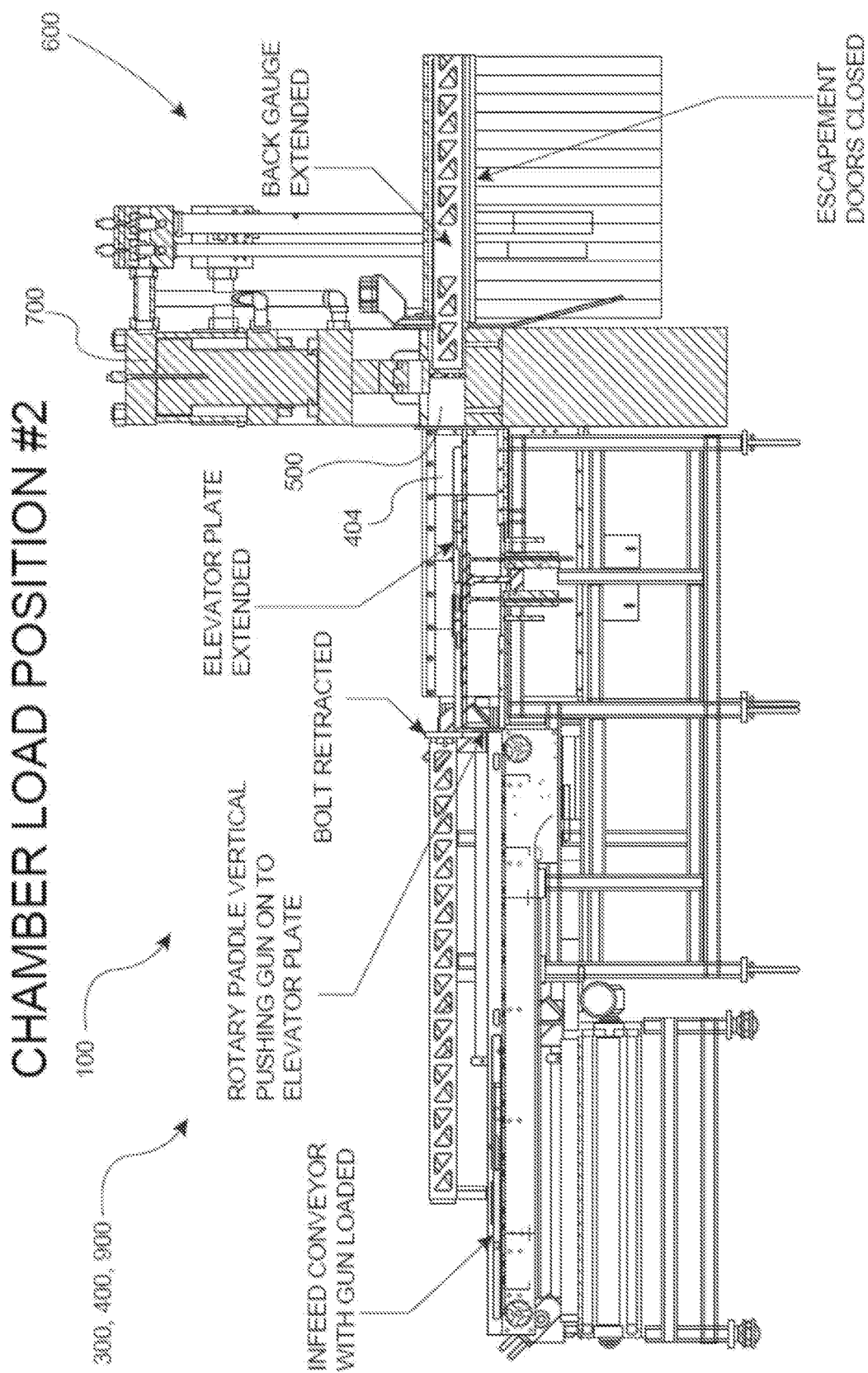
FIG. 25 illustrates a side view of the demilitarization system in a chamber load position according to the principles of the disclosure.

FIG. 25 illustrates a side view of the demilitarization system in a chamber load position according to the principles of the disclosure.

Figure 26:
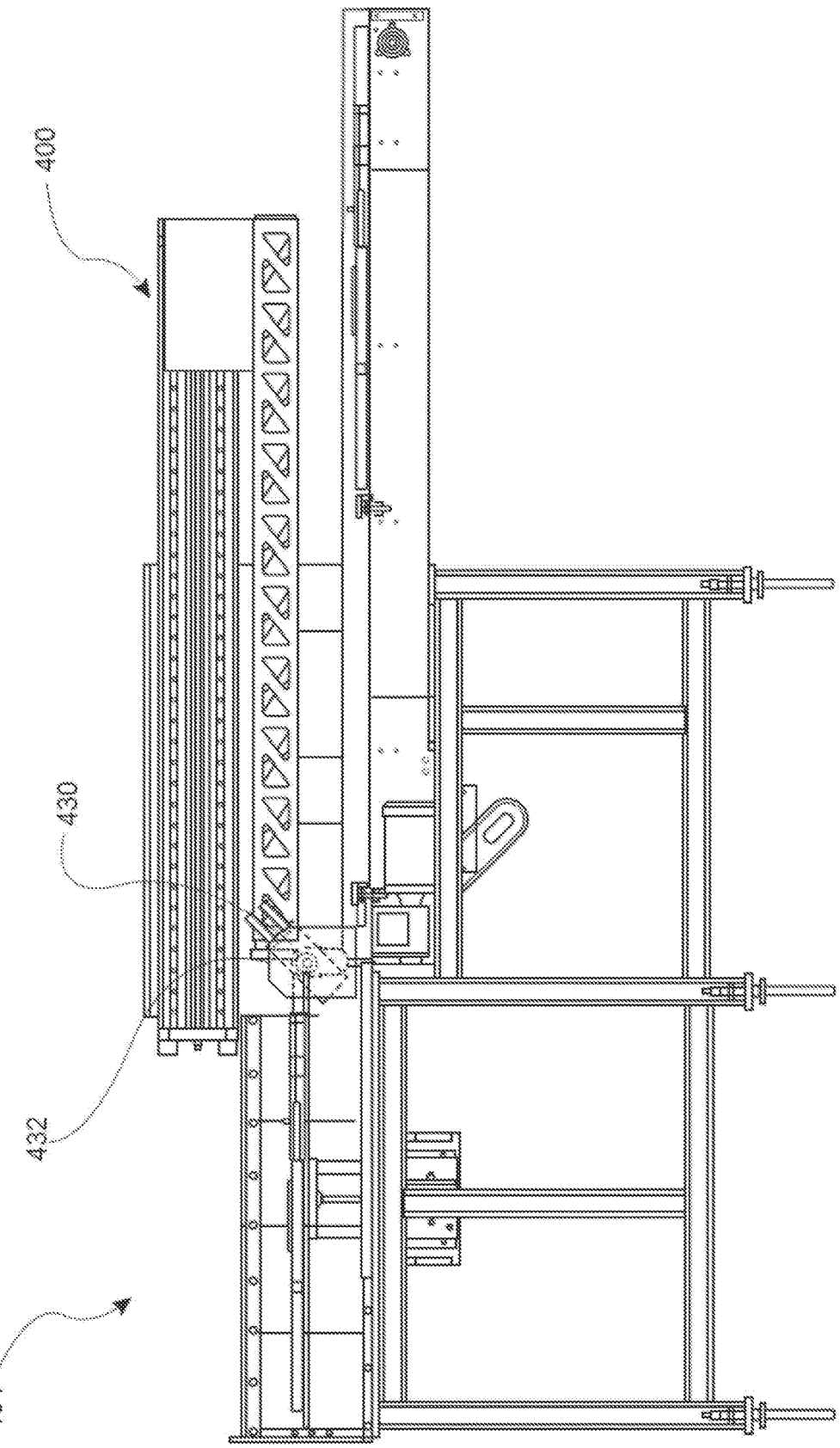
FIG. 26 illustrates a side view of the weapon feed system in a chamber load position according to the principles of the disclosure.

FIG. 26 illustrates a side view of the weapon feed system in a chamber load position according to the principles of the disclosure.

Figure 27:
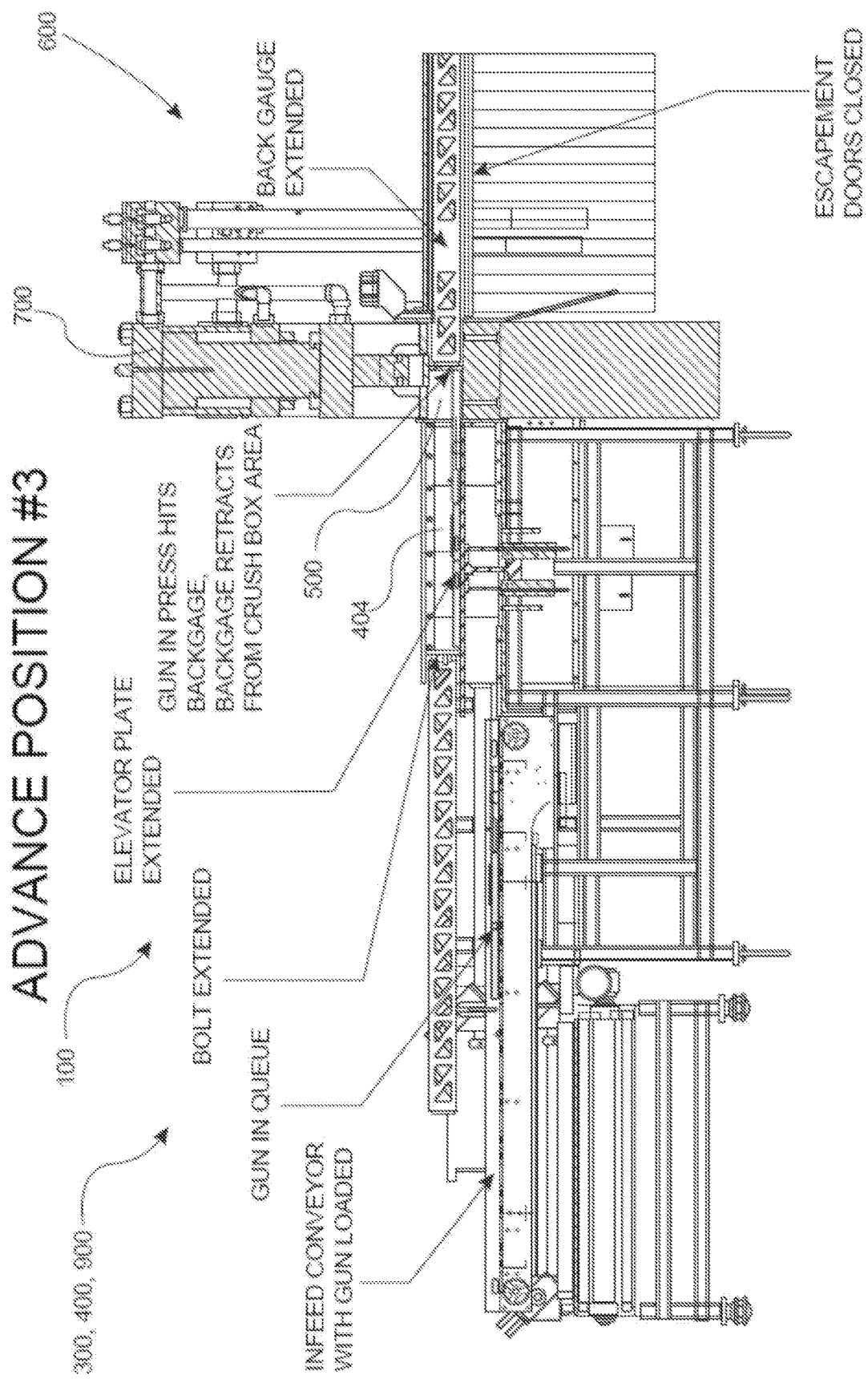
FIG. 27 illustrates a side view of the demilitarization system in an advance position according to the principles of the disclosure.

FIG. 27 illustrates a side view of the demilitarization system in an advance position according to the principles of the disclosure.

Figure 28:
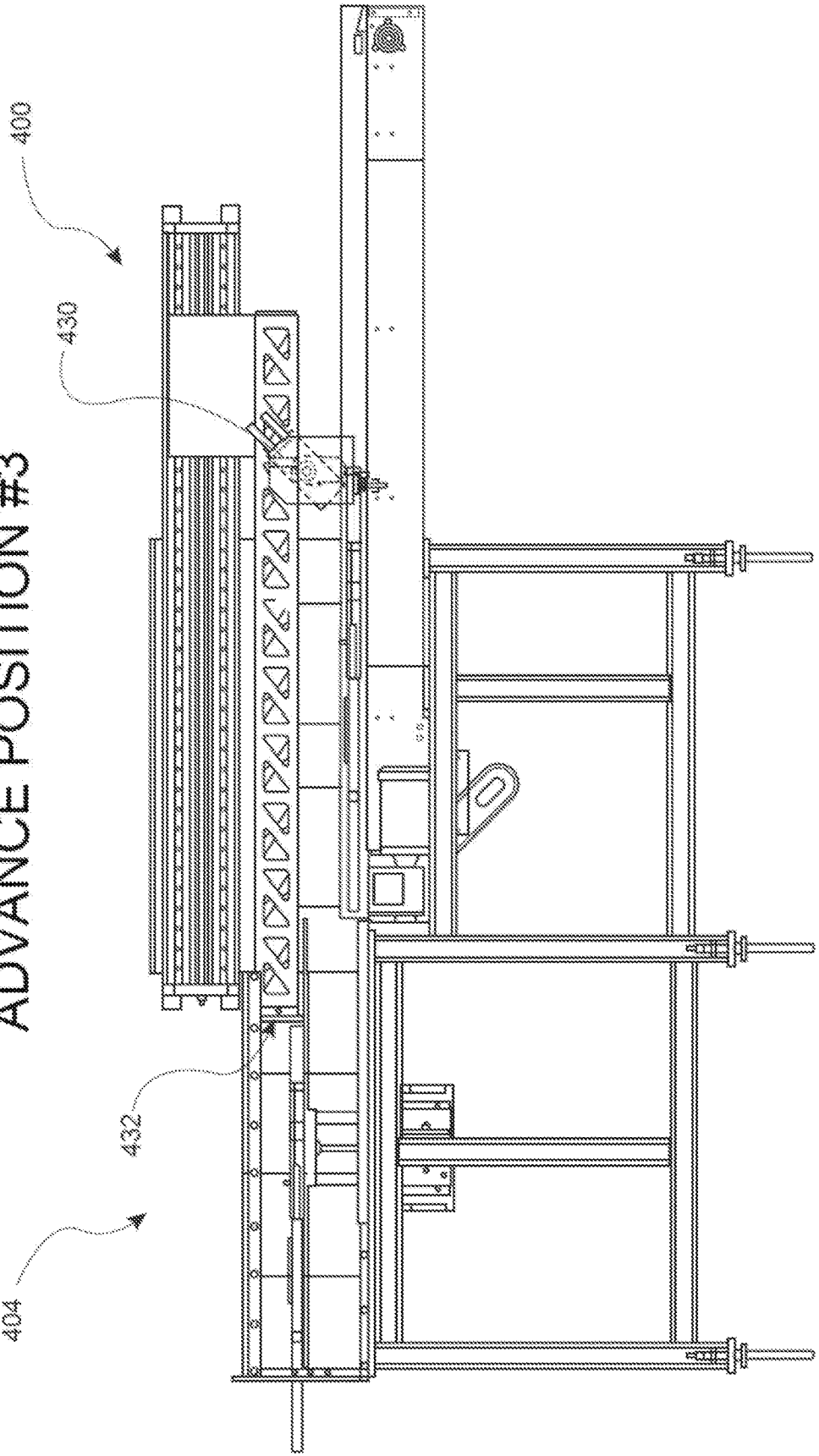
FIG. 28 illustrates a side view of the weapon feed system in an advance position according to the principles of the disclosure.

FIG. 28 illustrates a side view of the weapon feed system in an advance position according to the principles of the disclosure.

Figure 29:
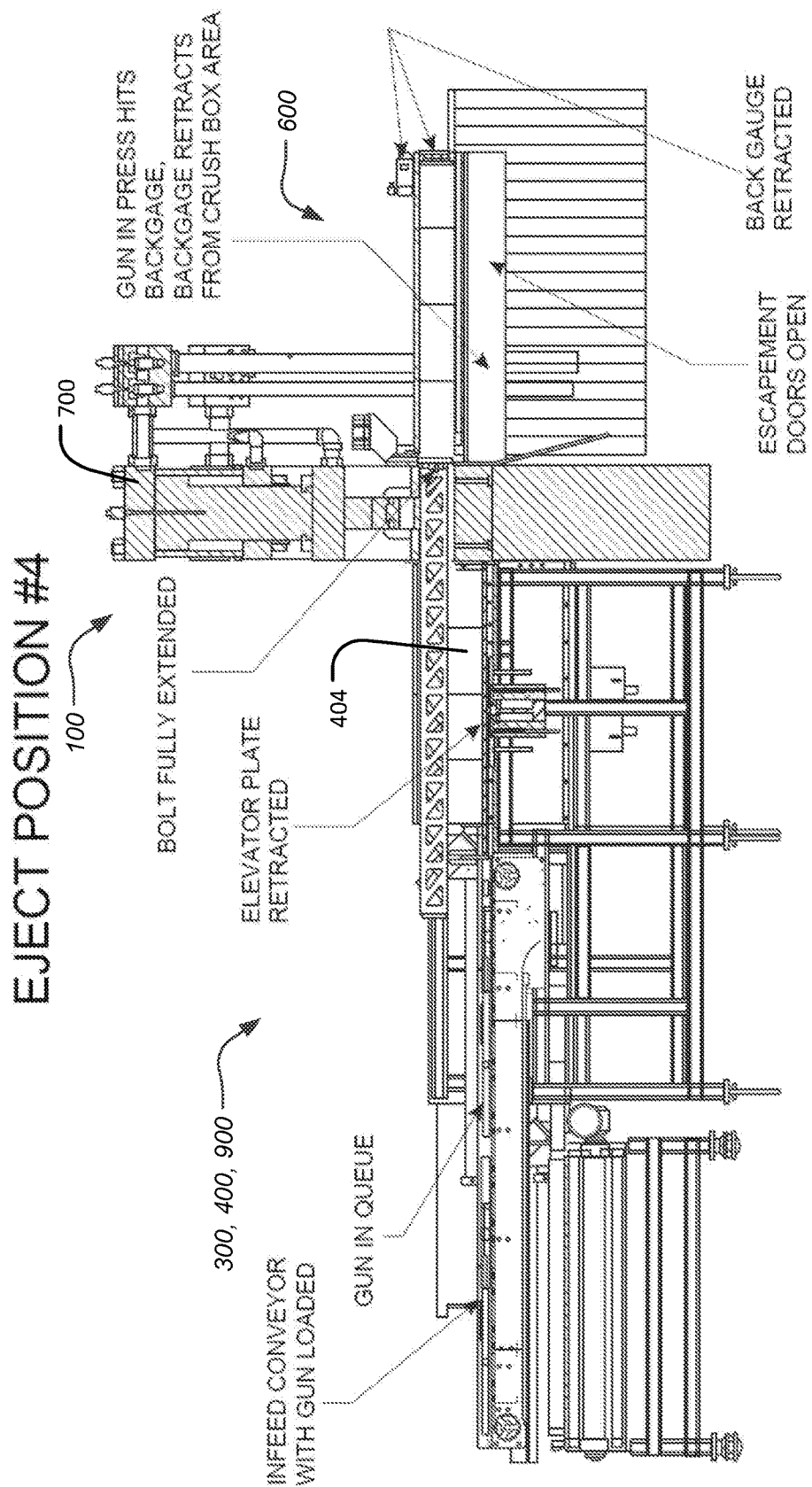
FIG. 29 illustrates a side view of the demilitarization system in an eject position according to the principles of the disclosure.

FIG. 29 illustrates a side view of the demilitarization system in an eject position according to the principles of the disclosure.

Figure 30:
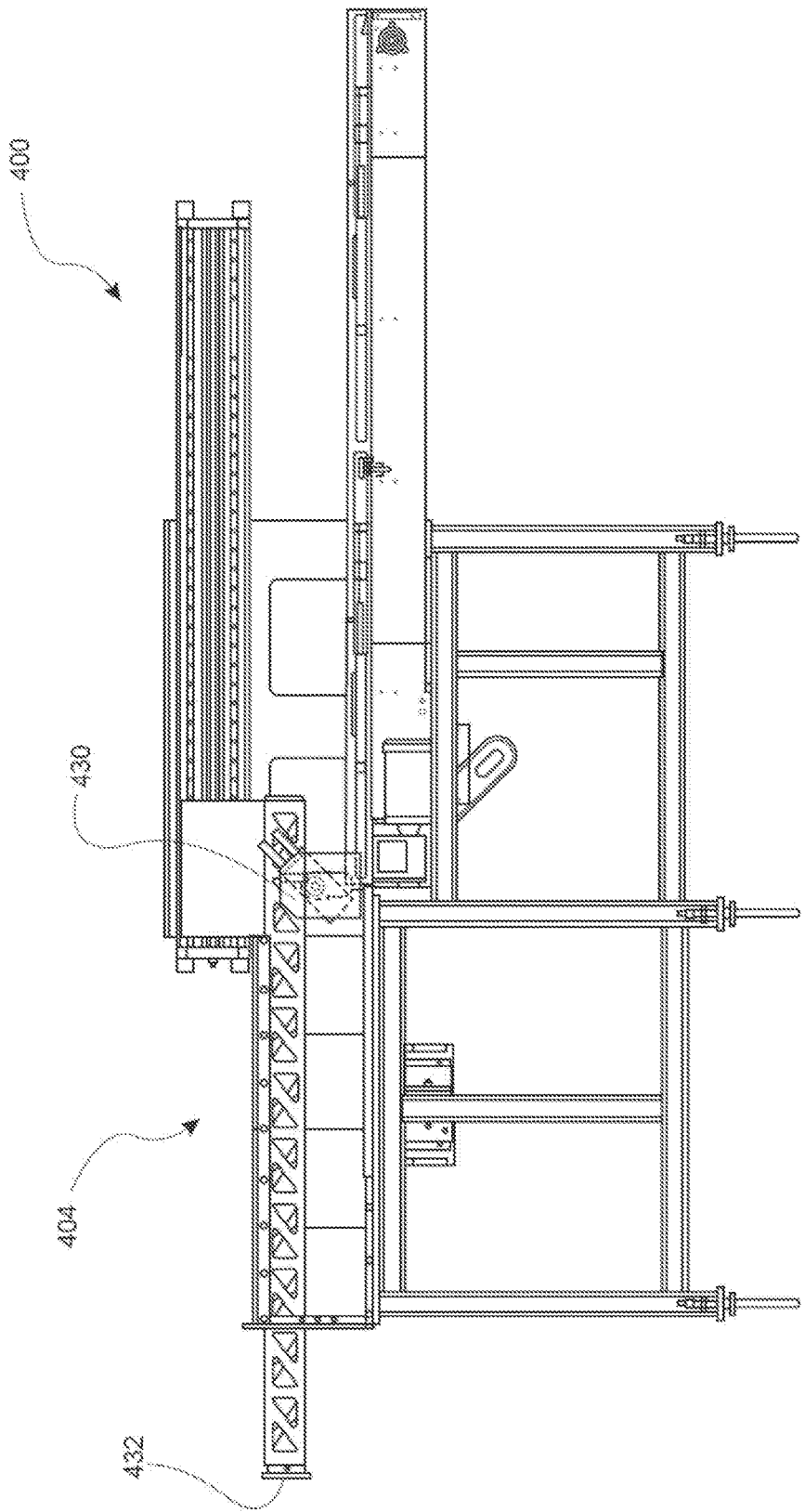
FIG. 30 illustrates a side view of the weapon feed system in an eject position according to the principles of the disclosure.

FIG. 30 illustrates a side view of the weapon feed system in an eject position according to the principles of the disclosure.

The following is an exemplary sequence of operations of the demilitarization system 100. First, staging a dunnage container on container lift and tilt assist mechanism implemented by the container mechanism 200. For example, a full dunnage container of the same type weapon may be delivered via forklift to the demilitarization system 100 and placed onto the container lift and tilt assist mechanism implemented by the container mechanism 200.

Next, the height and angle of container lift and tilt assist mechanism implemented by the container mechanism 200 may be adjusted. In one aspect, the operator may adjust the container lift and tilt assist mechanism to a desirable height and tilt angle for best personal ergonomics. Thereafter, once the dunnage container has been emptied, the operator may return the container lift and tilt assist mechanism to a zero-degree tilt to aid in the removal of the empty dunnage container and placing of the next, full dunnage container. However, lowering the container lift and tilt assist mechanism during this dunnage container exchange may not be necessary but is dependent upon the lifting height of the forklift compared to the currently adjusted height of the container lift and tilt assist mechanism. For example, if the forklift is not capable of lifting to the current container lift and tilt assist mechanism height, lowering of the container lift and tilt assist mechanism may then be required.

Next, weapons may be loaded into the demilitarization system 100 at process initiation. In one aspect, the Operator may remove one weapon at a time from the dunnage container and place it onto an empty conveyor position of the transfer conveyor 300. For optimal efficiency each weapon may be placed in its proper orientation by type, as described below.

For loading pistols, the operator may remove a pistol from the dunnage container and place the pistol in the proper orientation on one of two of the transfer conveyors 300 (load position 1 and load position 4 as illustrated in FIG. 3) or directly onto one of two of the weapon feed systems 400 (load position 2 and load position 3 as illustrated in FIG. 3). The Operator loads remaining conveyors. The cycle may be repeated as conveyor positions become available.

For loading Long guns, the operator may remove a long gun from the dunnage container and place the long gun barrel first or stock first onto one of two of the transfer conveyors 300 (load position 1 and load position 4 as illustrated in FIG. 3) or directly onto one of two of the weapon feed systems 400 (load position 2 and load position 3 as illustrated in FIG. 3). The Operator may load remaining conveyors. The cycle may be repeated as conveyor positions become available.

In one aspect, the above-noted operations may be associated with home position number 1 illustrated in FIG. 23 and FIG. 24. More specifically, the infeed assembly 900 may be loaded with a gun. The rotary paddle 430 of the infeed assembly 900 may be retracted, the bolt 432 of the infeed assembly 900 may be retracted, and the elevator plate 420 of the weapon feed system 400 may be retracted. Additionally, the back gauge of the rear back gauge system 600 may be extended and the ejection doors 620 of the rear back gauge system 600 may be closed.

Next, the weapons may be transferred from the transfer conveyor 300 to the infeed assembly 900. In particular, the transfer conveyor 300 may automatically convey each weapon away from load position 1 and load position 4 until they line up with their respective one of the infeed assembly 900. A long stroke pneumatic actuator may push the weapons onto the infeed assembly 900 from the transfer conveyor 300.

Next, the weapons may be transferred from infeed assembly 900 to infeed conveyor 402. The infeed conveyor 402 may move the weapon either from the operator loaded position (load position 2 and load position 3) or the transfer conveyor 300 (load position 1 and load position 4) into the weapon feed system 400. There may be a transition plate where an infeed conveyor meets the ballistic box 404 at load position 2 and load position 3. In one aspect, pistols may move up to this plate while all long guns may move onto this plate with the leading-edge projecting into the infeed conveyor 402. The infeed conveyor belt at load position 2 and load position 3 may be marked to indicate the proper separation between weapons.

Next, the weapons may be moved within the infeed conveyor 402. In this regard, a process of pushing the weapon into the crush zone may start with the feed actuator system 406 in its home position. The home position may be defined as the servo actuator retracted to a position behind the weapon. After the weapon has been moved into position by the infeed conveyor, the feed actuator system 406 may drop the piston tool into the down position. The piston head may be positioned directly behind the weapon. The feed actuator may push the weapon into the crush box 500 for the first crush. Simultaneously, the rear back gauge system 600 may be positioned to make sure the weapon does not move through the crush box 500 due to weapon momentum.

In one aspect, the above-noted operations may be associated with chamber load position 2 illustrated in FIG. 25 and FIG. 26. More specifically, the infeed assembly 900 may be loaded with a gun. The rotary paddle 430 of the infeed assembly 900 may push the gun onto the elevator plate 420 of the weapon feed system 400 and the bolt 432 of the infeed assembly 900 may stay in the retracted position. Thereafter, within the ballistic box 404 the press infeed elevator assembly 410 may operate the up/down cylinder 428 to raise the elevator plate 420, which moves the weapon from "home position" to "chamber load position." This may be followed by "advance position," which may move the weapon into the crush box 500, which may allow a weapon to be crushed. Additionally, the back gauge of the rear back gauge system 600 may remain extended and the ejection doors 620 of the rear back gauge system 600 may remain closed.

Next, the weapons may be crushed. In one aspect, the press head of the press assembly 700 rapid-cycles down until initial crush force (40 tons) is reached. Then the press assembly 700 shifts into full tonnage (e.g., 230 ton maximum) mode to provide the final crush. Once the press assembly 700 reaches set tonnage and displacement, the press assembly 700 may retract back to a ready position. The weapon feed system 400 may index the weapon a set distance (e.g., six inches) with the rear back gauge system 600 following this movement. Thereafter, the press assembly 700 may be engaged again. This process may continue until the entire weapon has been crushed. Depending on the overall length of long gun, up to six inches of the stock will not be crushed.

In one aspect, the above-noted operations may be associated with the advance position 3 illustrated in FIG. 27 and FIG. 28. More specifically, the elevator plate 420 of the weapon feed system 400 may be extended. Additionally, the back gauge of the rear back gauge system 600 may remain extended and the ejection doors 620 of the rear back gauge system 600 may remain closed.

Next, the demilitarized material may be ejected. In this regard, after completion of the crush sequence, the pneumatic thruster may be actuated, which pushes all the demilitarized material completely though the crush box 500. Simultaneously, the back gauge actuator may be fully retracted, and a bottom escapement door (through the ejection doors 620) may be opened allowing all the demilitarized material to drop onto the recycle conveyor 800. The weapon feed system 400 and pneumatic thruster may return to the home position and the escapement door may close and may be ready for the next weapon.

In one aspect, the above-noted operations may be associated with the eject position 4 illustrated in FIG. 29 and FIG. 30. More specifically, the elevator plate 420 of the weapon feed system 400 may be retracted and the bolt 432 of the infeed assembly 900 may extend. Additionally, the back gauge of the rear back gauge system 600 may be retracted and the ejection doors 620 of the rear back gauge system 600 may be opened.

Next, the demilitarized weapon may be conveyed to the recycle bin 114. In one aspect, as the demilitarized material is released from the rear back gauge system 600, the recycle conveyor 800, which may be constantly running may move the demilitarized material toward the recycle bin 114. In one aspect, each press assembly 700 may have a sheet metal chute (the deflector 614) to direct the demilitarized material from the rear back gauge system 600 to a center of the recycle conveyor 800. The recycle conveyor 800 may be designed and configured to elevate the material back up to a height where it can be dumped into the recycle bin 114. In one aspect, a pause button may be located at the recycle bin area to the recycle conveyor 800 for a set period of time (e.g., 120 seconds) and may be adjustable to allow the recycle bin 114 to be changed out. In one aspect, pressing the pause button may only pause the recycle conveyor 800. Each press station may be allowed to continue until the conveyor pause time has elapsed or an excessive amount of material is detected at a particular stations discharge point. In another aspect, the pause functionality may be voice activated.

Figure 31:
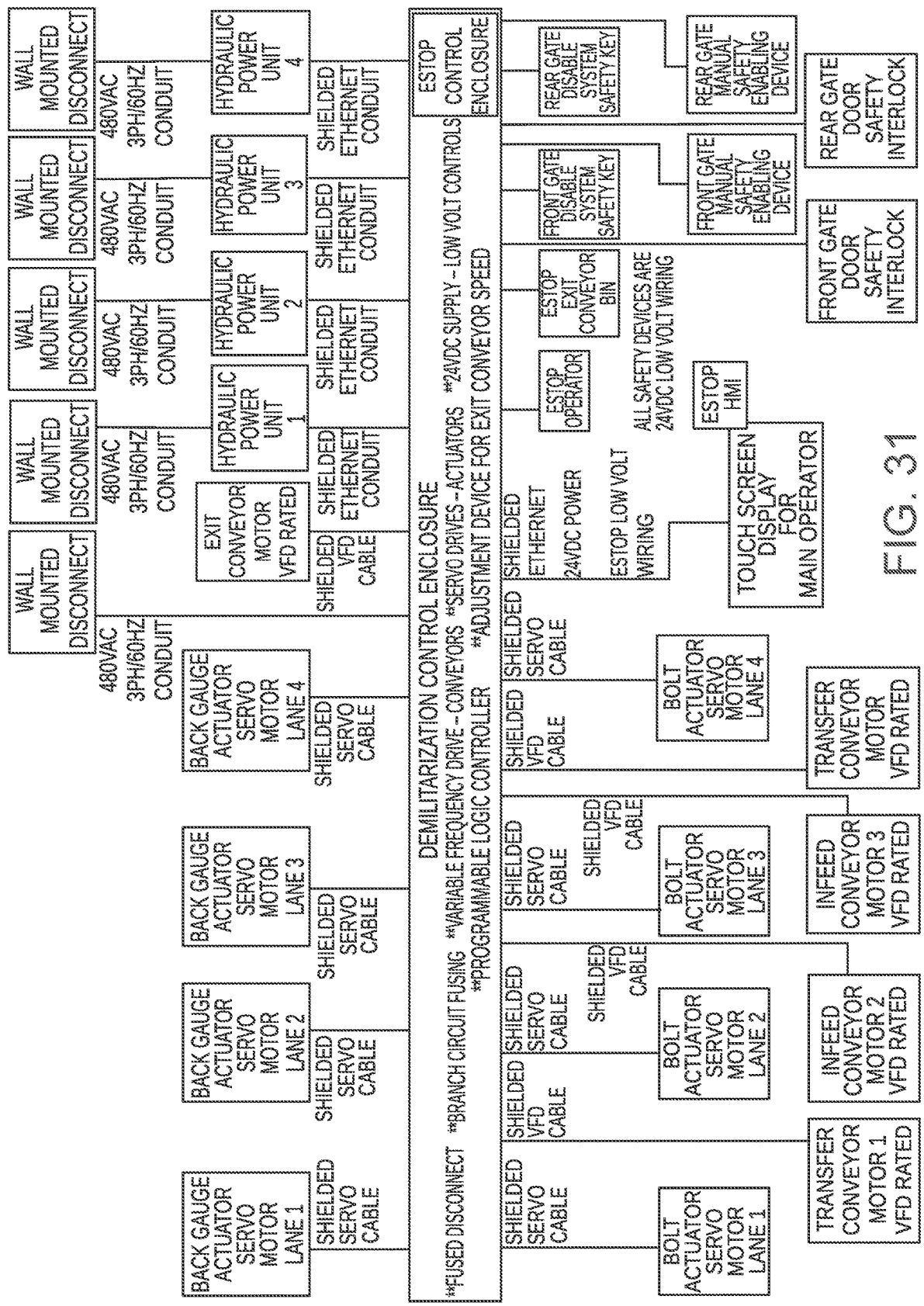
FIG. 31 illustrates an exemplary electrical connection diagram according to the principles of the disclosure.

FIG. 31 illustrates an exemplary electrical connection diagram according to the principles of the disclosure.

Figure 32:
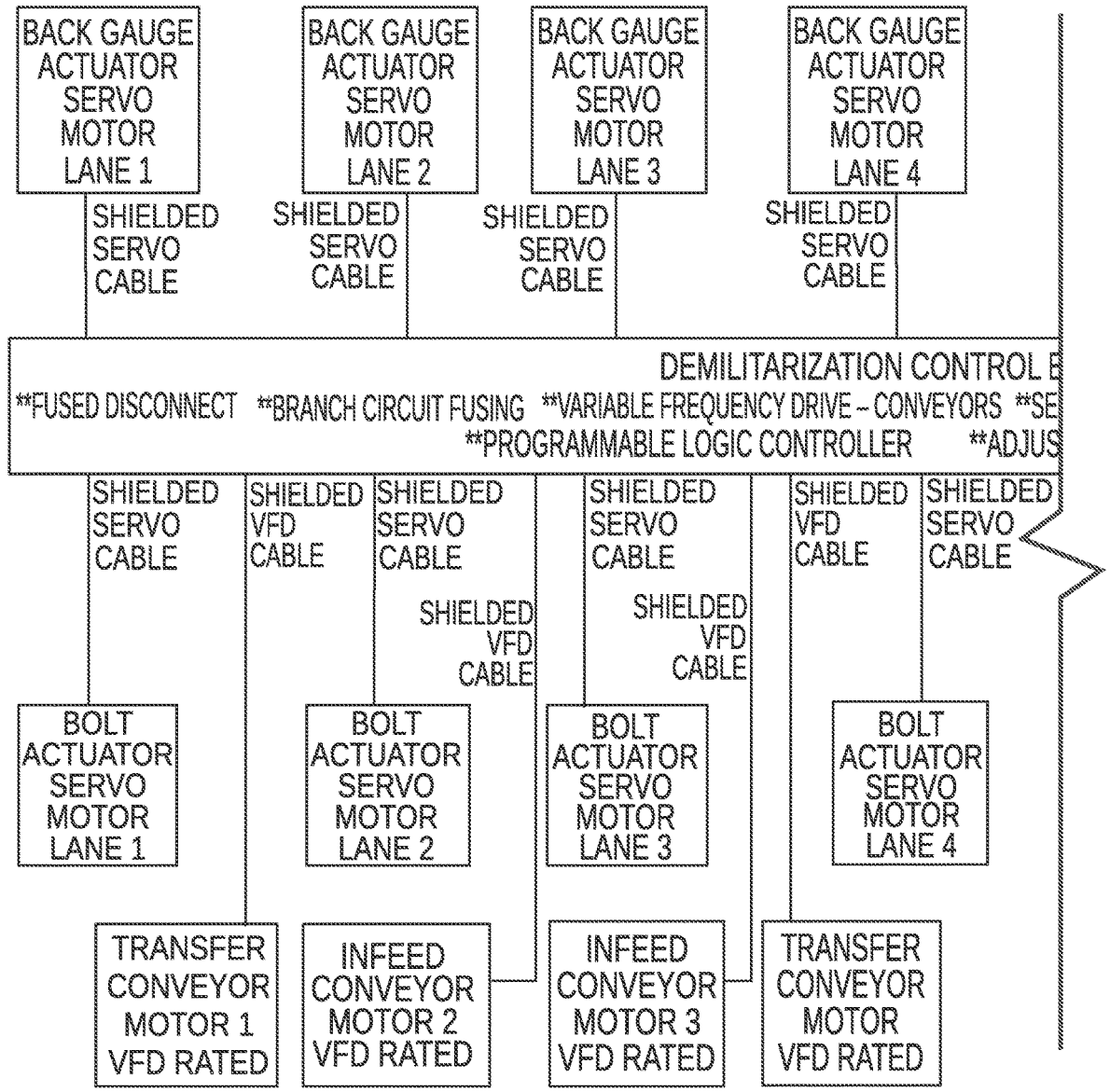
FIG. 32 illustrates a partial view of FIG. 31.

FIG. 32 illustrates a partial view of FIG. 31.

Figure 33:
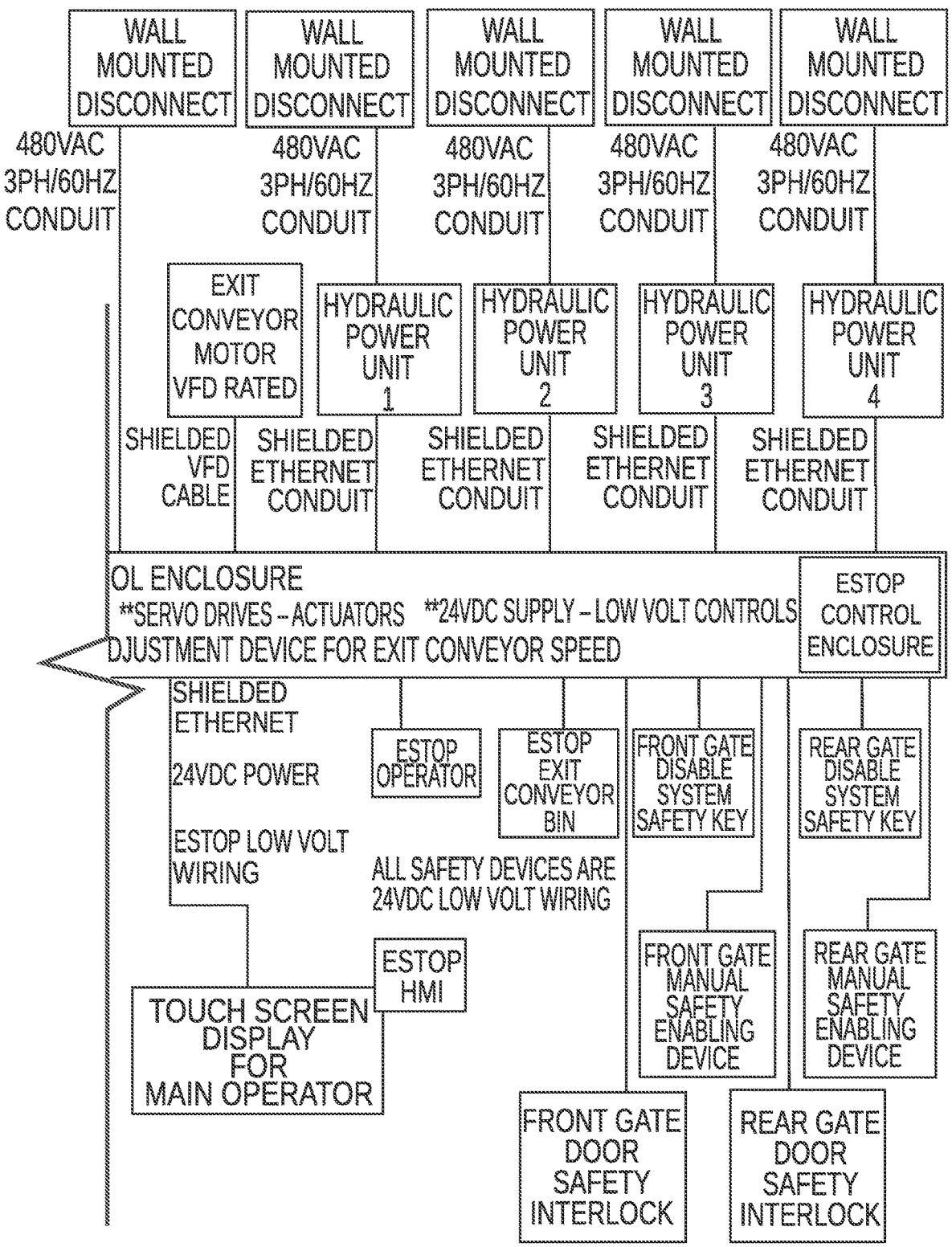
FIG. 33 illustrates a partial view of FIG. 31.

FIG. 33 illustrates a partial view of FIG. 31.

In particular, FIG. 31, FIG. 32, and FIG. 33 illustrate exemplary electrical connections for the various components of the demilitarization system 100.

Figure 34:
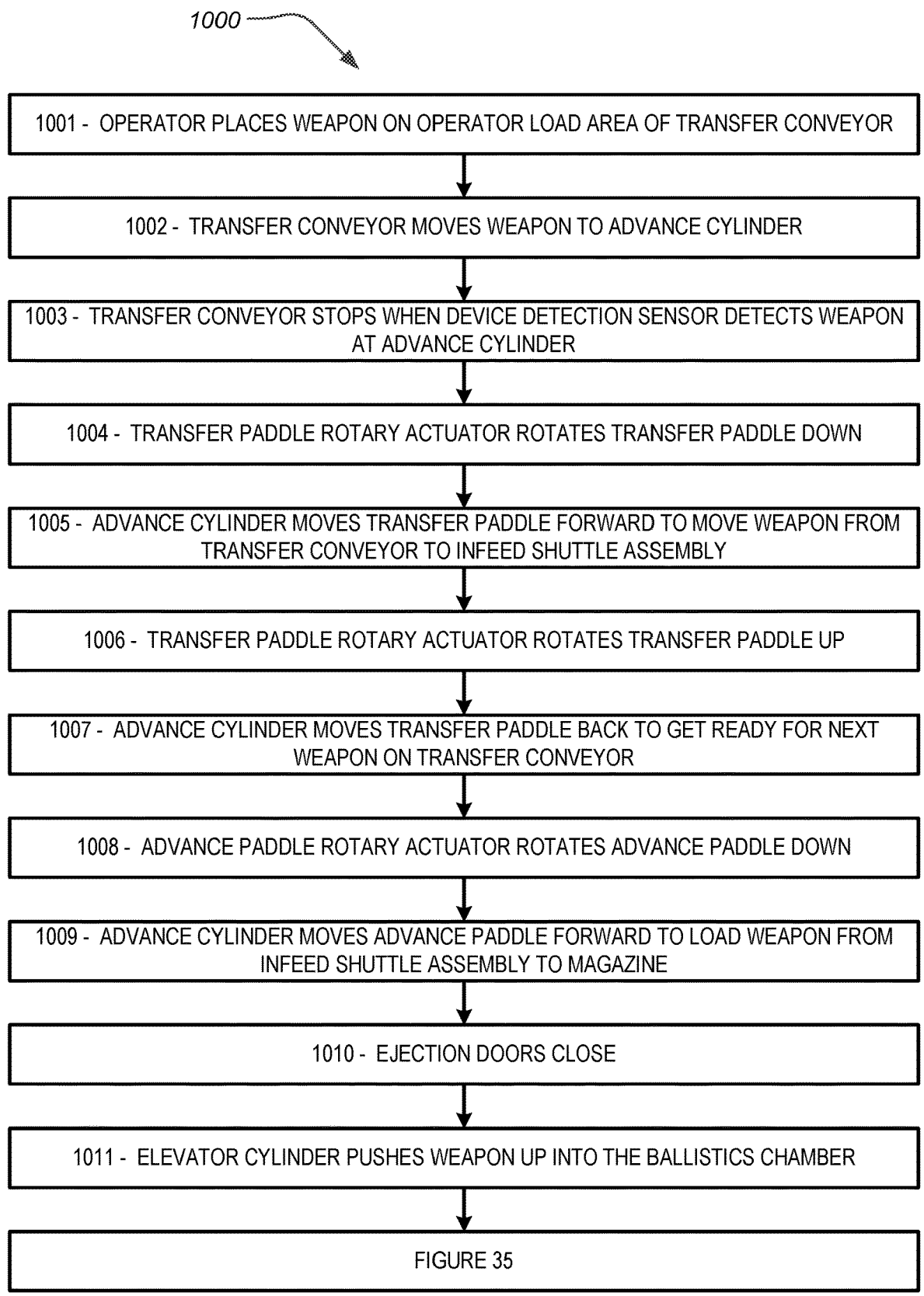
FIG. 34 illustrates demilitarization system processes for processing weapons through load position 1 and load position 4 according to the principles of the disclosure.
Figure 35:
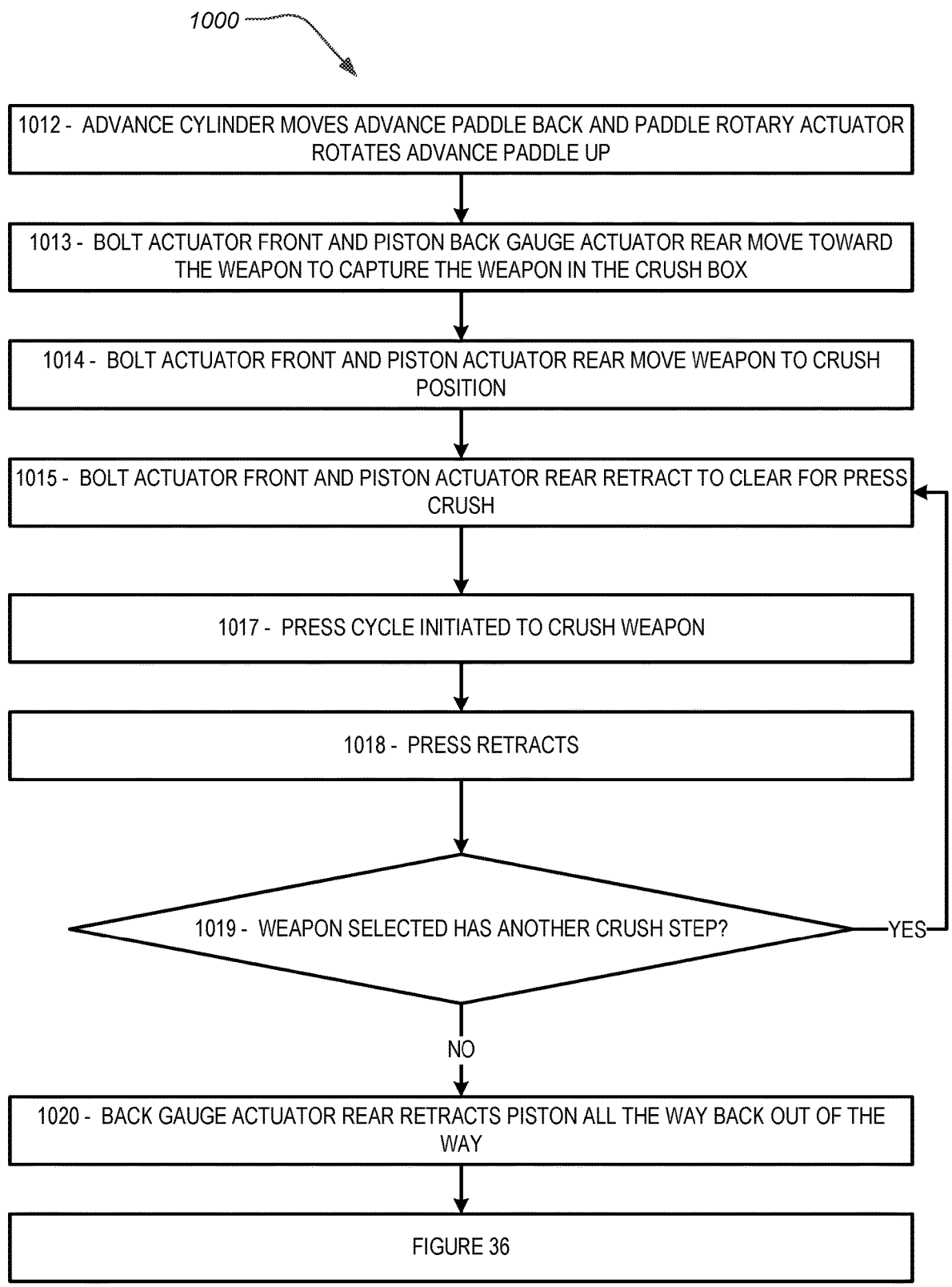
FIG. 35 is a continuation of FIG. 34.

FIG. 34 illustrates demilitarization system processes for processing weapons through load position 1 and load position 4 according to the principles of the disclosure; FIG. 35 is a continuation of FIG. 34; and FIG. 36 is a continuation of FIG. 35.

Figure 36:
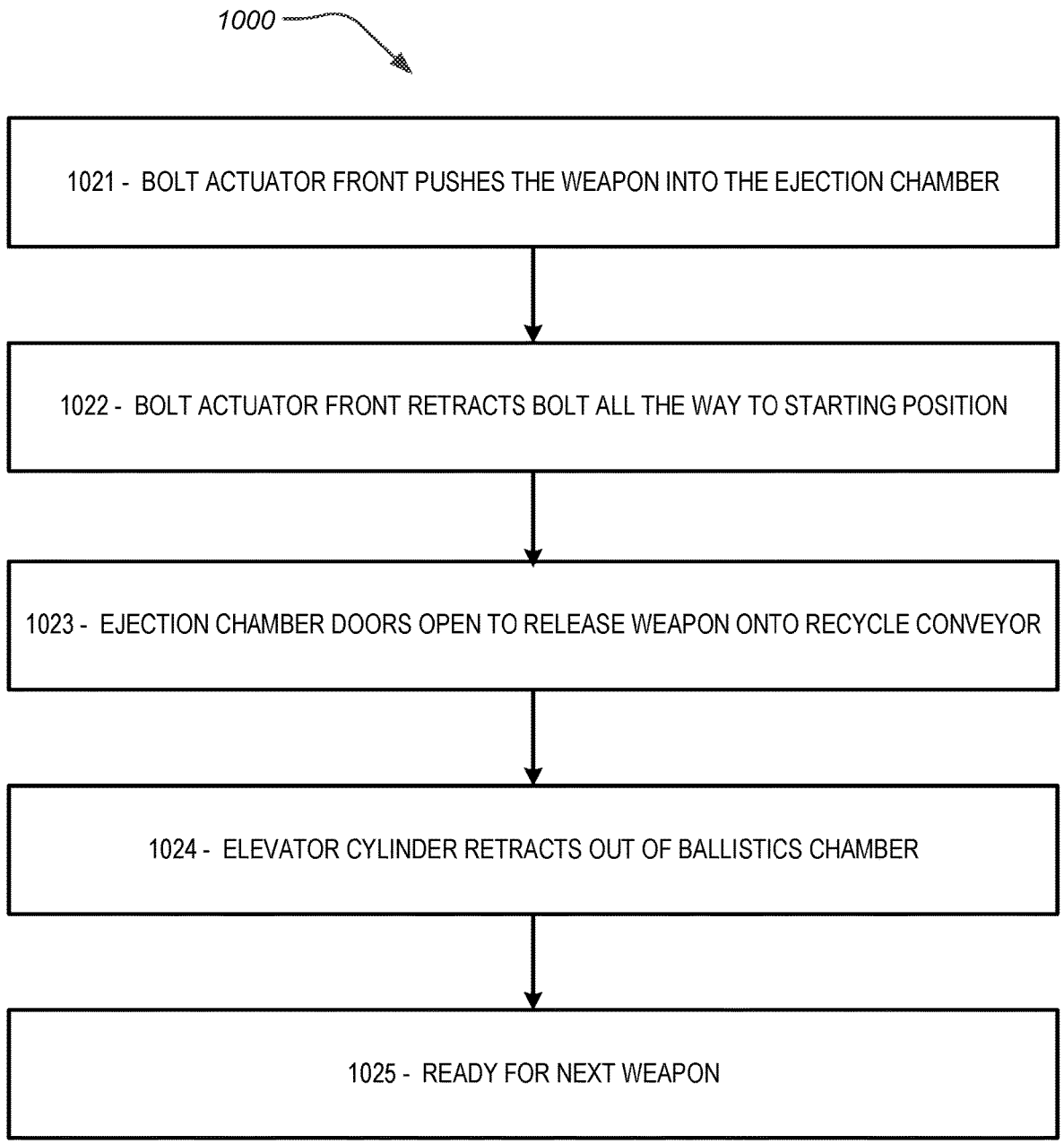
FIG. 36 is a continuation of FIG. 35.

In particular, FIG. 34, FIG. 35, and FIG. 36 illustrate processes for processing weapons through load position 1 and load position 4 of the demilitarization system 100 as described herein. More specifically, FIG. 34, FIG. 35, and FIG. 36 illustrate an exemplary process 1000. In particular, the process 1000 relates to implementing, making, manufacturing, forming, and/or the like the demilitarization system 100 as described herein. It should be noted that the aspects of process 1000 may be performed in a different order consistent with the aspects described herein. Moreover, the process 1000 may be modified to have more or fewer processes consistent with the various aspects disclosed herein.

The process 1000 may include as illustrated in box 1001 that the operator places a weapon on an operator load area of the transfer conveyor. Additionally, the process 1000 may include as illustrated in box 1002 that the transfer conveyor moves the weapon to the advance cylinder. Moreover, the process 1000 may include as illustrated in box 1003 that the transfer conveyor stops when the device detection sensor detects the weapon at the advance cylinder.

The process 1000 may further include as illustrated in box 1004 that the transfer paddle rotary actuator rotates the transfer paddle down. Thereafter, the process 1000 may include as illustrated in box 1005 that the advance cylinder moves the transfer paddle forward to move the weapon from the transfer conveyor to the infeed shuttle assembly.

The process 1000 may further include as illustrated in box 1006 that the transfer paddle rotary actuator rotates the transfer paddle up. Thereafter, the process 1000 may include as illustrated in box 1007 that the advance cylinder moves the transfer paddle back to get ready for the next weapon on the transfer conveyor. Thereafter, the process 1000 may include as illustrated in box 1008 that the advance paddle rotary actuator rotates the advance paddle down. Additionally, the process 1000 may include as illustrated in box 1009 that the advance cylinder moves the advance paddle forward to load the weapon from the infeed shuttle assembly to the magazine.

Next, the process 1000 may include as illustrated in box 1010 that the ejection doors close. Thereafter, the process 1000 may include as illustrated in box 1011 that the elevator cylinder pushes the weapon up into the ballistics chamber. Additionally, the process 1000 may include as illustrated in box 1012 that the advance cylinder moves the advance paddle back and the paddle rotary actuator rotates the advance paddle up. Additionally, the process 1000 may include as illustrated in box 1013 that the bolt actuator at the front and the piston back gauge actuator at the rear move toward the weapon to capture the weapon in the crush box.

Next, the process 1000 may include as illustrated in box 1014 that the bolt actuator at the front and the piston actuator at the rear move the weapon to the crush position. Additionally, the process 1000 may include as illustrated in box 1015 that the bolt actuator at the front and the piston actuator at the rear retract to clear for press crush. In particular, the process 1000 may include as illustrated in box 1016 that the press cycle may be initiated to the crush the weapon. Additionally, the process 1000 may include as illustrated in box 1017 that the press cycle may be initiated to crush the weapon. Thereafter, the process 1000 may include as illustrated in box 1018 that the press retracts.

The process 1000 may include as illustrated in box 1019 a determination as to whether the weapon selected has another crush step. If another crush step is needed, the process will return to box 1016. On the other hand, if no further crush steps are required, the process will advance to box 1020.

Next, the process 1000 may include as illustrated in box 1020 that the back gauge actuator at the rear retracts the piston all the way back out of the way. Thereafter, the process 1000 may include as illustrated in box 1021 that the bolt actuator at the front pushes the weapon into the ejection chamber. Additionally, the process 1000 may include as illustrated in box 1022 that the bolt actuator at the front retracts the bolt all the way to starting position.

Next, the process 1000 may include as illustrated in box 1023 that the ejection chamber doors open to release the weapon onto the recycle conveyor. Thereafter, the process 1000 may include as illustrated in box 1024 that the elevator cylinder retracts out of the ballistics chamber. Finally, the process 1000 may include as illustrated in box 1025 that the demilitarization system 100 is ready for next weapon.

Figure 37:
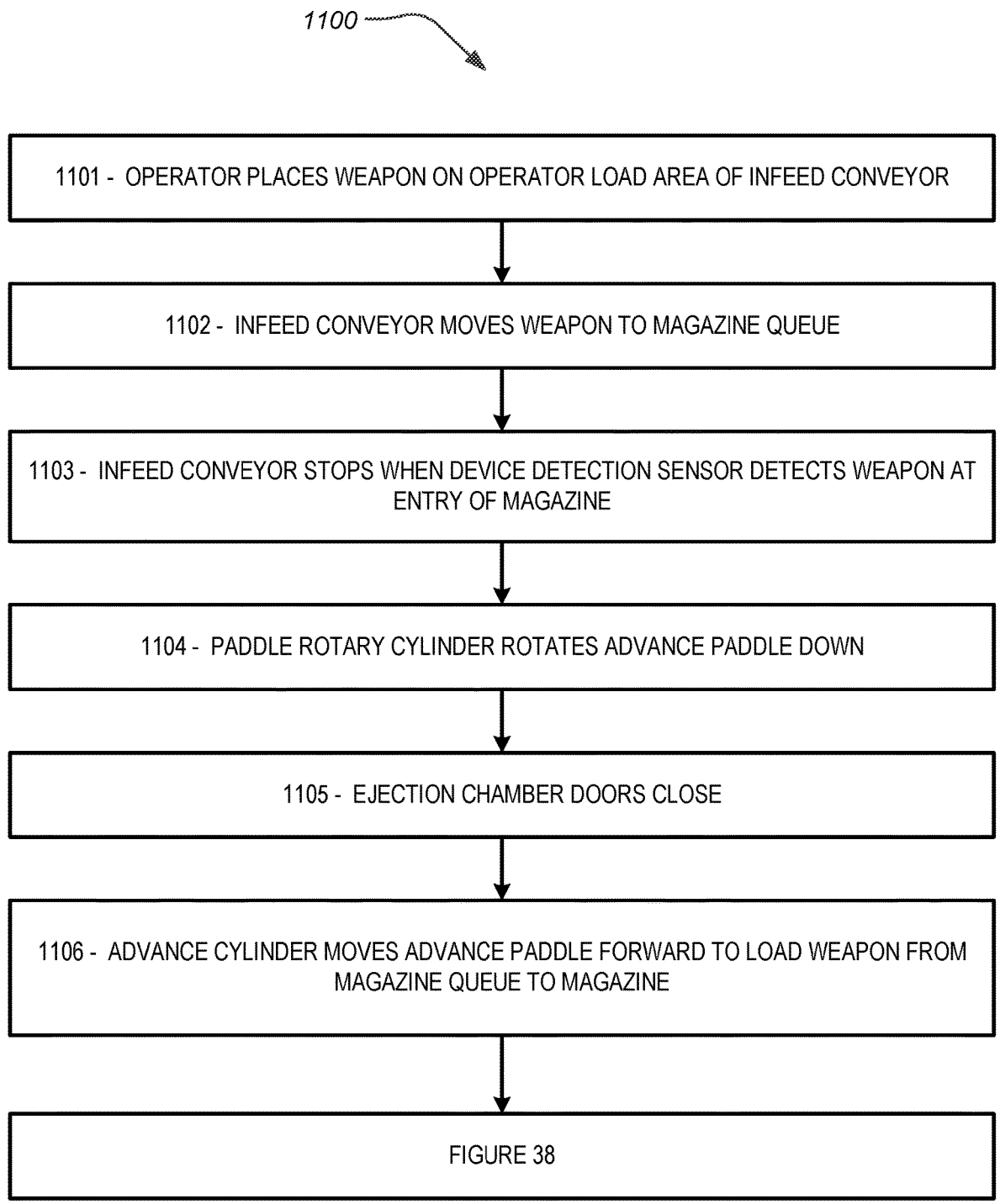
FIG. 37 illustrates demilitarization system processes for processing weapons through load position 2 and load position 3 according to the principles of the disclosure.
Figure 38:
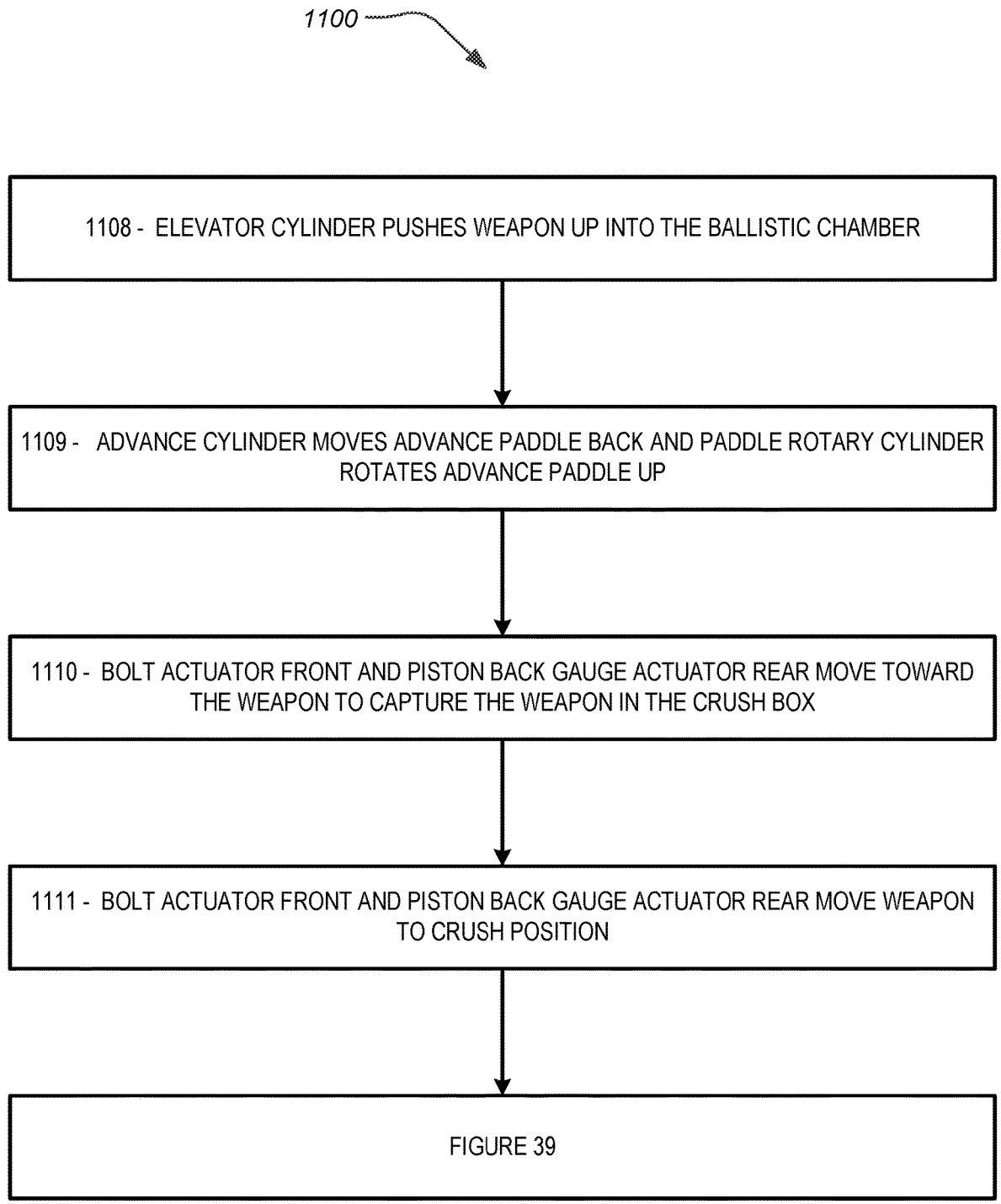
FIG. 38 is a continuation of FIG. 37.

FIG. 37 illustrates demilitarization system processes for processing weapons through load position 2 and load position 3 according to the principles of the disclosure; FIG. 38 is a continuation of FIG. 37; and FIG. 39 is a continuation of FIG. 38.

Figure 39:
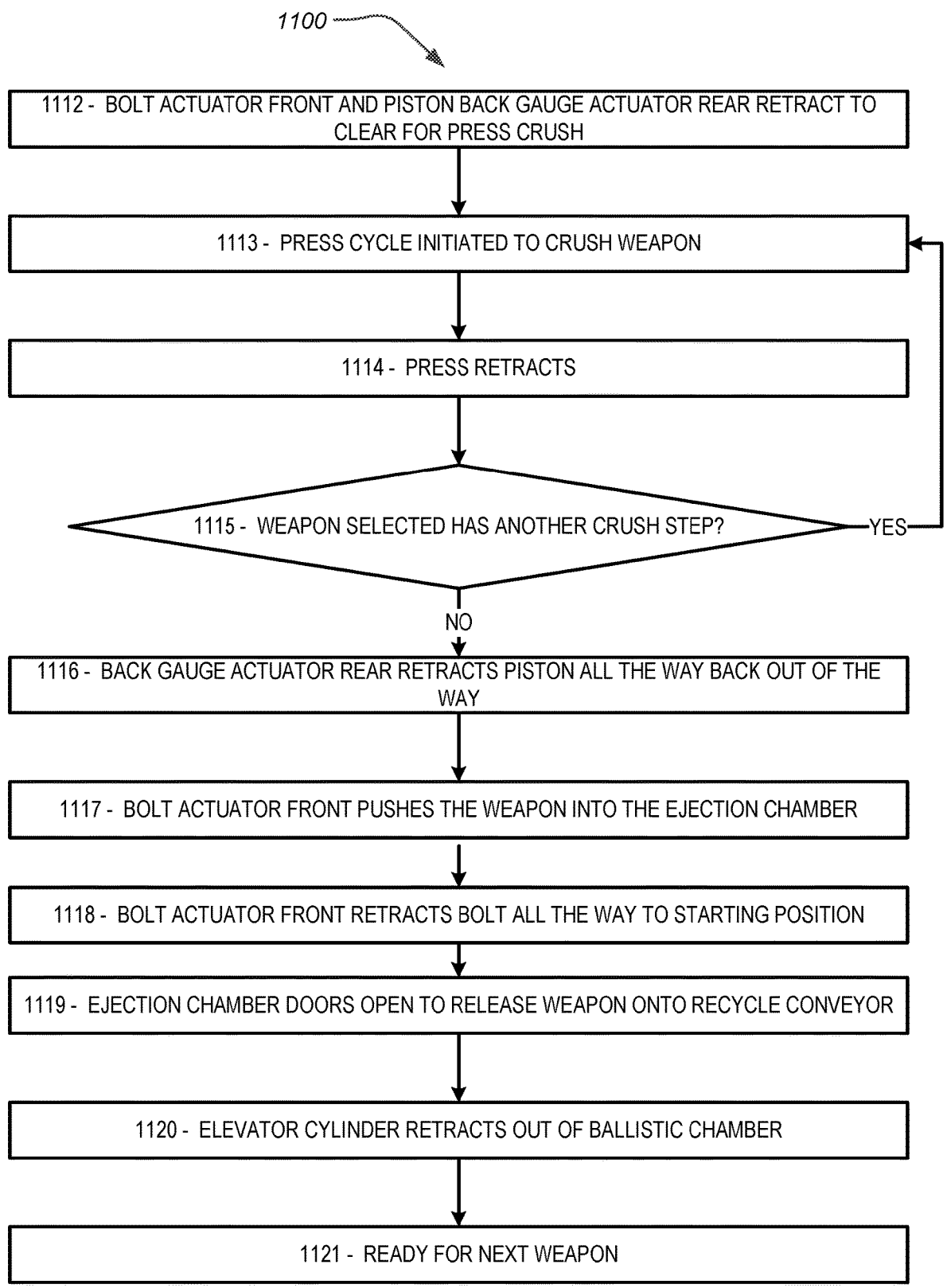
FIG. 39 is a continuation of FIG. 38.

In particular, FIG. 37, FIG. 38, and FIG. 39 illustrate processes for processing weapons through load position 2 and load position 3 of the demilitarization system 100 as described herein. In particular, the process 1100 relates to implementing, making, manufacturing, forming, and/or the like the demilitarization system 100 as described herein. It should be noted that the aspects of process 1100 may be performed in a different order consistent with the aspects described herein. Moreover, the process 1100 may be modified to have more or fewer processes consistent with the various aspects disclosed herein.

The process 1100 may include as illustrated in box 1101 that the operator places a weapon on the operator load area of the infeed conveyor. Next, the process 1100 may include as illustrated in box 1102 that the infeed conveyor moves the weapon to the magazine queue. Thereafter, the process 1100 may include as illustrated in box 1103 that the infeed conveyor stops when the device detection sensor detects the weapon at the entry of the magazine.

Next, the process 1100 may include as illustrated in box 1104 that the paddle rotary cylinder rotates the advance paddle down. Thereafter, the process 1100 may include as illustrated in box 1105 that the ejection chamber doors close. Additionally, the process 1100 may include as illustrated in box 1106 that the advance cylinder moves the advance paddle forward to load the weapon from the magazine queue to the magazine.

The process 1100 may include as illustrated in box 1108 that the elevator cylinder pushes the weapon up into the ballistic chamber. Thereafter, the process 1100 may include as illustrated in box 1109 that the advance cylinder moves the advance paddle back and the paddle rotary cylinder rotates the advance paddle up. Additionally, the process 1100 may include as illustrated in box 1110 that the bolt actuator at the front and the piston back gauge actuator at the rear move toward the weapon to capture the weapon in the crush box.

Next, the process 1100 may include as illustrated in box 1111 that the bolt actuator at the front and the piston back gauge actuator at the rear move weapon to the crush position. Thereafter, the process 1100 may include as illustrated in box 1112 that the bolt actuator at the front and piston back gauge actuator at the rear retract to clear for press crush. Additionally, the process 1100 may include as illustrated in box 1113 that the press cycle may be initiated to crush the weapon. Thereafter, the process 1100 may include as illustrated in box 1114 that the press retracts.

Next, the process 1100 may include as illustrated in box 1115 a determination on whether the weapon selected has another crush step. If another crush is needed, the process will return to box 1113. On the other hand, if another crush is not required, the process will advance to box 1116.

The process 1100 may include as illustrated in box 1116 that the back gauge actuator at the rear retracts the piston all the way back out of the way. Thereafter, the process 1100 may include as illustrated in box 1117 that the bolt actuator at the front pushes the weapon into the ejection chamber. Next, the process 1100 may include as illustrated in box 1118 that the bolt actuator at the front retracts the bolt all the way to the starting position. Thereafter, the process 1100 may include as illustrated in box 1119 that the ejection chamber doors open to release the weapon onto the recycle conveyor.

Figure 40:
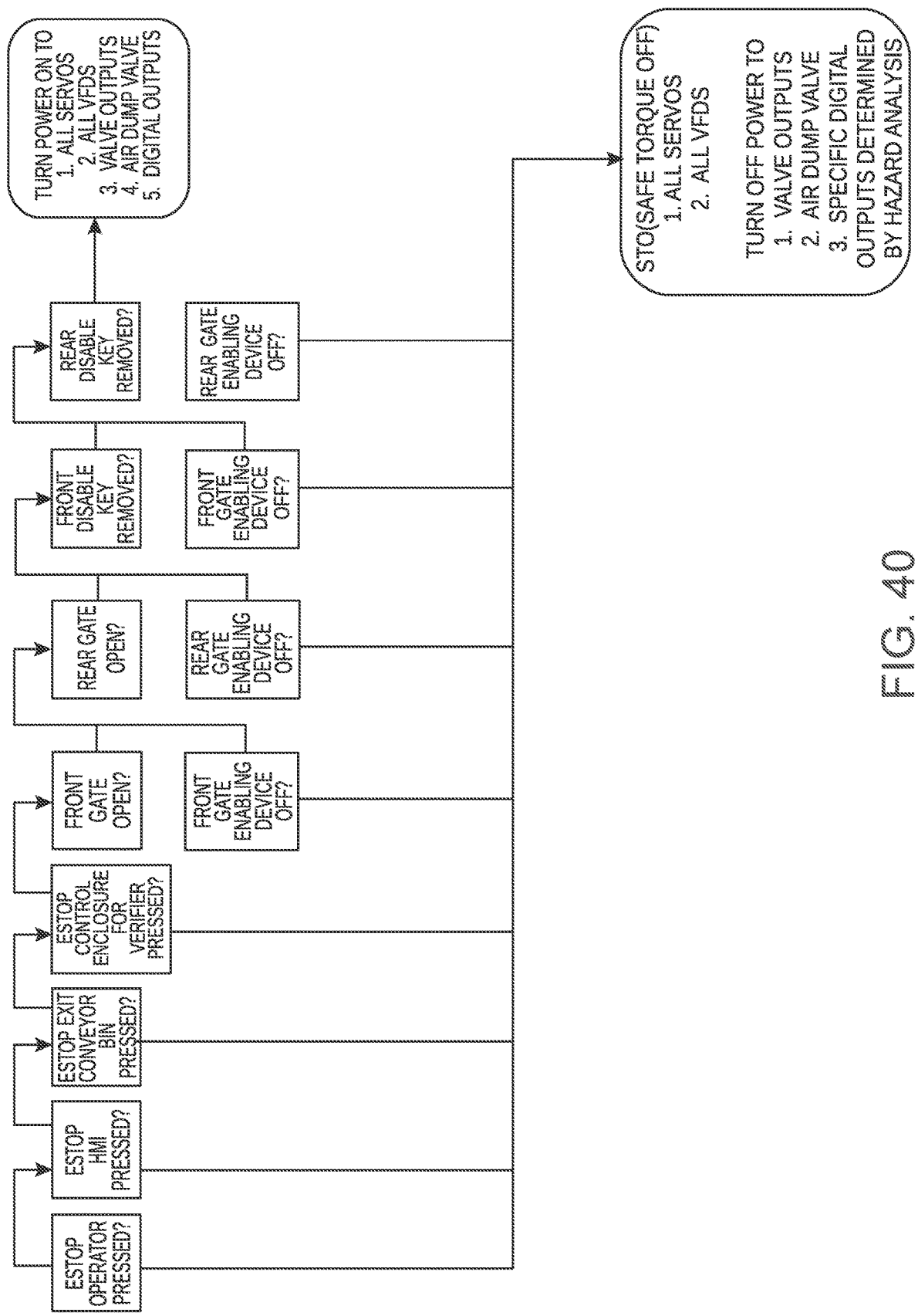
FIG. 40 illustrates demilitarization system safety processes according to the principles of the disclosure.
Figure 41:
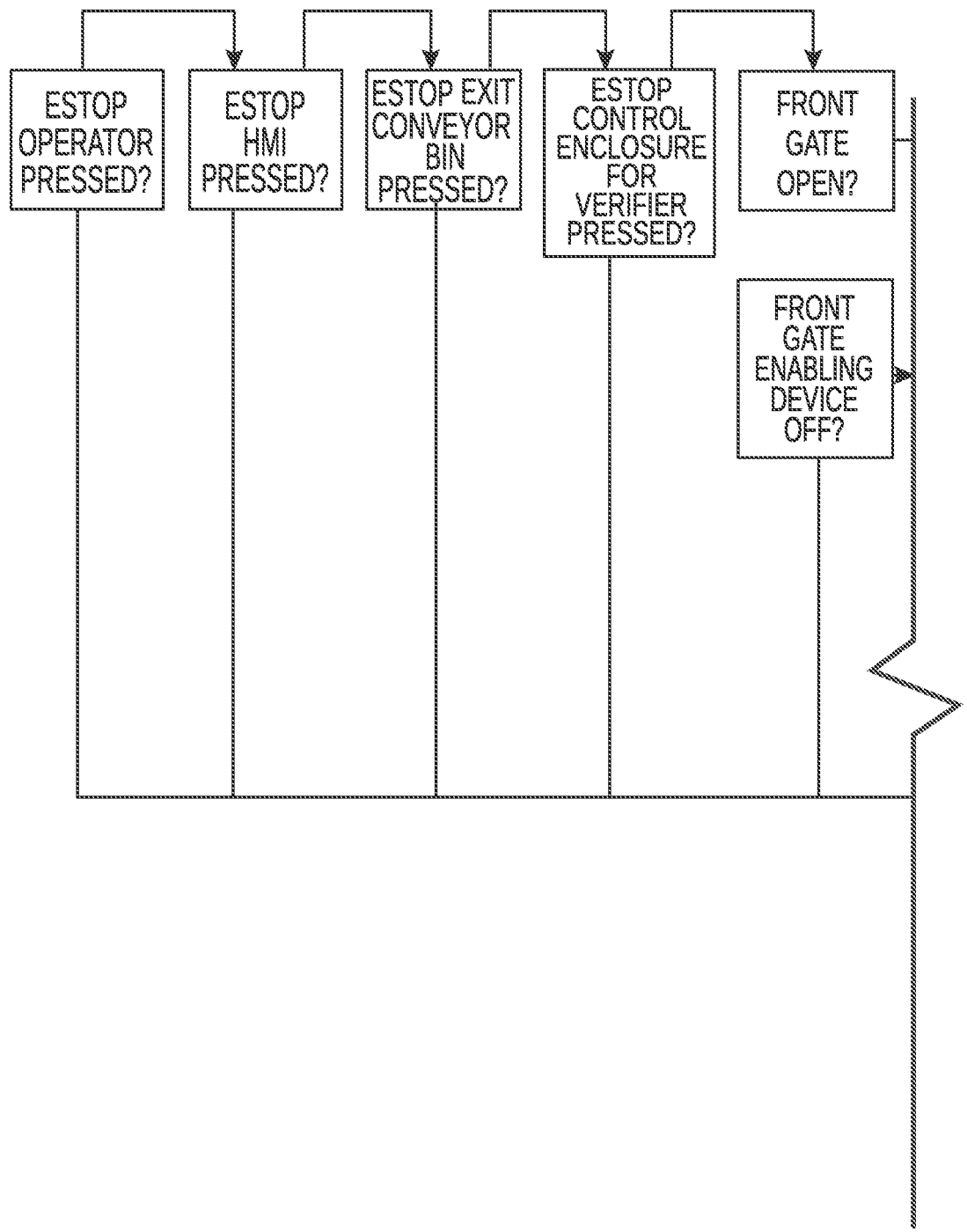
FIG. 41 illustrates a partial view of FIG. 40.

Next, the process 1100 may include as illustrated in box 1120 that the elevator cylinder retracts out of the ballistic chamber. Thereafter, the process 1100 may include as illustrated in box 1121 that the demilitarization system 100 is ready for next weapon FIG. 40 illustrates demilitarization system safety processes according to the principles of the disclosure; FIG. 41 illustrates a partial view of FIG. 40; and FIG. 42 illustrates a partial view of FIG. 40.

Figure 42:
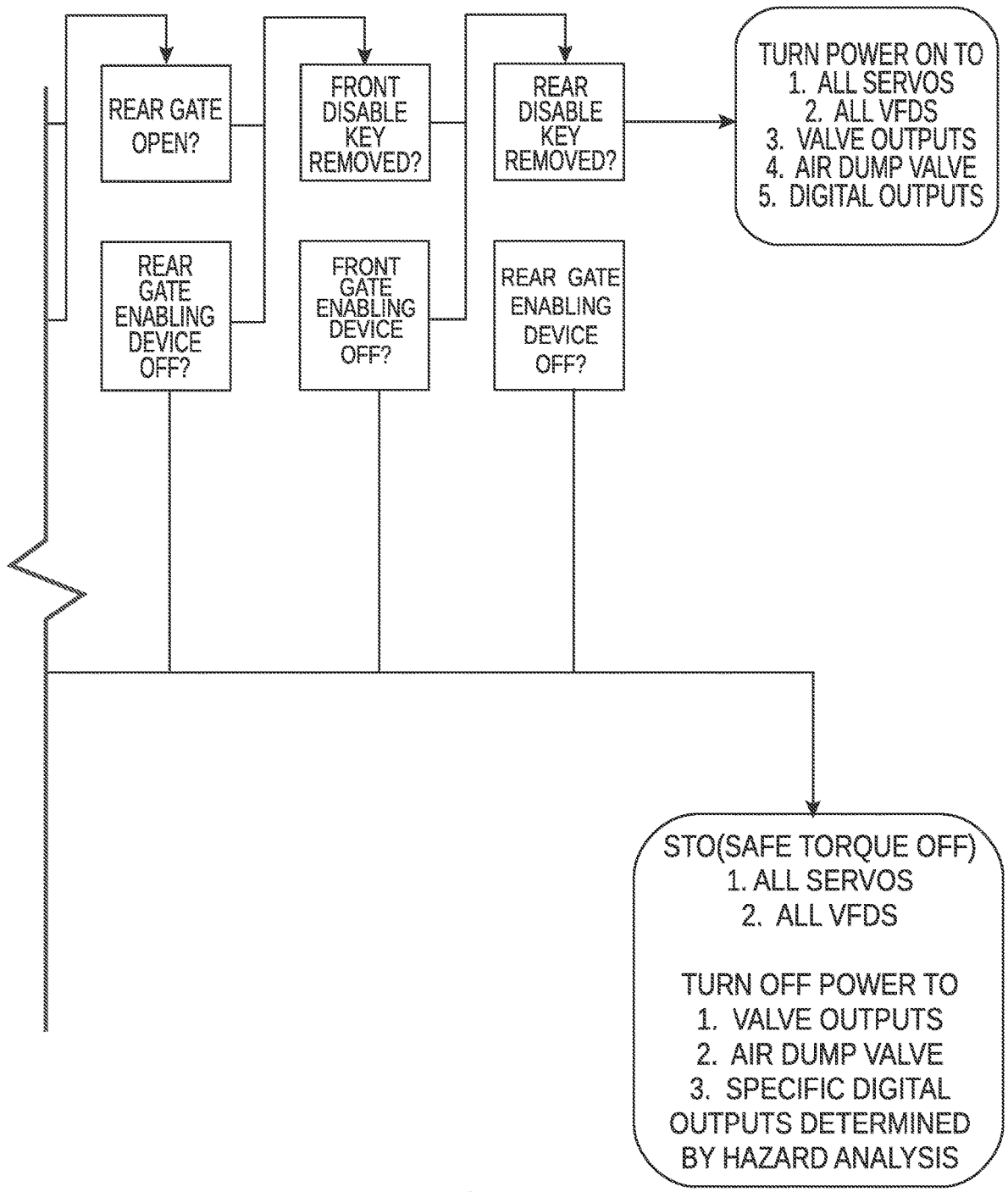
FIG. 42 illustrates a partial view of FIG. 40.

In particular, FIG. 40, FIG. 41, and FIG. 42 illustrate safety processes of the demilitarization system 100 as described herein that may be controlled, responsive, and/or the like to the computing device.

Figure 43:
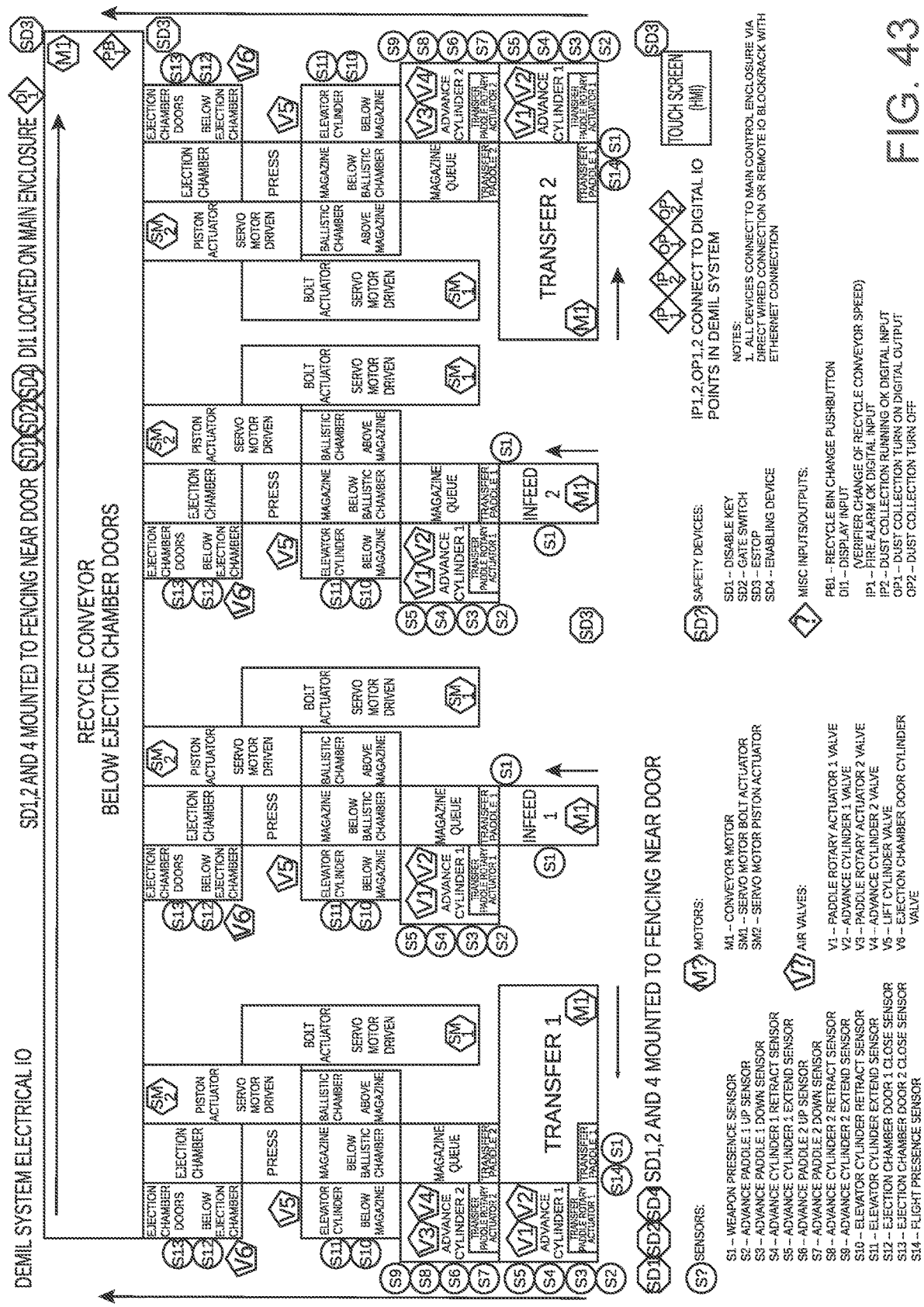
FIG. 43 illustrates demilitarization system electrical inputs and outputs according to the principles of the disclosure.

FIG. 43 illustrates demilitarization system electrical inputs and outputs according to the principles of the disclosure.

Figure 44:
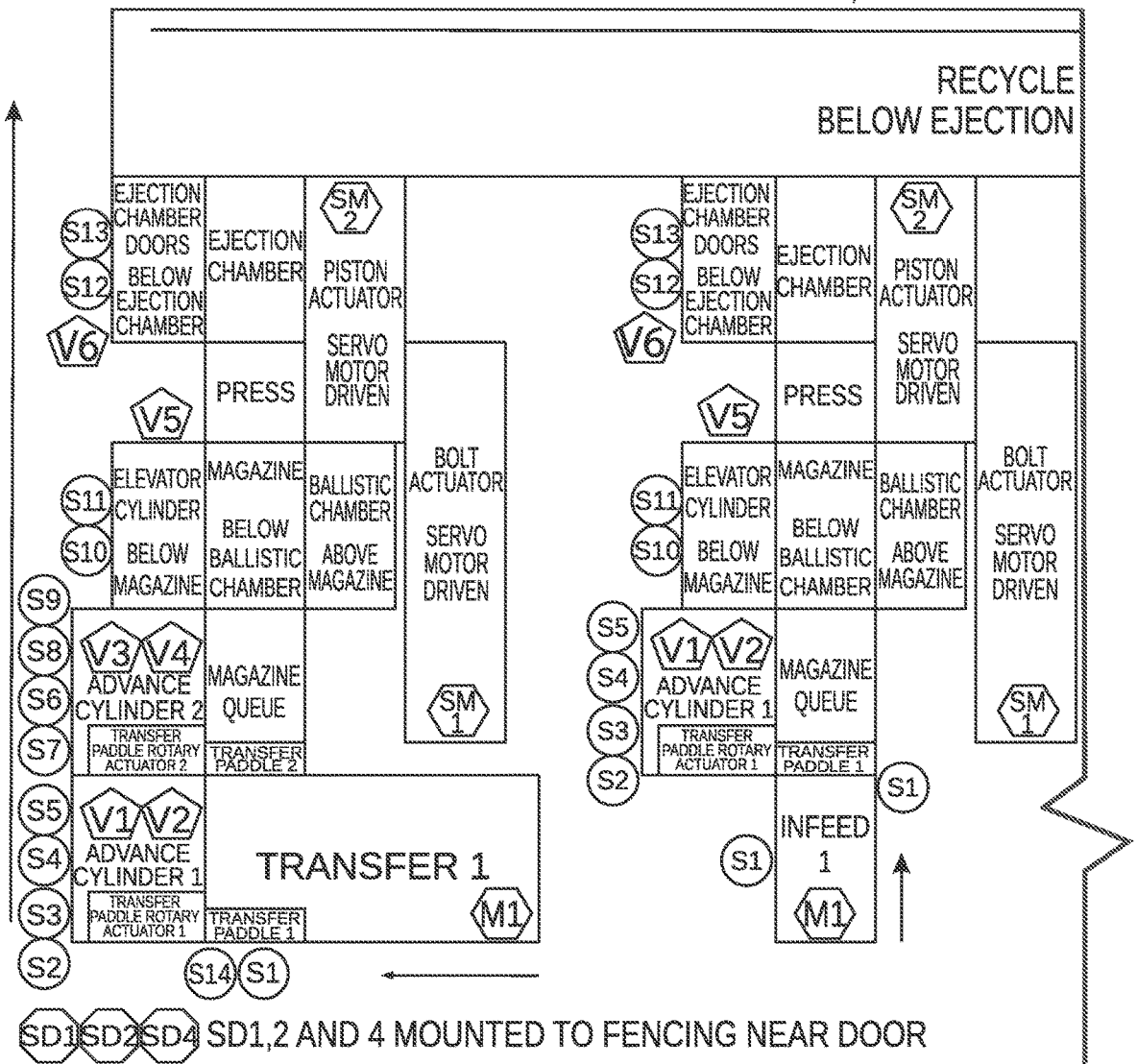
FIG. 44 illustrates a partial view of FIG. 43.

FIG. 44 illustrates a partial view of FIG. 43.

Figure 45:
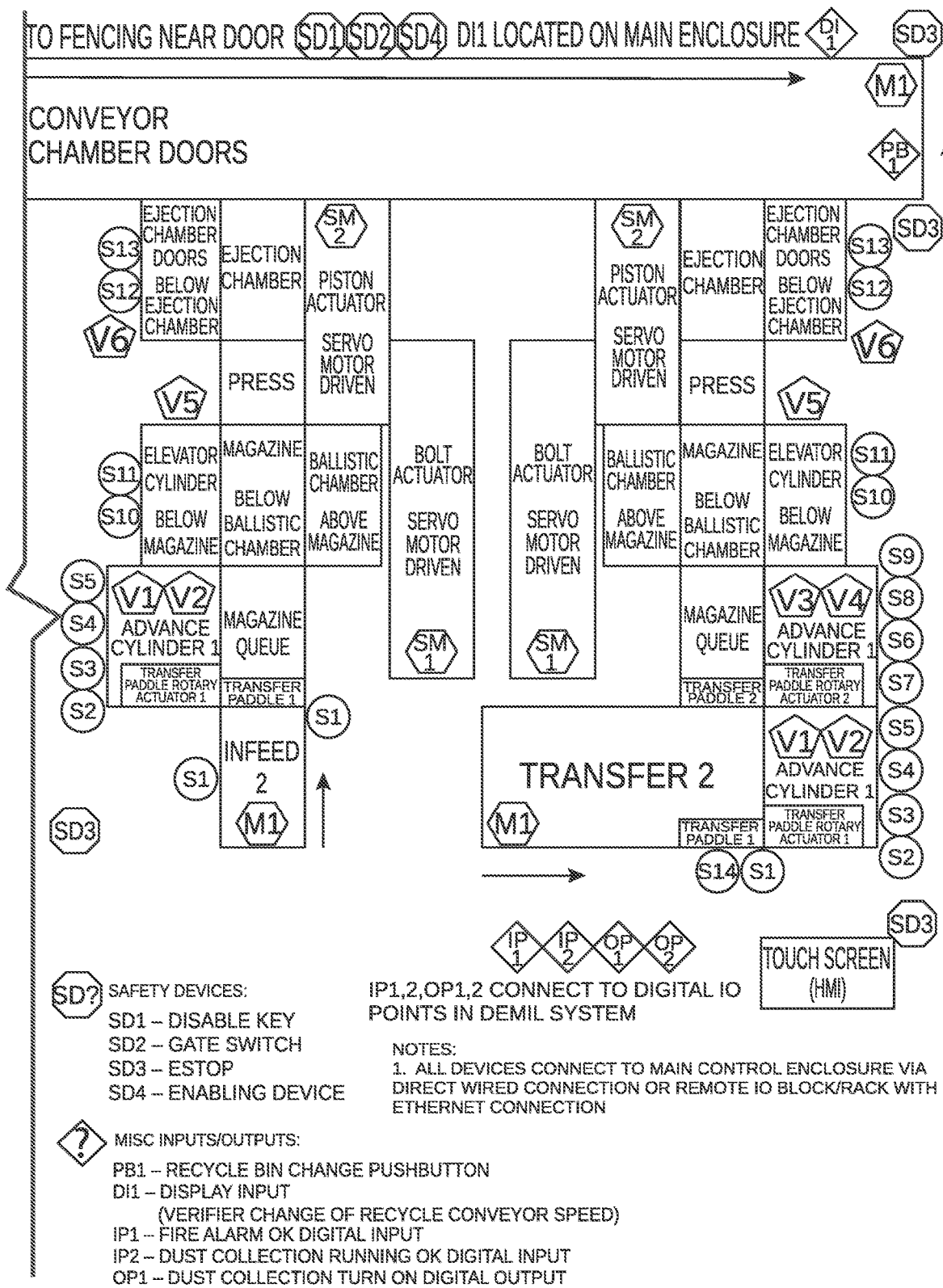
FIG. 45 illustrates a partial view of FIG. 43.

FIG. 45 illustrates a partial view of FIG. 43.

In particular, FIG. 43, FIG. 44, and FIG. 45 illustrate exemplary electrical inputs and outputs of one implementation of the demilitarization system 100 as described herein that may be controlled, responsive, and/or the like to the computing device. The disclosure further contemplates other implementations that may be scaled to include additional components, fewer components, and/or the like, which may include a number of the elements illustrated in FIG. 43, FIG. 44, and FIG. 45. For example, the electrical inputs and outputs of the demilitarization system 100 may be implemented for a single implementation of the press assembly 700 or any number of implementations of the press assembly 700. However, the electrical inputs and outputs of the demilitarization system 100 may be implemented with numerous variations, layouts, and/or the like and as such are within the spirit of the disclosure and contemplated herein.

In one aspect, the demilitarization system 100 configured and constructed according to the disclosure may be fully automatic once the weapons to be demilitarized are loaded onto the conveyor feed (the transfer conveyor 300, the weapon feed system 400) for the initial demilitarization process with the final output of material meeting demilitarization specifications and conveyed to a recycle container. The demilitarization system 100 may be configured for mitigating noise and dust levels by containment of the crush zone.

In one aspect, the demilitarization system 100 configured and constructed according to the disclosure may be implemented with all equipment required to provide a self-fed once through demilitarization process, via a conveyor system with a container lift and tilt assist mechanism at process initiation as described herein. In one aspect, the demilitarization system 100 configured and constructed according to the disclosure may automatically conduct a scan of the demilitarized material from the initial demilitarization process and determine the materials that do not meet the 'degree of demilitarization' and send the materials through the demilitarization process again to reach the 'degree of demilitarization'. Demilitarization material from both the initial demilitarization process and the re-processing shall be sent via a conveyor to the recycle bin 114. In one aspect, the demilitarization system 100 configured and constructed according to the disclosure may not require any interaction by humans except to start and stop the process.

In one aspect, the demilitarization system 100 configured and constructed according to the disclosure may process all of the weapons to meet the "degree of demilitarization" without the need for re-processing. In one aspect, the demilitarization system 100 configured and constructed according to the disclosure may also be capable of re-processing the weapons.

In one aspect, the demilitarization system 100 configured and constructed according to the disclosure may incorporate safety systems to resist accidental ordnance discharge that may accidentally enter the demilitarization process.

In one aspect, the demilitarization system 100 configured and constructed according to the disclosure to meet a 'degree of demilitarization' as described in DoDM 4160.28-M-V3 for the targeted area of each weapon.

In one aspect, the demilitarization system 100 configured and constructed according to the disclosure may maintain a minimum work cycle (throughput) of five-hundred (500) units per hour. In one aspect, the demilitarization system 100 configured and constructed according to the disclosure may have a durability of a minimum of 10 years of service based on the manufacturer's reasonable recommended maintenance routines.

In one aspect, the demilitarization system 100 configured and constructed according to the disclosure may process a throughput of not less than five hundred units per hour.

In one aspect, the demilitarization system 100 configured and constructed according to the disclosure may process, at a minimum, to completion fully assembled weapons. For example, the weapons may include a M60s, shotguns, M700s, M9s, various pistols, AK-47s, and the like. In one aspect, the demilitarization system 100 configured and constructed according to the disclosure may process, at a minimum, to completion fully assembled small weapons. In one aspect, small weapons may be defined as rifles and handguns. In one aspect, small weapons may be defined as rifles and handguns having a size consistent with M60s, shotguns, M700s, M9s, various pistols, AK-47s, and the like.

In one aspect, the demilitarization system 100 configured and constructed according to the disclosure may utilize crushing in the demilitarization process.

In one aspect, the demilitarization system 100 configured and constructed according to the disclosure may be constructed to eliminate excessive degradation due to processing of the barrels of weapons such as an M60 and the like. In this regard, the M60 barrel is constructed of a carbon steel alloy with a chromium plated bore and may contain a liner of Stellite 21 in a breech end.

During testing, weapons including M60s, shotguns, M700s, M9s, various pistols, AK-47s, and the like have been processed by the demilitarization system 100 configured and constructed according to the disclosure to be crushed during multiple sets of testing and have been determined to meet or exceed the "degree of demilitarization" as described in DoDM 4160.28-M-V3, Jun. 7, 2011. The various conveyors of the disclosure have been configured to be oversized to accommodate atypical variants of the weapons. In one aspect, inside dimensions of each infeed conveyor 402 are at least 6" high by 12.5" wide by 50.5" long.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

Aspects of the disclosure may be implemented in any type of computing device that may include a processor, a memory, a display, a power supply, a user interface, and the like. In one aspect the computing device may implement, connect, control, receive signals from, and/or the like the human machine interface or HMI 102, the operator control box 104, the control box 134, various sensors described herein, and other system components of the demilitarization system 100. The processor may be a central processing unit configured to execute instructions such as instructions related to software programs. Any processor can be used as understood to those of ordinary skill in the art. The display may be a liquid crystal display (LCD). Preferably the LCD includes a backlight to illuminate the various color liquid crystals to provide a more colorful display. The user interface may be any type of physical input as readily employed in the field. For example, the user interface may have physical buttons. Alternatively, the user interface may be implemented on a touchscreen. Alternatively, any aspect of the computing device and/or the demilitarization system 100 may be responsive to voice commands.

The memory may further include an operating system, a communication component, a contact/motion component, a graphics component, and the like. The operating system together with the various components provides software functionality for each of the components of the demilitarization system 100. The memory may include a high-speed, random-access memory. Also, the memory may be a non-volatile memory, such as magnetic fixed disk storage, cloud-based memory, flash memory or the like. These various components may be connected through various communication lines including a data bus.

The computing device can include an audio input/output device. The audio input/output device may include speakers, speaker outputs, and the like, providing sound output; and may include microphones, microphone inputs, and the like, for receiving sound inputs. In an exemplary aspect, the audio input/output device may include an analog to digital converter and a digital to audio converter for audio input and output functions respectively.

In another aspect, the computing devices may include a transceiver. The transceiver may provide radio and signal processing as needed to access a wireless network for services. The processor may be configured to process functions, data transfer, and the like and provide an array of services, based on those functions, to the user.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Voice recognition software may be utilized in various aspects of the systems and methods. Users may be able to vocalize, rather than utilizing other input processes. For example, the voice recognition software may be configured for generating text from voice input from a microphone or other voice input. A speech signal processor may convert speech signals into digital data that can be processed by the processor. The processor may perform several distinct functions, including serving as the speech event analyzer, the dictation event subsystem, the text event subsystem, and the executor of the application program. The speech signal processor may generate speech event data and transmit this data to the processor to be processed first by the speech event analyzer. The speech event analyzer may generate a list or set of possible candidates among the system recordings that represent or match the voice input processed by the speech signal processor. The speech event analyzer may transmit the candidate sets to a dictation event subsystem. The dictation event subsystem may analyze the candidate sets and choose the best match candidate with the highest degree of similarity. This candidate is then considered the correct translation, and the dictation event subsystem forwards the translation to the text event subsystem which in turn inputs the translated text into the device.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

What is claimed is:

1. An arms demilitarization system, comprising:
   at least one weapon feed system comprising a ballistic box;
   at least one crush box;
   at least one rear back gauge system;
   at least one press assembly; and
   at least one infeed assembly,
   wherein the at least one press assembly is configured with a tool and the at least one press assembly is configured such that the tool crushes one section of a weapon per cycle of the at least one press assembly;
   wherein the at least one press assembly comprises a hydraulic piston and a cylinder;
   wherein the at least one weapon feed system includes a feed actuator system, a rotary paddle; and
   wherein the rotary paddle is moved by the feed actuator system to engage the weapon located on the at least one infeed assembly and move the weapon into the ballistic box.

2. The arms demilitarization system according to claim 1, further comprising at least one transfer conveyor,
   wherein the at least one transfer conveyor, the at least one infeed assembly, and the at least one weapon feed system are configured to feed a weapon to the at least one press assembly; and
   wherein the at least one transfer conveyor is configured to move the weapon to the at least one infeed assembly.

3. The arms demilitarization system according to claim 1, further comprising at least one transfer conveyor,
   wherein the at least one transfer conveyor, the at least one infeed assembly, and the at least one weapon feed system are configured to be loaded at a single process initiation location; and
   wherein the at least one transfer conveyor, the at least one infeed assembly, and the at least one weapon feed system are configured to convey a weapon from the single process initiation location.

4. The arms demilitarization system according to claim 1, further comprising at least one transfer conveyor,
   wherein the at least one transfer conveyor includes a conveyor belt and cleats; and
   wherein the cleats are arranged at set distances to keep weapons separated.

5. The arms demilitarization system according to claim 4,
   wherein the at least one transfer conveyor includes a weapon presence sensor, a flight presence sensor, and a motor;
   wherein the weapon presence sensor is configured to cycle actuation of the at least one transfer conveyor; and
   wherein the weapon presence sensor is configured to be utilized for determining a starting and/or a stopping position of the at least one transfer conveyor.

6. The arms demilitarization system according to claim 1, further comprising at least one transfer conveyor,
   wherein the at least one transfer conveyor moves weapons laterally to the at least one infeed assembly.

7. An arms demilitarization system, comprising:
   at least one weapon feed system;
   at least one crush box;
   at least one rear back gauge system;
   at least one press assembly; and
   at least one infeed assembly,
   wherein the at least one weapon feed system includes an infeed conveyor, the at least one crush box, a feed actuator system, a rotary paddle, and a bolt; and
   wherein the bolt is moved by the feed actuator system to engage crushed weapon parts located in the crush box to eject the crushed weapon parts from the crush box.

8. An arms demilitarization system, comprising:
   at least one weapon feed system;
   at least one crush box;
   at least one rear back gauge system;
   at least one press assembly;
   a recycle conveyor; and
   at least one infeed assembly,
   wherein the at least one press assembly is configured with a tool that crushes one section of a weapon per cycle of the at least one press assembly;
   wherein the at least one weapon feed system includes an infeed conveyor, a feed actuator system, a rotary paddle, and a bolt;

wherein the at least one press assembly comprises a hydraulic piston and a cylinder; and wherein the rotary paddle is moved by the feed actuator system to engage the weapon located on the at least one infeed assembly and move the weapon into a ballistic box.

9. The arms demilitarization system according to claim 8, further comprising:

a container mechanism configured to hold weapon dunnage; and at least one transfer conveyor, wherein the at least one transfer conveyor, the at least one infeed assembly, and the at least one weapon feed system are configured to be loaded at a single process initiation location; and wherein the at least one transfer conveyor, the at least one infeed assembly, and the at least one weapon feed system are configured to convey the weapon from the single process initiation location.

10. The arms demilitarization system according to claim 8, further comprising at least one transfer conveyor, wherein the at least one transfer conveyor includes a conveyor belt and cleats, wherein the cleats are arranged at set distances to keep weapons separated; and wherein the at least one transfer conveyor, the at least one infeed assembly, and the at least one weapon feed system are configured to feed the weapon to the at least one press assembly.

11. The arms demilitarization system according to claim 10, wherein the at least one transfer conveyor includes a weapon presence sensor, a flight presence sensor, and a motor;

wherein the weapon presence sensor is configured to cycle actuation of the at least one transfer conveyor; and wherein the weapon presence sensor is configured to be utilized for determining a starting and/or a stopping position of the at least one transfer conveyor.

12. The arms demilitarization system according to claim 8, further comprising at least one transfer conveyor, wherein the at least one transfer conveyor moves the weapon laterally to the at least one infeed assembly.

\* \* \* \* \*